United States Patent [19]

Osada

[11] Patent Number: 5,717,681
[45] Date of Patent: Feb. 10, 1998

[54] MOVEMENT APPARATUS AND RECORDING/REPRODUCING APPARATUS

[75] Inventor: Yasuo Osada, Saitama, Japan

[73] Assignee: Sony Corporation, Tokyo, Japan

[21] Appl. No.: 436,289

[22] PCT Filed: Sep. 28, 1994

[86] PCT No.: PCT/JP94/01603

§ 371 Date: May 17, 1995

§ 102(e) Date: May 17, 1995

[87] PCT Pub. No.: WO95/09420

PCT Pub. Date: Apr. 6, 1995

[30] Foreign Application Priority Data

| Sep. 30, 1993 | [JP] | Japan | 5-265524 |
| Oct. 27, 1993 | [JP] | Japan | 5-289798 |
| Sep. 7, 1994 | [JP] | Japan | 6-233631 |

[51] Int. Cl.[6] .................... G11B 17/00; G11B 17/22
[52] U.S. Cl. .................. 369/178; 369/191; 369/36; 360/92
[58] Field of Search ................ 369/178, 34, 36, 369/191, 194; 414/277, 280; 360/92

[56] References Cited

U.S. PATENT DOCUMENTS

| 4,614,990 | 9/1986 | Saito | 360/183 |
| 4,736,357 | 4/1988 | Uehara et al. | 369/270 |
| 4,797,865 | 1/1989 | Imai et al. | 369/39 |
| 4,802,041 | 1/1989 | Uehara | 360/99.06 |
| 4,897,616 | 1/1990 | Wang et al. | 330/265 |
| 5,006,940 | 4/1991 | Hamchi et al. | 360/92 |
| 5,146,762 | 9/1992 | Ohmori et al. | 369/75.2 |
| 5,319,510 | 6/1994 | Nisikawa | 360/99.02 |
| 5,539,717 | 7/1996 | Choi | 369/75.2 |
| 5,559,649 | 9/1996 | Ito et al. | 360/99.06 |

FOREIGN PATENT DOCUMENTS

| 0 310 427 A2 | 4/1989 | European Pat. Off. |
| 0 539 199 A2 | 4/1993 | European Pat. Off. |

Primary Examiner—Stuart S. Levy
Assistant Examiner—William J. Klimowicz
Attorney, Agent, or Firm—Limbach & Limbach L.L.P.

[57] ABSTRACT

A lift stage that may be moved vertically by being guided by a longitudinal groove in a lateral wall is uplifted or lowered via a pin by first and second cams. The first cam has a zigzag-shaped cam groove to permit periodic reciprocating movement. The second cam performs a reciprocating movement with a pre-set phase difference with respect to the first cam. When the pin reaches a branching point of the zig-zag shaped cam groove, the uplifting or the descent is selected in dependence upon the direction of rotation of a rotary cam causing rotation of the respective cams, with the second cam supporting or not supporting the pin. There is provided a system which is small-sized, simple in construction and superior in load bearing capability and durability and which is suited for use in a recording and/or reproducing apparatus.

11 Claims, 75 Drawing Sheets

1

MOVEMENT APPARATUS AND RECORDING/REPRODUCING APPARATUS

TECHNICAL FIELD

This invention relates to a movement device for selectively moving objects in one or in the other direction. The object to be moved includes a certain portion of an electronic audio/video apparatus, such as a disc player or a tape player, a lift stage carrying the personnel, motor-car or freight in general, or a pallet.

This invention also relates to a recording and/or reproducing apparatus for recording and/or reproduction on or from a disc cartridge comprised of a cartridge main member and a recording disc contained therein, and to a recording and/or reproducing apparatus designed as a disc changer having plural disc cartridges housed therein and adapted for selecting one of these disc cartridges for recording/reproduction.

The invention also relates to a disc loading apparatus constituting the recording and/or reproducing apparatus and a cartridge holder.

BACKGROUND OF THE INVENTION

In the conventional disc player, designed and constructed as an auto-changer, a mechanical chassis carrying essential components of the disc player apparatus, such as a spindle motor or an optical pickup, is selectively moved as moved components in one direction, such as downwards, or in the other direction, such as upwards, by a movement device. The mechanical chassis is moved between positions associated with plural recording discs loaded in a stacked fashion within the disc player apparatus and selectively loaded with a recording disc for writing and/or reading information signals on or from the disc.

The movement device may be a lift stage loaded with personnel, vehicles or luggage in general, or a device for lifting a pallet as a moved article, or a so-called elevator or lift.

Such movement device is designed to move the moved article from one extreme position to the other extreme position and to be halted at at least one position between these extreme positions. That is, with the above-mentioned movement device for moving the mechanical chassis of the disc player apparatus, the mechanical chassis is halted at a plurality of positions each facing a recording disc. With the movement device designed as the lift, the lift stage or the pallet is halted at plural positions corresponding to the floor surfaces of the respective stories.

A variety of different types of the movement devices, including those having a horizontally movable plate cam 101, as shown in FIGS. 99 to 108, have hitherto been proposed. The upper edge of the plate cam 101 is designed as an inclined portion generally inclined in one direction having intermediate first to fifth horizontally extending sections 101a, 101b, 101c, 101d and 101e. On the upper edge of the plate cam 101 is set a profiling pin 102 mounted on a moved article. The profiling pin 102 is guided by a vertically extending guide groove 103 so as to be movable only in the vertical direction. The plate cam 101 is movable on the first horizontal section 101a by movement means, not shown, in a horizontal direction perpendicular to the guide groove 103 between a position in which the first horizontal section 101a is in registration with the guide groove 103, as shown in FIG. 103, and a position in which the fifth horizontal section 101e is in registration with the guide groove 103, as shown in FIG. 99.

When the first horizontal section 101a is in registration with the guide groove 103, the profiling pin 102 is set on the first horizontal section 101a and is at a standstill at the lower most position. When set on the second, third or fourth horizontal sections 101b, 101c or 101d, the profiling pin 102 is moved to progressively high positions. By the plate cam 101 being halted at a pre-set position, the profiling pin 102 is set on the upper edge of one of the second to fourth horizontal sections 101b, 101c and 101d and halted thereat. When the fifth horizontal section 101e is at a position registering with the guide groove 103, the profiling pin 102 is set on the fifth horizontal section 101e and hence is halted at the upper most position.

If, with the above-described movement device having the plate cam 101, the profiling pin 102 is to be halted on one of the horizontal sections 101a to 101e, the profiling pin 102 can be halted at a precisely set height, without regard to accuracy in the plate cam halting position, since the upper edges of the horizontal sections 101a to 101e are horizontal, that is parallel to the direction of movement of the plate cam 101.

There is also known a movement device employing a disc-shaped rotary plate cam 104 rotated about a center shaft 105, as shown in FIGS. 104 to 108. The rotary plate cam 104 has an inclined cam surface 104a extending towards its rim. The outer edge portion of the inclined cam surface 104a is generally spirally-shaped and has a plurality of intermediate concentric portions. These concentric portions are in the form of arcs of circles centered about the center shaft 105. On the outer edge of the inclined cam surface 104a is set a profiling pin 102 mounted on the moved article. The profiling pin 102 is movable only in the up-and-down direction by being guided by a guide groove extending in the up-and-down direction with the center shaft 105 as the lower most end. The rotary plate cam 104 is rotated by movement means, not shown, between a rotational position shown in FIG. 108 in which the portion of the inclined cam surface 104a closest to the center shaft 105 is in registration with the guide groove and a rotational position shown in FIG. 104 in which the portion of the inclined cam surface 104a remotest from the center shaft 105 is in registration with the guide groove.

When the rotary plate cam 104 is at the rotational position shown in FIG. 108 in which the portion of the inclined cam surface 104a closest to the center shaft 105 is in registration with the guide groove, the profiling pin 102 is set on the concentric circle and is halted at the lower most position. The profiling pin 102 is moved to progressively higher positions by the rotation of the rotary plate cam 104. When the rotary plate cam 104 is at such a rotational position in which the portion of the inclined cam surface 104a remotest from the center shaft 105 is in registration with the guide groove, as shown in FIG. 104, the profiling pin 102 is halted at the upper most position.

For halting the profiling pin 102 at the respective concentric circles in the movement device having the rotary plate cam 104, since the upper edges of the concentric circles are in the from of arcs of circles centered about the center shaft 105, the profiling pin 102 can be halted at correct height positions without regard to accuracy in the plate cam halting position.

There is also known a movement device shown in FIGS. 109 to 113 which is comprised of a pair of bell cranks 110, 110 and a horizontal rod 130 interconnecting these bell cranks 110, 110 and adapted to lift a moved article 111. Each bell crank 110 has its mid portion rotatably supported with respect to a base 106 by a pivot 107. Each of these bell cranks 110, 110 has its one end rotatably mounted by rotary shafts 109, 109 on the horizontal rod 130 so that the bell cranks will have the same rotational angular position with respect to the base 106. Each bell crank 110 has its opposite end connected via rotary shafts 108, 108 to the moved article 111. Each bell crank 110 has an elongated engagement opening engaged by the rotary shaft 108. The engagement opening is elongated in the direction towards the pivot 107. The rotary shafts 108, 108 are engaged in a pair of guide grooves 112, 112 formed in the base 106, such that the moved article 111 is movable only in the up-and-down direction with respect to the base 106.

With the above movement device, the moved article 111 may be moved between the upper position shown in FIG. 109 and the lower position shown in FIG. 113 via the bell cranks 110, 110 by horizontally shifting the horizontal rod 130.

There is also known a movement device constituted by links 113, 114 and a horizontal rod 115. With such movement device, the moved article 111 and the horizontal rod 115 are interconnected by a pair of elongated links 113. That is, each of the elongated links 113, 113 has its one end rotatably mounted to the moved article 111, while having its other end rotatably mounted on the horizontal rod 115. The horizontal rod 115 is supported by the base 106 for movement only in the horizontal direction. The moved article 111 is movable only in the up-and-down direction by a pair of guide grooves 112, 112 formed in the base 106. The mid portions of the elongated links 113, 113 and the base 106 are interconnected by reduced-length links 114, 114. That is, each of the reduced-length links 114, 114 has its end rotatably mounted on a mid portion of each elongated links 113, 113, while having its opposite end rotatably mounted on the base 106.

With such movement device, the moved article 111 may be lifted via the elongated and reduced-length links 113, 113, 114, 114 by horizontally moving the horizontal rod 115.

There is also known a movement device shown in FIGS. 119 to 123 including a pair of rotary links 116, 117 each having its mid portion rotatably supported with respect to the base 106. The rotary links 116, 117 are mounted on the base 106 for rotation by support shafts 128, 129. The one ends of the rotary links 116, 117 are rotatably connected to each other by a connecting shaft 118. That is, the rotary links 116, 117 are formed at one ends thereof with elongated holes 121, 122 each having its long axis extending towards the supporting shafts 128, 129, and are connected to each other by the connecting shaft 118 being passed through these elongated holes 121, 122. The other ends of the rotary links 116, 117 are formed with elongated openings extending towards the supporting shafts 128, 129 and adapted for being passed through by the rotary shafts 119, 120. The rotary shafts 119, 120 are movable only in the up-and-down direction via a pair of guide grooves 112, 112 formed in the base 106.

With the above-described movement device, the moved article 111 may be moved between an upper position shown in FIG. 119 and a lower position shown in FIG. 123 by rotating the rotary links 116, 117 about the support shafts 128, 129.

There is also known a movement device having a Geneva wheel 123 and a rack gear 126 meshing with the Geneva wheel 123, as shown in FIGS. 124 to 136. The geneva wheel 123 is mounted for rotation about the center shaft with respect to the moved article. The Geneva wheel 123 has a pair of engagement pins 124, 125 provided at an interval of 180° via the center shaft. The rack gear 126 has plural grooves 127 arrayed at a pre-set interval and adapted for being engaged by the engagement pins 124, 125, and is fixedly mounted on a base, not shown.

If, with the above movement device, the engagement pins 124, 125 are engaged in the grooves 127, 127, as shown in FIG. 124, and the Geneva wheel 123 is rotated in one direction as indicated by arrow J in FIG. 124, only the engagement pin 125 is ready to be engaged in the groove 127, while the Geneva wheel 123 is moved relative to the rack gear 126 in a direction corresponding to the rack gear 126. When the Geneva wheel 123 has been rotated through 180° from the initial state, the pins 124, 125 are engaged in the grooves 127, 127, as shown in FIG. 138. The Geneva wheel 123 is moved at this time a distance equal to one pitch of the groove 127 relative to the rack gear 126.

With such movement device, shown in FIGS. 99 to 103, if the angle of inclination or the pressure angle of the cam surface, which is the upper edge of the plate cam 101, is set to within a practical range, the distance of horizontal movement of the plate cam 101 needs to he increased relative to the distance of vertical movement of the profiling pin 102. The result is that the movement device is increased in size.

On the other hand, the movement device shown in FIGS. 104 to 108 is increased in size because the rotary plate cam 104 has a diameter equal to at least twice the distance of movement of the profiling pin 102.

With the movement device shown in FIGS. 109 to 113, it is difficult to control the device for halting the moved article 111 at the pre-set position. If an impact is applied from outside, the risk is high that the moved article 111 be moved under the shock applied thereto. The movement device has a large number of component parts and hence is complicated and difficult to put together.

With the movement device shown in FIGS. 114 to 118, since the distance of movement of the horizontal rod 115 is not proportionate to that of the moved article, it is difficult to control the position of the moved article 111. Aside from the difficulties in halting the moved article 111 at the pre-set position, there is a risk that the moved article 111 be moved under the impact applied from outside. In addition, the movement device also has a large number of component parts and hence is complicated to put together.

With the movement device shown in FIGS. 119 to 123, it is difficult to control the moved article so as to be halted at the pre-set position. In addition, there is a risk that the moved article 111 be moved under the impact applied from outside. Besides, the movement device also has a large number of component parts and hence is complicated to put together.

Furthermore, with the movement device shown in FIGS. 124 to 138, since the Geneva wheel is mounted on the moved article, driving means, such as an electric motor, needs to be provided on the moved article, and hence the moved article becomes complicated in structure. Since a number of Geneva wheels need to be provided on the moved article, it is difficult to synchronize the rotation of the respective Geneva wheels.

There is also known a movement device having a feed screw. Since the feed screw is rotated with the direction of movement of the moved article as its axis, the mechanism for rotating the feed screw become bulky in size. Besides, it is similarly difficult to halt the moved article at a pre-set position.

In view of the foregoing, it is an object of the present invention to provide a movement device which is simple in structure and easy to assemble, and in which, despite the small size of the device, the moved article can be halted with accuracy at a pre-set position and can be positively maintained at the halted position despite the shock applied thereto from outside.

There has also hitherto been proposed a recording and/or reproducing apparatus, as a so-called disc changer device, in which a plurality of disc cartridges, each comprised of a recording disc housed within a cartridge main member, are accommodated, and in which one of these disc cartridges is selected for recording/reproducing information signals on or from the disc cartridge.

With such disc changer apparatus, the disc cartridges are accommodated and held in a disc stocker provided in a casing of the disc changer device.

With such disc changer device, the recording/reproducing unit, having a spindle motor, an optical pickup and so forth, is moved between the positions facing the disc cartridges housed within the disc stocker, for selecting the disc cartridge and loading the selected disc cartridge thereon for recording/reproducing information signals on or from the disc cartridge.

With such recording and/or reproducing apparatus, constituted as a disc changer device, since each disc cartridge is housed within the disc changer device and hence cannot be visually recognized from outside, it is impossible to read indications on an outer surface of the disc cartridge or on the label affixed thereto. These indications are relative to the contents of the information signals recorded on the disc cartridge.

Consequently, if it is desired with such recording and/or reproducing apparatus to confirm the indications concerning the disc cartridge housed therein, it is necessary to take out these disc cartridges out of the apparatus by a laborious operation.

On the other hand, if, with the above-described recording and/or reproducing apparatus, one of the disc cartridges contained therein is selected and loaded on the recording/ reproducing unit, it is inconveniently not clear which of the disc cartridges has been selected. Although a device may be annexed for indicating which disc has been selected, such device complicates the structure of the recording/ reproducing apparatus.

In addition, it is not possible with such recording and/or reproducing apparatus to exchange a disc cartridge during recording and/or reproduction on or from another disc cartridge, such that it is not possible to effect continuous recording/reproduction.

Furthermore, with the above recording and/or reproducing apparatus, since the disc cartridge is housed in the disc cartridge inserting direction, it is difficult to reduce the size of the disc cartridge along the inserting direction, that is the depth of the disc cartridge.

In view of the foregoing, it is another object of the present invention to provide a recording and/or reproducing apparatus in which each of the disc cartridge loaded thereon may be visually recognized from outside, in which it can be clearly indicated which of the disc cartridges is currently recorded/reproduced, without complicating the structure of the apparatus, the disc cartridge loaded in the recording/ reproducing unit can be exchanged for another disc cartridge, and in which the apparatus can be reduced in size along the disc cartridge inserting direction, that is along the depth of the disc cartridge.

DISCLOSURE OF THE INVENTION

For solving the above problem and accomplishing the above object, the present invention provides a movement device including a profiling pin inserted into a guide slit formed in an object to be moved for extending in an up-and-down direction so that the profiling pin is movable only in the up-and-down direction, a first cam plate having at least one first horizontal section, a second horizontal section contiguous to the first horizontal section via a branch point and a first inclined section and lying above said first horizontal section, and a third horizontal section contiguous to the first horizontal section via the branch point and a second inclined section and lying below the first horizontal section, with first cam plate being horizontally movable between an initial position positioning the profiling pin at the first horizontal section and an operative position positioning the profiling pin at the second position or the third position. The movement device also includes movement means for periodically moving the first cam plate in reciprocation in a forward direction and in a reverse direction between the initial position and the operative position, and a second cam plate having at least one horizontal abutment support and being horizontally movable between a supporting position supporting the profiling pin by the abutment support and a non-supporting position receding the abutment support away from a locus of movement of the profiling pin, with the second cam plate being periodically movable in a forward direction and in a reverse direction by the movement means with a pre-set phase difference relative to the first cam plate. When the movement means performs a forward periodic movement and the first cam plate is horizontally moved from the initial position to the operative position, the second cam plate is at the supporting position during the time the profiling pin passes through the branching point, thereby guiding the profiling pin to the first inclined section leading to the second horizontal section. When the movement means performs a reverse periodic movement and the first cam plate is horizontally moved from the initial position to the operative position, the second cam plate is at the non-supporting position during the time the profiling pin passes through the branching point, thereby guiding the profiling pin to the second inclined section leading to the third horizontal section.

With the movement device, the profiling pin inserted into a guide slit formed in an object to be moved for extending in an up-and-down direction so that the profiling pin is movable only in the up-and-down direction, is inserted into a first cam plate having at least one first horizontal section, a second horizontal section contiguous to the first horizontal section via a branch point and the first inclined section and lying above the first horizontal section, and a third horizontal section contiguous to the first horizontal section via the branch point and the second inclined section and lying below the first horizontal section, and into a second cam plate having at least one horizontal abutment support and being horizontally movable between a supporting position supporting the profiling pin by the abutment support and a non-supporting position receding the abutment support away from a locus of movement of the profiling pin. The first cam plate is horizontally movable between an initial position positioning the profiling pin at the first horizontal section and an operative position positioning the profiling pin at the second position or the third position. The second cam plate is periodically movable in a forward direction and in a reverse direction by movement means with a pre-set phase difference relative to the first cam plate.

When the movement means performs a forward periodic movement and the first cam plate is horizontally moved from the initial position to the operative position, the second cam plate is at the supporting position during the time the profiling pin passes through the branching point, so that the profiling pin is guided to the first inclined section leading to the second horizontal section. On the other hand, when the movement means performs a reverse periodic movement and the first cam plate is horizontally moved from the initial position to the operative position, the second cam plate is at the non-supporting position during the time the profiling pin passes through the branching point, so that the profiling pin is guided to the second inclined section leading to the third horizontal section.

When halted at the horizontal section or at the halt portion, the profiling pin is held at an accurate position as set by the first cam plate as reference, even although the halt position of the first cam plate is not maintained with high accuracy. On the other hand, the profiling pin is not moved along the guide slit under an external impact. In addition, with the present movement device, there is no necessity of providing driving means, such as an electric motor, on the object for effecting its movement.

Since the cam plates are reciprocated in a direction at right angles to the direction of movement of the object, there is no necessity of increasing the stroke of the reciprocating movement, even although the distance of movement of the object is increased, so that the movement device is not increased in size.

The present invention also provides a movement device including a profiling pin inserted into a guide slit formed in an object to be moved for extending from one to the opposite side and movable only in a direction along the guide slit, biasing means for biasing the object towards the one side, a first cam plate having at least one first halt portion formed in a direction substantially normal to the guide slit, a second halt portion contiguous to the first halt portion via a branching point and a first inclined section inclined relative to the direction of the guide slit, which second halt portion is closer to said opposite side than said first halt portion, and a third halt portion contiguous to the first halt portion via the branching point and a second inclined section inclined relative to the direction of said guide slit. The third halt portion is closer to the one side than the first halt portion, with the first cam plate moving the profiling pin in a direction substantially normal to the guide slit between an initial position abuttingly supporting the profiling pin by the first halt portion and an operative position abuttingly supporting the profiling pin by the second halt portion or by the third halt portion. The movement device also includes movement means for periodically moving the first cam plate in reciprocation in a forward direction and in a reverse direction between the initial position and the operative position, and a second cam plate having at least one abutment support and being movable by the abutment support in a direction substantially normal to the guide slit between a supporting position abuttingly supporting the profiling pin by said abutment support and a non-supporting position receding the abutment support away from the locus of movement of the profiling pin. The second cam plate is periodically movable by the movement means in reciprocation in a forward direction and in a reverse direction with a pre-set phase difference relative to the first cam. When said movement means performs a forward periodic movement and the first cam plate is moved from the initial position to the operative position, the second cam plate is at the supporting position during the time the profiling pin passes through the branching point, thereby prohibiting the profiling pin from being moved in one direction under the bias of the biasing means and guiding the profiling pin to the first inclined section leading to the second horizontal section. On the other hand, when the movement means performs a reverse periodic movement and the first cam plate is moved from the initial position to the operative position, the second cam plate is at the non-supporting position during the time the profiling pin passes through the branching point, thereby enabling the profiling pin to be moved in one direction under the bias of the biasing means and guiding the profiling pin to the second inclined section leading to the third horizontal section.

With the movement device, the profiling pin inserted into a guide slit formed in an object to be moved for extending in an up-and-down direction so that the profiling pin is movable only in the up-and-down direction, is inserted into a first cam plate having at least one first halt portion formed in a direction substantially normal to the guide slit, a second halt portion contiguous to the first halt portion via a branching point and a first inclined section inclined relative to the direction of the guide slit, which second halt portion is closer to the opposite side than the first halt portion, and a third halt portion contiguous to the first halt portion via the branching point and a second inclined section inclined relative to the direction of the guide slit, which third halt portion is closer to the one side than the first halt portion, and a second cam plate having at least one abutment support and being movable by the abutment support in a direction substantially normal to the guide slit between a supporting position abuttingly supporting the profiling pin by the abutment support and a non-supporting position receding the abutment support away from the locus of movement of the profiling pin. The first cam plate moves the profiling pin in a direction substantially normal to the guide slit between an initial position abuttingly supporting the profiling pin by the first halt portion and an operative position abuttingly supporting the profiling pin by the second halt portion or by the third halt portion. The second cam plate is periodically movable by the movement means in reciprocation in a forward direction and in a reverse direction with a pre-set phase difference relative to the first cam.

When said movement means performs a forward periodic movement and the first cam plate is moved from the initial position to the operative position, the second cam plate is at the supporting position during the time the profiling pin passes through the branching point, thereby prohibiting the profiling pin from being moved in one direction under the bias of the biasing means and guiding the profiling pin to the first inclined section leading to the second horizontal section. When the movement means performs a reverse periodic movement and the first cam plate is moved from the initial position to the operative position, the second cam plate is at the non-supporting position during the time the profiling pin passes through the branching point, thereby enabling the profiling pin to be moved in one direction under the bias of the biasing means and guiding the profiling pin to the second inclined section leading to the third horizontal section.

When halted at the horizontal section or at the halt portion, the profiling pin is held at an accurate position as set by the first cam plate as reference, even although the halt position of the first cam plate is not maintained with high accuracy. On the other hand, the profiling pin is not moved along the guide slit under an external impact. In addition, with the present movement device, there is no necessity of providing driving means, such as an electric motor, on the object for effecting its movement.

Since the cam plates are reciprocated in a direction at right angles to the direction of movement of the object, there is no necessity of increasing the stroke of the reciprocating movement, even although the distance of movement of the object is increased, so that the movement device is not increased in size.

The movement means in the present movement device has a rotatable cam member and rotational driving means for selectively rotating the rotatable cam member in a forward direction or in a reverse direction. The rotatable cam member has a first cam section for moving the first cam plate and a second cam section for moving the second cam plate.

In such case, the phase difference between the first cam plate and the second cam plate may be maintained accurately.

The abutment support of the second cam plate is a side edge portion of a lug having its one end supported by a main portion of the second cam plate and having its opposite end as a free end. The second cam plate is moved in reciprocation with a period equal to one-half the period of the movement of the first cam plate.

In such case, the second cam plate may be simplified in profile for facilitating the manufacture.

Thus the present invention provides a movement device in which, despite its simplified construction, facilitated assembling and small-size, the object may be halted correctly at a pre-set position, and which may be positively held at the halt position even if an impact is applied thereto from outside.

The recording and/or reproducing device has a disc stocker for holding a plurality of disc cartridges in tiers. Each disc cartridge is comprised of a recording disc housed within a cartridge main member, and transporting means for selecting one of the disc cartridges held by the disc stocker and transporting the selected disc cartridge to a recording and/or reproducing unit. The disc stocker holds the disc cartridges so that each disc cartridge is partially exposed to outside.

With the present recording and/or reproducing apparatus, the disc stocker for holding plural disc cartridges in tiers holds the disc cartridges so that portions thereof are exposed to outside. Consequently, with the present recording and/or reproducing apparatus, the exposed portions of the disc cartridges van be visually identified from outside, while the disc cartridges may be exchanged if they are not loaded on the recording and/or reproducing device. On the other hand, if the disc cartridges are loaded on the recording and/or reproducing device, the exposed portions thereof are contained within the recording and/or reproducing device, thus allowing to recognize that the disc cartridges have been loaded on the recording and/or reproducing unit.

According to the present invention, each of the loaded disc cartridges may be viewed from outside, while the type of the disc cartridge being recorded or reproduced can be indicated without complicating the construction of the device. In addition, the disc cartridges other than the disc cartridge loaded on the recording and/or reproducing unit can be exchanged. Furthermore, the recording and/or reproducing apparatus can be reduced in depth.

In the recording and/or reproducing apparatus of the present invention, the recording and/or reproducing unit is arranged on the side of the disc stocker which is opposite to its side via which the disc cartridges are inserted and taken out.

The transporting means is responsive to a portion exposed to outside the disc stocker of one of the disc cartridges held by the disc stocker being thrust towards the inside of the disc stocker to initiate the operation of selecting the one of the disc cartridges and transporting the selected disc cartridge into said recording and/or reproducing unit.

The recording and/or reproducing apparatus includes a movement device having a movably supported movement member, and an endless driving belt having a portion lying along a path of movement of said movement member, which endless belt is placed around a driving pulley member and fed by the driving pulley member. The recording and/or reproducing apparatus also includes a follower pulley member arranged on the movement member and carrying the endless driving belt placed therearound, a profiling member movably mounted on the movement member and moved by rotation of the follower pulley member, and a cam member arranged along a path of movement of the movement member for limiting movement of the profiling member relative to the movement member. The driving force transmitted by the endless driving belt acts in dependence upon the position of the movement member relative to the cam member so that the driving force rotates the follower pulley member to cause movement of the profiling member relative to the movement member when the cam member enables movement of the profiling member relative to the movement member. Such driving force moves the movable member when the cam member inhibits movement of the profiling member relative to the movement member.

With the present recording and/or reproducing apparatus, the driving force transmitted by the endless driving belt placed around the follower pulley arranged on the movement member is responsive to the position of the movement member relative to the cam member limiting the movement of the profiling member, so that, when the cam member enables or prohibits movement of the profiling member by the cam member, the profiling member is moved by rotating the follower pulley member, or the movement member is moved, respectively.

Consequently, with the movement device of the present recording and/or reproducing apparatus, the changeover timing for the driving force transmission route is determined only by the profile of the cam member without being fluctuated under e.g., the external force.

The profiling member moves an engagement arm for engaging a disc cartridge held by the disc stocker of a disc changer device with the movement member via the engagement arm.

In such case, in a disc player device, such as a disc changer device having the disc stocker, it is possible with the movement device to positively move the disc cartridge via a pre-set movement route.

Thus the present invention provides a movement deice which is reduced in size and in which there is no risk of the driving changeover timing being fluctuated by the external force.

The movement device according to the present invention may be advantageously applied to a disc changer device having plural recording discs housed therein and adapted for selecting one of these discs for recording and/or reproducing the information signals on or from the selected disc.

The recording and/or reproducing apparatus also includes a disc loading device, which disc loading device includes in turn a cartridge holder for holding a disc cartridge comprised of a recording disc housed within a cartridge main member, a recording and/or reproducing unit for recording/ reproducing information signals on or from the recording disc and transport means for transporting the cartridge holder in one direction or towards the recording and/or reproducing unit. The transport means moves the recording and/or reproducing unit since a mid point of the transport process for the cartridge holder in synchronism with transport of the cartridge holder. The transport means moves the recording and/or reproducing unit via cam means for loading the disc cartridge held by the cartridge holder on the recording and/or reproducing unit.

The transport means further transports the cartridge holder and the recording and/or reproducing unit in one direction for approaching a magnetic head carried by the recording and/or reproducing unit towards the recording disc of the disc cartridge.

The transport means opens a shutter member of the disc cartridge held in the cartridge holder as the cartridge holder is transported in one direction.

The recording and/or reproducing apparatus also has a cartridge holder having a holding member for holding a disc cartridge inserted therein from the front side. The disc cartridge is comprised of a recording disc housed within a cartridge main member and having a shutter member on a lateral side thereof normal to the inserting direction. The shutter member is slidable in the inserting direction for opening or closing an aperture, a slider slidably mounted on the holding member, a retention member provided on the slider for retaining the disc cartridge inserted into the holding member relative to the slider, and a shutter engagement member movably mounted on the holding member and moved in unison with the slider for being engaged with the shutter member. The slider engages the shutter engagement member with the shutter member of the disc cartridge inserted into the holding member for moving the disc cartridge to a closure position of the shutter member.

The recording and/or reproducing device includes a holding member movably supported by a chassis member. The shutter engagement member is engaged with the chassis member when the shutter engagement member is disengaged from the shutter member.

The recording and/or reproducing apparatus includes a movement device having a profiling pin inserted into a guide slit formed in an object to be moved for extending in an up-and-down direction so that the profiling pin is movable only in the up-and-down direction, and a first cam plate having at least one first horizontal section, a second horizontal section contiguous to the first horizontal section via a branch point and a first inclined section and lying above the first horizontal section and a third horizontal section contiguous to the first horizontal section via the branch point and a second inclined section and lying below the first horizontal section. The first cam plate is horizontally movable between an initial position positioning the profiling pin at the first horizontal section and an operative position positioning the profiling pin at the second position or the third position. The recording and/or reproducing apparatus also includes movement means for periodically moving the first cam plate in reciprocation in a forward direction and in a reverse direction between the initial position and the operative position, and a second cam plate having at least one horizontal abutment support and being horizontally movable between a supporting position supporting the profiling pin by the abutment support and a non-supporting position receding the abutment support away from a locus of movement of the profiling pin. The second cam plate is periodically movable in a forward direction and in a reverse direction by the movement means with a pre-set phase difference relative to the first cam plate. When the movement means performs a forward periodic movement and the first cam plate is horizontally moved from the initial position to the operative position, the second cam plate is at the supporting position during the time the profiling pin passes through the branching point, thereby guiding the profiling pin to the first inclined section contiguous to the second horizontal section. When the movement means performs a reverse periodic movement and the first cam plate is horizontally moved from the initial position to the operative position, the second cam plate is at the non-supporting position during the time the profiling pin passes through the branching point, thereby guiding the profiling pin to the second inclined section contiguous to the third horizontal section.

The recording and/or reproducing apparatus also includes a movement device having a profiling pin inserted into a guide slit formed in an object to be moved from one to the opposite side. The profiling pin is movable only in a direction along the guide slit. The recording and/or reproducing apparatus also includes biasing means for biasing the object towards the one side, a first cam plate having at least one first halt portion formed in a direction substantially normal to the guide slit, a second halt portion contiguous to the first halt portion via a branching point and a first inclined section inclined relative to the direction of the guide slit, which second halt portion is closer to the opposite side than the first halt portion, and a third halt portion contiguous to the first halt portion via the branching point and a second inclined section inclined relative to the direction of the guide slit, which third halt portion is closer to the one side than the first halt portion. The first cam plate moves the profiling pin in a direction substantially normal to the guide slit between an initial position abuttingly supporting the profiling pin by the first halt portion and an operative position abuttingly supporting the profiling pin by the second halt portion or by the third halt portion. The recording and/or reproducing apparatus also includes movement means for periodically moving the first cam plate in reciprocation in a forward direction and in a reverse direction between the initial position and the operative position, and a second cam plate having at least one abutment support and being movable by the abutment support in a direction substantially normal to the guide slit between a supporting position abuttingly supporting the profiling pin by the abutment support and a non-supporting position receding the abutment support away from the locus of movement of the profiling pin. The second cam plate is periodically movable by the movement means in reciprocation in a forward direction and in a reverse direction with a pre-set phase difference relative to the first cam. When the movement means performs a forward periodic movement and the first cam plate is moved from the initial position to the operative position, the second cam plate is at the supporting position during the time the profiling pin passes through the branching point, thereby prohibiting the profiling pin from being moved in one direction under the bias of the biasing means and guiding the profiling pin to the first inclined section contiguous to the second horizontal section. When the movement means performs a reverse periodic movement and the first cam plate is moved from the initial position to the operative position, the second cam plate is at the non-supporting position during the time the profiling pin passes through the branching point, thereby enabling the profiling pin to be moved in one direction under the bias of the biasing means and guiding the profiling pin to the second inclined section contiguous to the third horizontal section.

The movement means in the present recording and/or reproducing apparatus has a rotatable cam member and rotational driving means for selectively rotating the rotatable cam member in a forward direction or in a reverse direction. The rotatable cam member has a first cam section for moving the first cam plate and a second cam section for moving the second cam plate.

The abutment support of the second cam plate in the present recording and/or reproducing apparatus is a side edge portion of a lug having its one end supported by a main portion of the second cam plate and having its opposite end as a free end. The second cam plate is moved in reciprocation with a period equal to one-half the period of the movement of the first cam plate in a forward direction or in a reverse direction.

The present recording and/or reproducing apparatus includes a recording disc holding unit holding plural recording discs in tiers, transporting means for transporting one of recording discs held in the recording disc holding unit for loading on the recording and/or reproducing unit, and a movement device for moving the transporting means between positions associated with the recording discs for causing the transporting means to select one of the recording discs. The transporting means is driven by a first motor and the movement means is driven by a second motor.

The disc loading device includes a cartridge holder for holding a disc cartridge comprised of a recording disc housed within a cartridge main member, a recording and/or reproducing unit for recording/reproducing information signals on or from the recording disc and transport means for transporting the cartridge holder in one direction or towards the recording and/or reproducing unit. The transport means moves the recording and/or reproducing unit since a mid point of the transport process for the cartridge holder in synchronism with transport of the cartridge holder. The transport means moves the recording and/or reproducing unit via cam means for loading the disc cartridge held by the cartridge holder on the recording and/or reproducing unit.

With the present disc loading device, the transport mechanism for transporting the cartridge holder holding the disc cartridge in one direction towards the recording and/or reproducing unit moves the recording and/or reproducing unit since a mid point of the transport process for the cartridge holder in synchronism with transport of the cartridge holder for loading the disc cartridge held by the cartridge holder on the recording and/or reproducing unit. Thus the transporting mechanism completes the loading operation by movement in one direction by a sole motor.

The transport means in the disc loading device further transports the cartridge holder and the recording and/or reproducing unit in one direction for approaching a magnetic head carried by the recording and/or reproducing unit towards the recording disc of the disc cartridge.

In such case, the transporting mechanism completes the loading operation and the changeover between the recording mode and the reproducing mode by movement in one direction by a sole motor.

The transport means in the disc loading device opens a shutter member of the disc cartridge held in the cartridge holder as the cartridge holder is transported in one direction.

In such case, the transporting mechanism completes the loading operation and the changeover between the recording mode and the reproducing mode as well as the shutter opening/closure by movement in one direction by a sole motor.

Thus the present invention provides a disc loading device which is simple in construction and easy to assemble while being able to be reduced in size.

The cartridge holder in the disc loading device has a holding member for holding a disc cartridge inserted therein from the front side. The disc cartridge is comprised of a recording disc housed within a cartridge main member and has a shutter member on a lateral side thereof normal to the inserting direction. The shutter member is slidable in the inserting direction for opening or closing an aperture, a slider slidably mounted on the holding member, a retention member provided on the slider for retaining the disc cartridge inserted into the holding member relative to the slider, and a shutter engagement member movably mounted on the holding member and moved in unison with the slider for being engaged with the shutter member. The slider engages the shutter engagement member with the shutter member of the disc cartridge inserted into the holding member for moving the disc cartridge to a closure position of the shutter member.

The holding member is movably supported by a chassis member and the shutter engagement member is engaged with the chassis member when the shutter engagement member is disengaged from the shutter member.

With the present disc loading device, a plurality of the cartridge holders are housed and held within a disc stocker in tiers, and the transporting means are arranged for movement between positions associated with the disc cartridges held in the disc stocker and for selecting and transporting one of the cartridge holders for loading on the recording and/or reproducing unit.

The disc loading device includes a recording disc holding unit holding plural recording discs in tiers, transporting means for transporting one of recording discs held in the recording disc holding unit for loading on the recording and/or reproducing unit, and a movement device for moving the transporting means between positions associated with the recording discs for causing the transporting means to select one of the recording discs. The transporting means is driven by a first motor and the movement mans is driven by a second motor.

The cartridge holder according to the present invention includes a holding member for holding a disc cartridge inserted therein from the front side. The disc cartridge is comprised of a recording disc housed within a cartridge main member having a shutter member on its lateral side normal to the inserting direction. The shutter member is slidable in the inserting direction for opening or closing an aperture. A slider is slidably mounted on the holding member, and a retention member is provided on the slider for retaining the disc cartridge inserted into the holding member relative to the slider. A shutter engagement member is movably mounted on the holding member and moved in unison with the slider for being engaged with the shutter member. The slider engages the shutter engagement member with the shutter member of the disc cartridge inserted into the holding member for moving the disc cartridge to a closure position of the shutter member.

With the present cartridge holder, the slider mounted for sliding in the fore-and-aft direction on a holding member holding the disc cartridge inserted from the front side is engaged with the shutter member of the disc cartridge inserted into the holder member by movement of the shutter engagement member movably mounted on the holding member. The slider moves the disc cartridge to a position of opening of the shutter member. The disc cartridge houses a recording disc and has the shutter member on its lateral side extending in the inserting direction, with the shutter member being slidable along the inserting direction for opening or closing an aperture in the disc cartridge.

Thus, with the present cartridge holder, the disc cartridge can be held with the shutter member remaining in the closure state.

That is, according to the present invention, the disc cartridge may be maintained under the state of optimum storage by holding the disc cartridge without opening the shutter member.

The holding member of the cartridge holder is movably supported by a chassis member and the shutter engagement member is engaged with the chassis member when the shutter engagement member is disengaged from the shutter member.

In such case, the cartridge holder is movable relative to the chassis member under the opening state of the shutter member, while being prohibited from being moved relative to the chassis member when the disc cartridge is held with the shutter member in the closed state.

Thus, when the cartridge holder is applied to the disc changer device, it becomes possible for the transporting device of the disc changer device to transport the disc cartridge held by the cartridge holder along with the cartridge holder, thus rendering it possible to simplify the construction of the disc changer device.

That is, when applied to the disc changer device, the present invention provides a cartridge holder which renders it possible to facilitate assembling of the disc changer device without complicating the construction of the disc changer device.

The disc changer device according to the present invention includes a recording disc holding unit holding plural recording discs in tiers, transporting means for transporting one of recording discs held in the recording disc holding unit for loading on the recording and/or reproducing unit, and a movement device for moving the transporting means between positions associated with the recording discs for causing the transporting means to select one of the recording discs. The transporting means is driven by a first motor and the movement means is driven by a second motor.

With the present disc changer device, the transporting mechanism for transporting one of the recording discs held by the recording disc holding unit holding plural recording discs in tiers and for loading the transported recording disc on the recording and/or reproducing unit is driven by a first motor, while the movement mechanism for moving the transporting mechanism across the positions facing the recording discs is driven by a second motor.

Consequently, with the present disc changer device, the operations of selecting the recording disc, transporting the selected recording disc and loading the transported disc on the recording and/or reproducing unit can be performed by two motors.

Thus the present invention provides a disc changer device capable of satisfactorily recording and/or reproducing information signals on or from plural recording discs despite the small-sized and simplified construction and facilitated assembling.

The movement device of the disc changer device includes a profiling pin inserted into a guide slit formed in an object to be moved for extending in an up-and-down direction so that the profiling pin is movable only in the up-and-down direction, a first cam plate having at least one first horizontal section, a second horizontal section contiguous to the first horizontal section via a branch point and a first inclined section and lying above the first horizontal section and a third horizontal section contiguous to the first horizontal section via the branch point and a second inclined section and lying below the first horizontal section. The first cam plate is horizontally movable between an initial position positioning the profiling pin at the first horizontal section and an operative position positioning the profiling pin at the second position or the third position, movement means for periodically moving the first cam plate in reciprocation in a forward direction and in a reverse direction between the initial position and the operative position, and a second cam plate having at least one horizontal abutment support and being horizontally movable between a supporting position supporting the profiling pin by said abutment support and a non-supporting position receding the abutment support away from a locus of movement of the profiling pin. The second cam plate is periodically movable in reciprocation in a forward direction and in a reverse direction by the movement means with a pre-set phase difference relative to the first cam plate. When the movement means performs a forward periodic movement and the first cam plate is horizontally moved from the initial position to said operative position, the second cam plate is at the supporting position during the time the profiling pin passes through the branching point, thereby guiding the profiling pin to the first inclined section contiguous to the second horizontal section. When the movement means performs a reverse periodic movement and the first cam plate is horizontally moved from the initial position to the operative position, the second cam plate is at the non-supporting position during the time the profiling pin passes through the branching point, thereby guiding the profiling pin to the second inclined section contiguous to the third horizontal section.

The disc changer device has a movement device includes a profiling pin inserted into a guide slit formed in an object to be moved for extending from one to the opposite side. The profiling pin is movable only in a direction along the guide slit. The disc changer device also includes biasing means for biasing the object towards the one side, a first cam plate having at least one first halt portion formed in a direction substantially normal to the guide slit, a second halt portion contiguous to the first halt portion via a branching point and a first inclined section inclined relative to the direction of the guide slit, and a third halt portion contiguous to the first halt portion via the branching point and a second inclined section inclined relative to the direction of the guide slit. The second halt portion is closer to the opposite side than the first halt portion, while the third halt portion is closer to the one side than the first halt portion. The first cam plate moves the profiling pin in a direction substantially normal to the guide slit between an initial position abuttingly supporting the profiling pin by the first halt portion and an operative position abuttingly supporting the profiling pin by the second halt portion or by the third halt portion. The disc changer device also includes movement means for periodically moving the first cam plate in reciprocation in a forward direction and in a reverse direction between the initial position and the operative position, and a second cam plate having at least one abutment support and being movable by the abutment support in a direction substantially normal to the guide slit between a supporting position abuttingly supporting the profiling pin by the abutment support and a non-supporting position receding the abutment support away from the locus of movement of the profiling pin. The second cam plate is periodically movable by the movement means in reciprocation in a forward direction and in a reverse direction with a pre-set phase difference relative to the first cam. When the movement means performs a forward periodic movement and the first cam plate is moved from the initial position to the operative position, the second cam plate is at the supporting position during the time the profiling pin passes through the branching point, thereby prohibiting the profiling pin from being moved in one direction under the bias of the biasing means and guiding the profiling pin to the first inclined section contiguous to the second horizontal section. When the movement means performs a reverse periodic movement and the first cam plate is moved from the initial position to the operative position, the second cam plate is at the non-supporting position during the time the profiling pin passes through the branching point, thereby enabling the profiling pin to be moved in one direction under the bias of the biasing means and guiding the profiling pin to the second inclined section contiguous to the third horizontal section.

In the above disc changer device of the present invention, the movement means has a rotatable cam member and rotational driving means for selectively rotating the rotatable cam member in a forward direction and in a reverse direction. The rotatable cam member has a first cam section for moving a first cam plate and a second cam section for moving a second cam plate.

In he above disc changer device of the present invention, the abutment support of the second cam plate is a side edge of a lug having one end supported by a main member of the second cam plate and having the opposite end as a free end. The second cam plate is moved in reciprocation in a forward direction and in a reverse direction with a period equal to one-half the period of reciprocating movement of the first cam plate.

BRIEF DESCRIPTION OF THE DRAWINGS

FIG. 48 is a side view showing the state of each cam plate when the driving gear in the movement device shown in FIG. 25 is rotated through 345°.

FIG. 122 is a side view showing the state in which each rotary link has been rotated by three-fourths in the movement device shown in FIG. 119.

FIG. 123 is a side view showing the state in which movement of each rotary link has been completed in the movement device shown in FIG. 119.

FIG. 124 is a schematic showing an arrangement of a sixth example of the conventional movement device in its initial state.

FIG. 125 is side view showing the state in which a Geneva wheel in the movement device shown in FIG. 124 is rotated through 15°.

FIG. 128 is side view showing the state in which the Geneva wheel in the movement device shown in FIG. 124 is rotated through 30°.

FIG. 127 is side view showing the state in which the Geneva wheel in the movement device shown in FIG. 124 is rotated through 45°.

FIG. 128 is side view showing the state in which the Geneva wheel in the movement device shown in FIG. 124 is rotated through 60°.

FIG. 129 is side view showing the state in which the Geneva wheel in the movement device shown in FIG. 124 is rotated through 75°.

FIG. 130 is side view showing the state in which the Geneva wheel in the movement device shown in FIG. 124 is rotated through 90°.

FIG. 131 is side view showing the state in which the Geneva wheel in the movement device shown in FIG. 124 is rotated through 105°.

FIG. 132 is side view showing the state in which the Geneva wheel in the movement device shown in FIG. 124 is rotated through 120°.

FIG. 133 is side view showing the state in which the Geneva wheel in the movement device shown in FIG. 124 is rotated through 135°.

Figure 124:
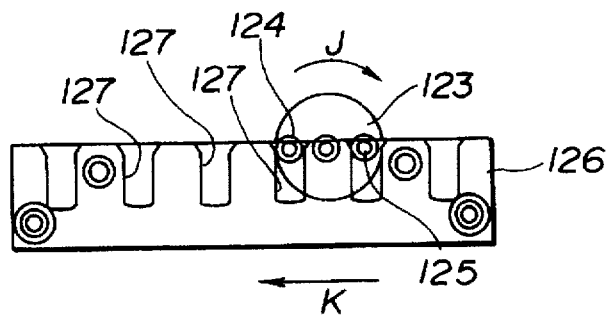
Figure 125:
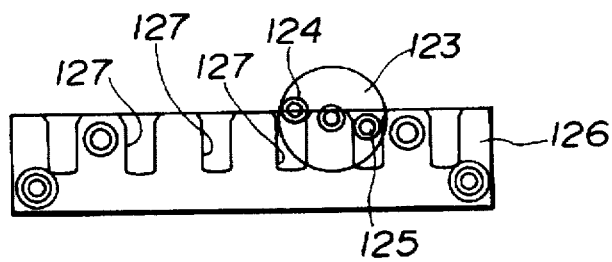
Figure 126:
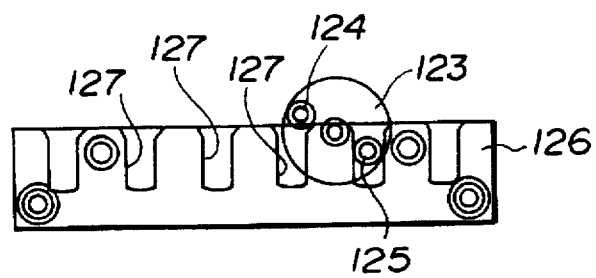
Figure 127:
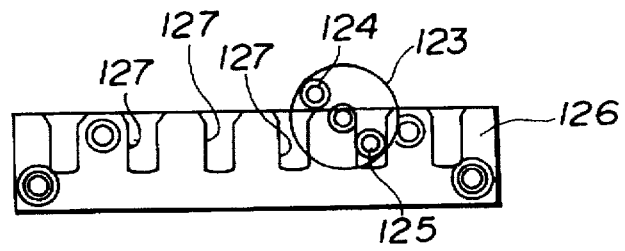
Figure 128:
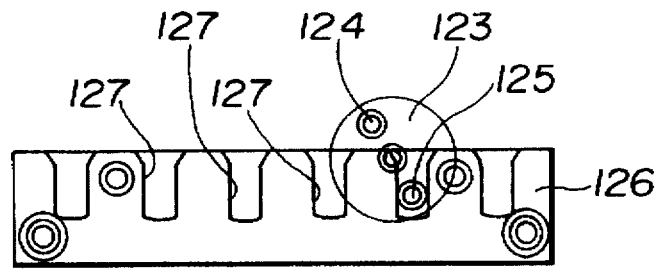
Figure 129:
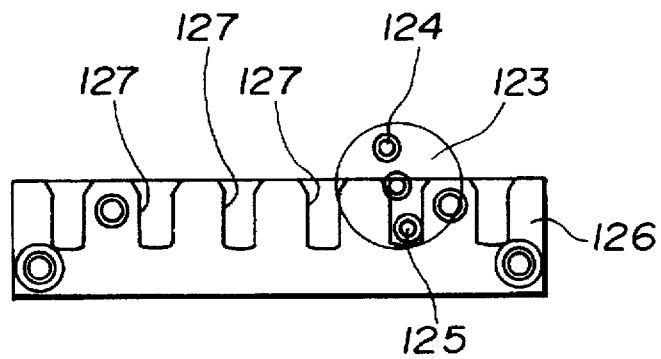
Figure 130:
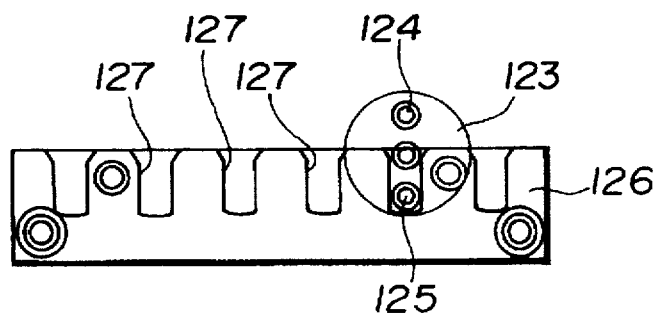
Figure 131:
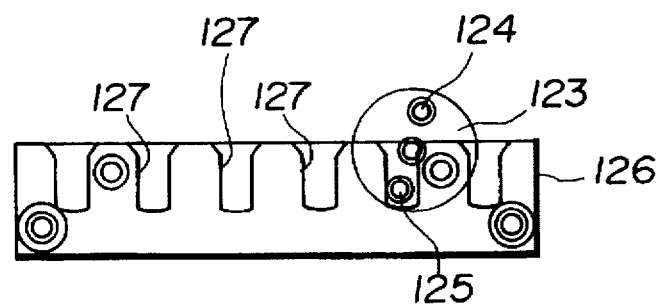
Figure 132:
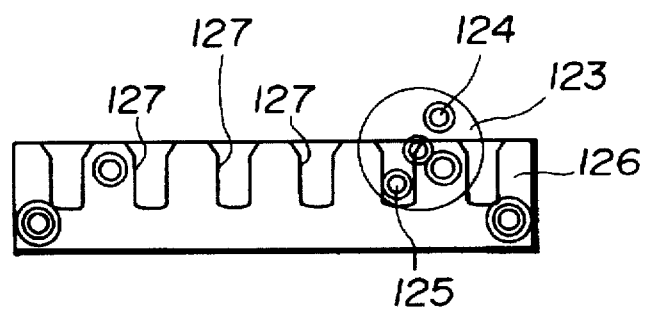
Figure 133:
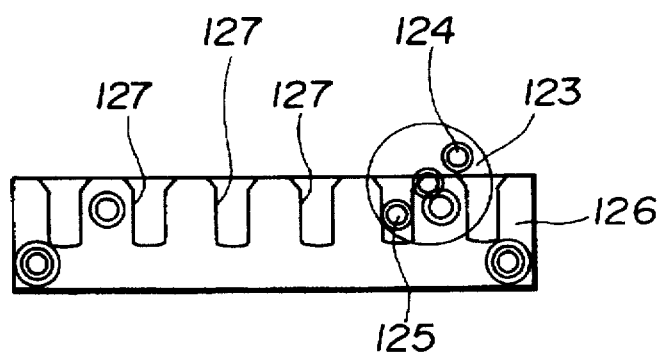
Figure 134:
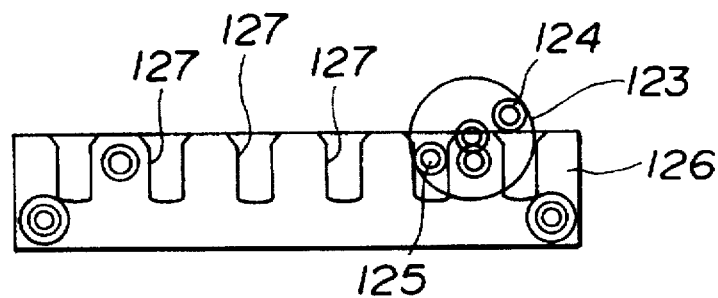

FIG. 134 is side view showing the state in which the Geneva wheel in the movement device shown in FIG. 124 is rotated through 150°.

Figure 135:
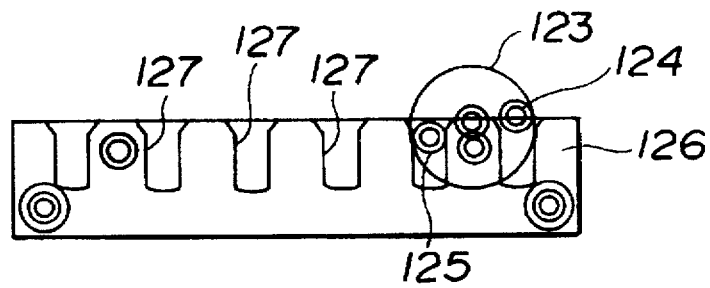

FIG. 135 is side view showing the state in which the Geneva wheel in the movement device shown in FIG. 124 is rotated through 165°.

Figure 136:
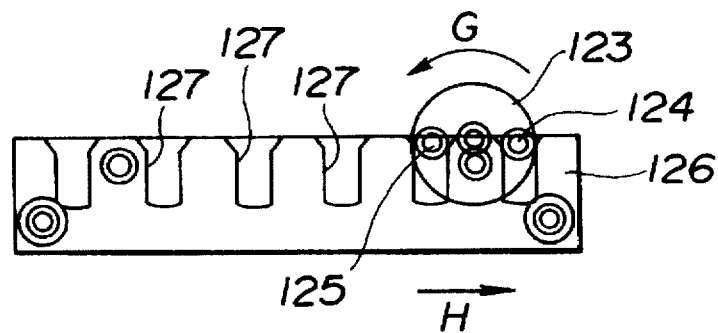

FIG. 136 is side view showing the state in which the Geneva wheel in the movement device shown in FIG. 124 is rotated through 180°.

BEST MODE FOR CARRYING OUT THE INVENTION

Referring to the drawings, preferred embodiments of the present invention will be explained in detail.

The movement device according to the present invention is adapted to move an object on a straight trajectory within a pre-set range. In the present embodiment, the movement device according to the present invention is designed as a device for vertically moving an object 11. Thus the object 11 is biased downward under the effect of gravity.

The object 11 has on its both lateral sides a forward pair and a rear pair of profiling pins 12, 13, 12 and 13. The object 11 is arranged between a pair of sidewall sections 1, 2 set upright on a base plate 10 parallel to each other. The sidewall sections 1, 2 are each formed with a forward pair and a rear pair of guide slits 8, 9, 8 and 9, which are formed as vertically extending straight slits. The profiling pins 12, 13, 12 and 13 are introduced into the slits 8, 9, 8 and 9. Thus the object 11 is vertically movable within a range of possible movement of the profiling pins 12, 13, 12 and 13 in the guide slits 8, 9, 8 and 9, as indicated by arrows D and C in FIG. 2.

Figure 1:
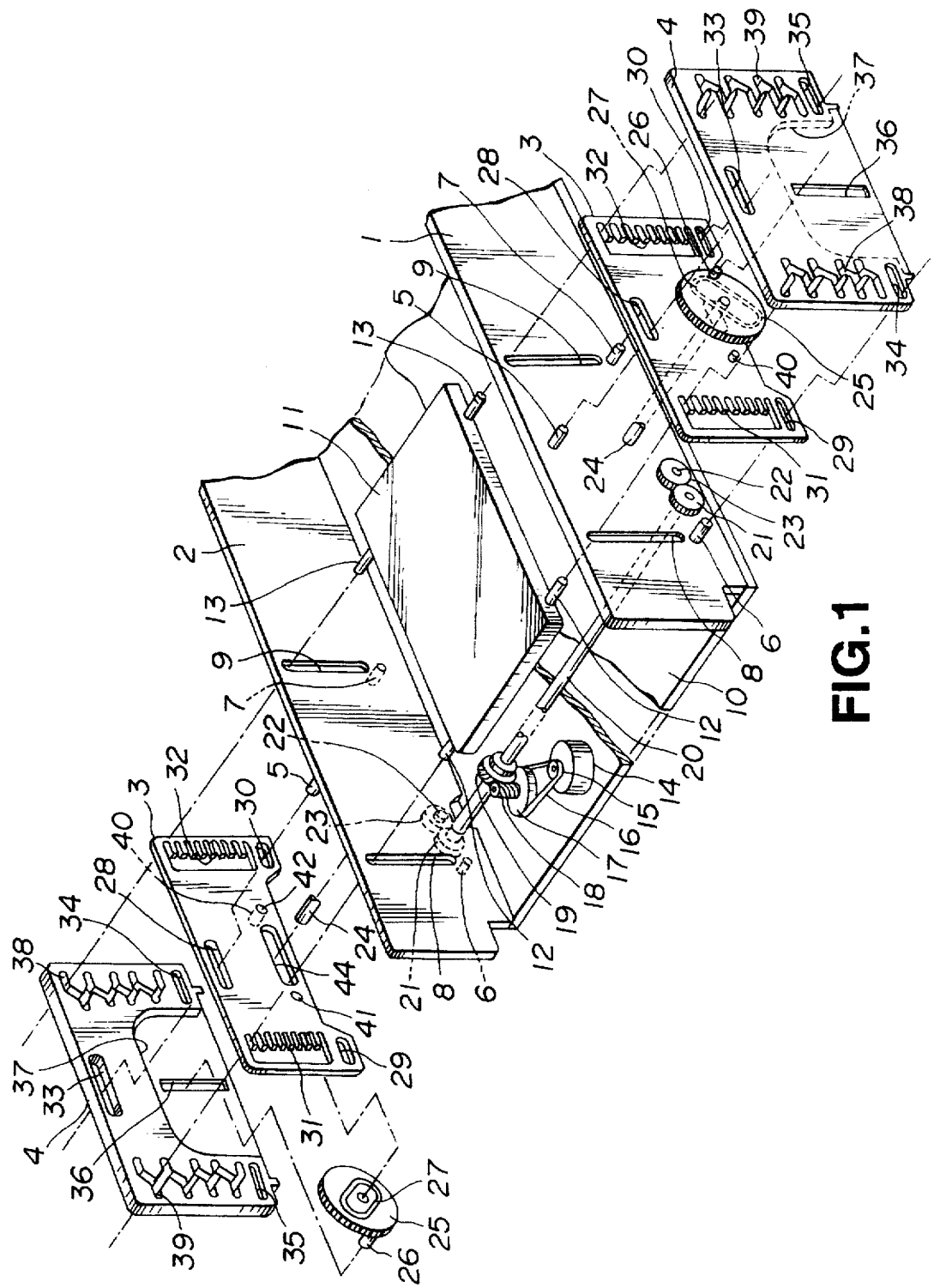
FIG. 1 is an exploded perspective view showing an arrangement of a movement device according to the present invention.
Figure 2:
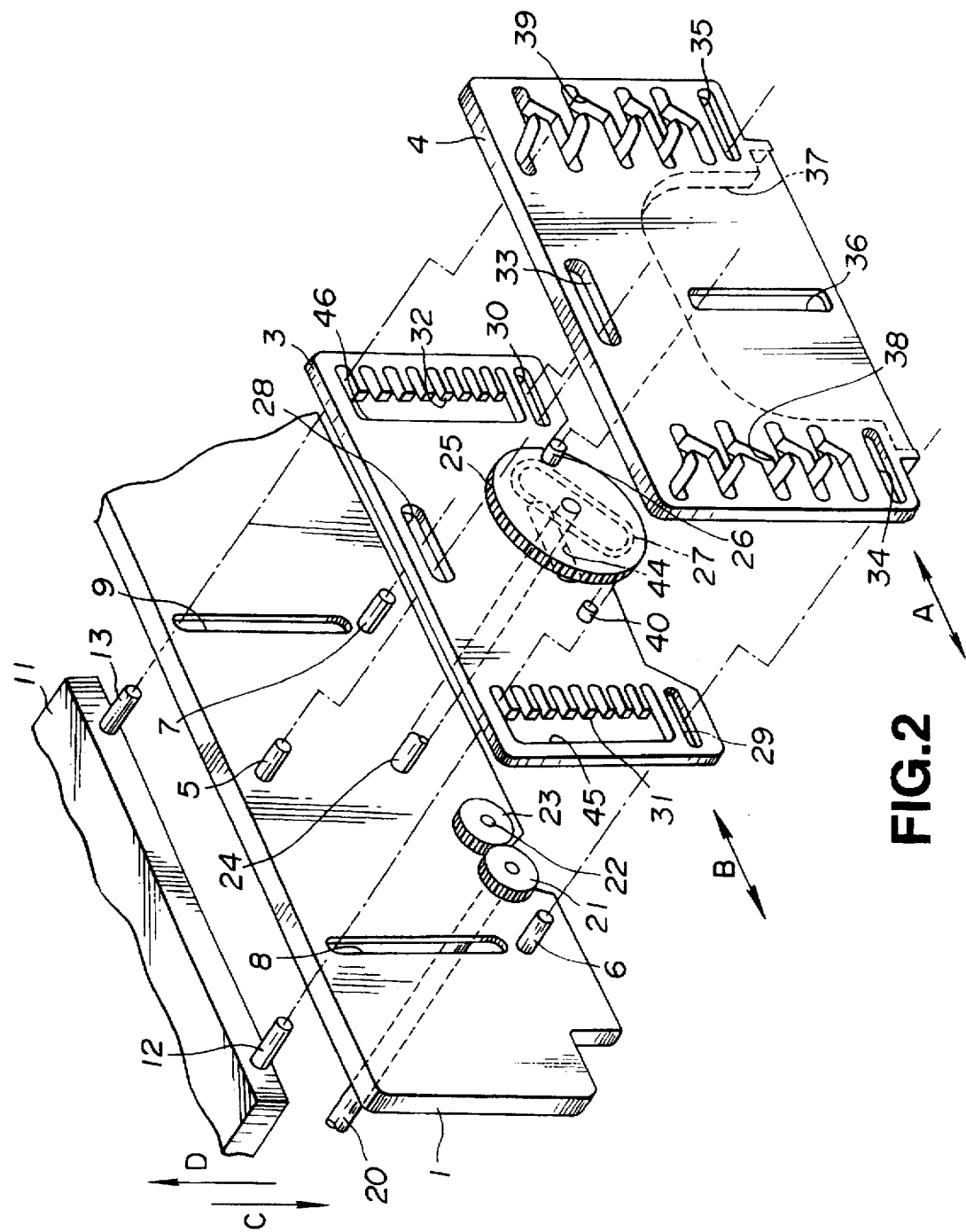
FIG. 2 is an enlarged exploded perspective view showing essential portions of an arrangement of the movement device.
Figure 3:
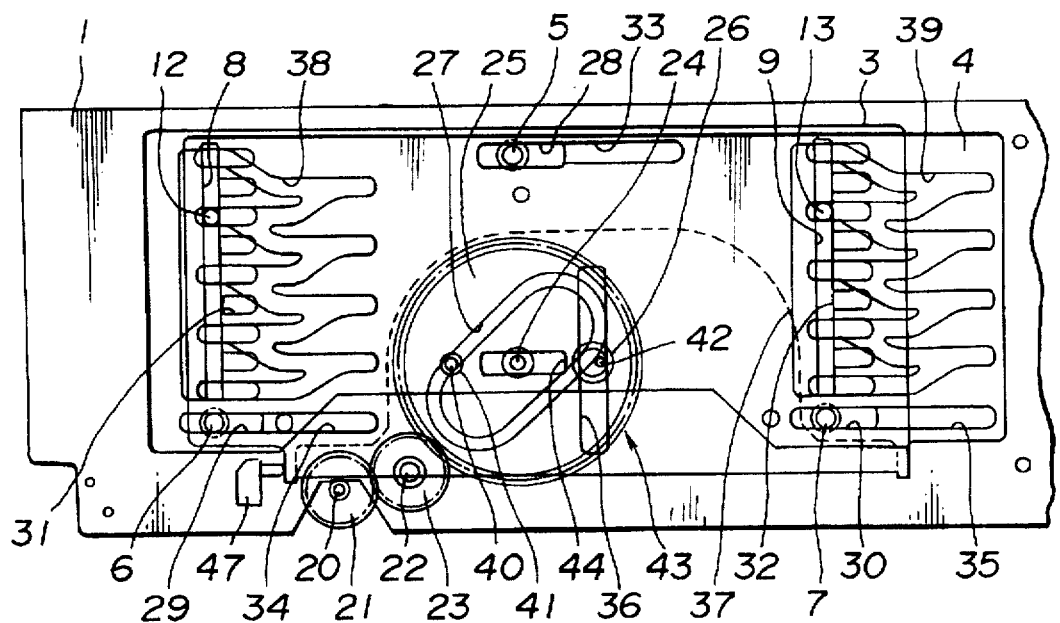
FIG. 3 is a side view, partially broken away, showing essential portions of the movement device.
Figure 4:
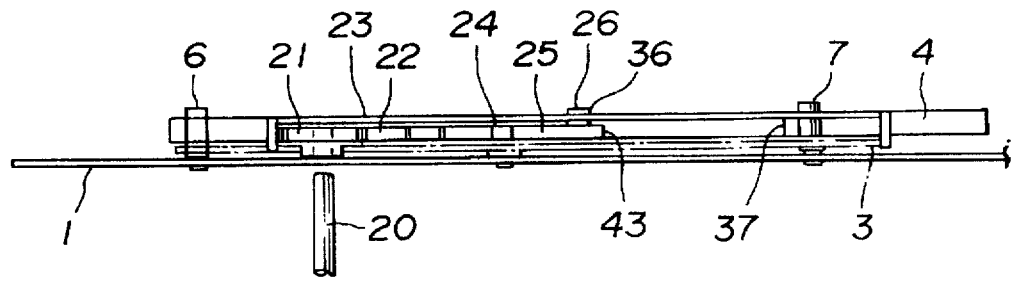
FIG. 4 is a plan view, partially broken away, showing essential portions of the movement device.
Figures 5, 6, 7:
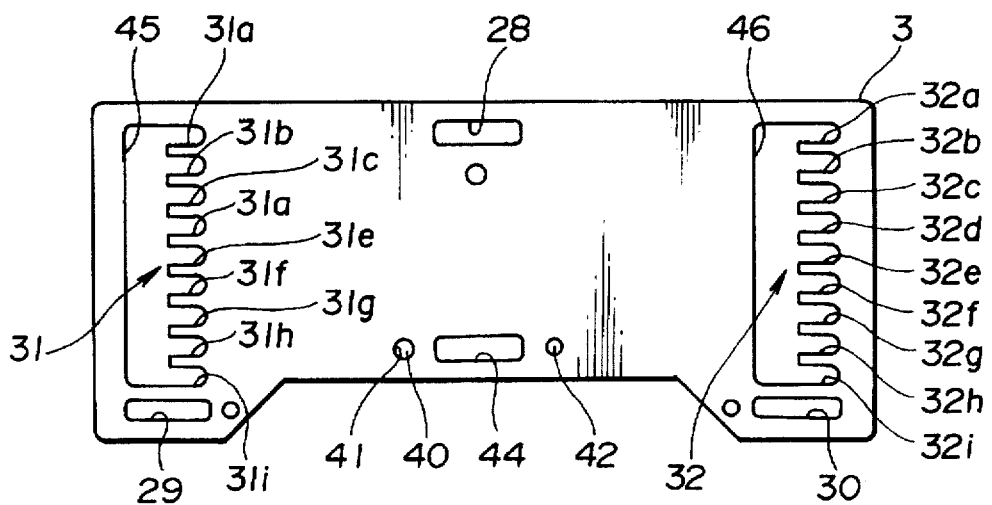
FIG. 5 is a side view showing a second cam plate of the movement device.
FIG. 6 is a side view showing a first cam plate of the movement device.
FIG. 7 is a plan view showing the shape of the first cam plate.

On the outer sides of the sidewall sections 1 and 2 are mounted a left side pair and a right side pair of first and second cam plates 4, 3, 4 and 3 for movement in the fore-and-aft direction. The first cam plate 4 is substantially planar and has a central upper supporting slit 33 and lower lateral supporting slits 34, 35, as shown in FIGS. 6 and 7. On the sidewall section 1 are formed outwardly extending supporting stud pins 5, 6 and 7, as shown in FIGS. 2 to 4.

These stud pins 5 to 7 are passed through the supporting slits 33 to 35 for supporting the first cam plate 4 for sliding in the fore-and-aft direction. The first cam plate 4 is movable a distance corresponding to the length of the supporting slits 33 to 35. Similarly to the sidewall section 2, the opposite sidewall section 2 also has supporting stud pins 5, 6 and 7 for supporting the first cam plate 4 for movement in the fore-and-aft direction. These first cam plates 4, 4 are of the same shape and are mounted with the back sides thereof directed to the sidewall sections 1 and 2.

A forward pair and a rear pair of cam slits 38, 39 similar in contour to each other are formed in both lateral sides of the first cam plate 4. These cam slits 38, 39 are each zigzag-shaped by having plural horizontal sections (halt portions) 38a, 38b, 38c, 38d, 38e, 38f, 38g, 38h, 38i, 39a, 39b, 39c, 39d, 39e, 39f, 39g, 39h, 39i and inclined sections sequentially interconnecting these horizontal sections. The horizontal sections 38a, 38b, 38c, 38d, 38e, 38f, 38g, 38h, 38i are different in height level and staggered in the fore-and-aft direction.

That is, if, with the forward side cam slit 38, the second highest horizontal section 38b is the first horizontal section, the highest horizontal section 38a communicates with the first horizontal section 38b via a branching point and a first inclined section. The highest horizontal section 38a is higher in height level than the first horizontal section 38b. Thus the highest horizontal section 38a is the second horizontal section. The first horizontal section 38b, lower in height than the second horizontal section 38a, communicates with the third highest horizontal section 38c via the branching point and a second inclined section. Thus the third highest horizontal section 38c is the third horizontal section. The same holds true for the remaining horizontal sections 38c to 38h (the lowest horizontal section 38i is excluded). That is, if any of these sections is the first horizontal section, the first horizontal section communicates with a second horizontal section via a branching point and a first inclined section and with a third horizontal section via the branching point and a second inclined section. The same holds true for the rear side cam slit 39.

These first cam plates 4, 4 are movable between a rear position or an initial position in which the forward side horizontal sections 38a, 38c, 38e, 38g, 38i, 39a, 39c, 39e, 39g and 39i of the cam slits 38, 39 are superimposed on the guide slits 8, 9 and a forward position or an operative position in which the rear side horizontal sections 38b, 38d, 38f, 38h, 39b, 39d, 39f, 39h of the cam slits 38, 39 are superimposed on the guide slits 8, 9.

The second cam plate 3 is substantially planar and similar in size to the first cam plate 4, and has an upper central supporting slit 28 and lower both side supporting slits 29, 30, as shown in FIG. 5. The supporting stud pins 5, 6, 7 are passed through these supporting slits 28, 29, 30 for supporting the second cam plate 3 for sliding in the fore-and-aft direction. That is, the distance of possible movement of the second cam plate 3 corresponds to the length of each of the supporting slits 28, 29, 30. On the opposite sidewall section 2, similarly to the sidewall section 1, the second cam plate 3 is supported by the supporting stud pins 5, 6, 7 for movement in the fore-and-aft direction. These second cam plates 3, 3 are similar to each other in shape and are mounted with the respective back sides facing the sidewall sections 1, 2. These second cam plates 3, 3 are interposed between the first cam plates 4, 4 and the sidewall sections 1, 2.

Each of the second cam plates 3, 3 has a forward set and a rear set of abutting supporting pieces 31, 32. These abutting supporting pieces 31, 32 are formed the rear edges of through-holes 45, 46 formed in the second cam plate 3. These sets of abutting supporting pieces 31, 31 are each similar in shape to each other and are each composed of plural abutting supporting pieces. Each abutting supporting piece has its proximal side integrally connected to and supported by the main member of the second cam plate 3 and has its distal free end protruded into each of the through-holes 45, 46. Thus the sets of the abutting supporting pieces 31, 32 are each comb-shaped. Each abutting supporting piece has its upper end formed as abutment supports 31a, 31b, 31c, 31d, 31e, 31f, 31g, 31h, 31i, 32a, 32b, 32c, 32d, 32e, 32f, 32g, 32h and 32i. These abutting supports 31a, 31b, 31c, 31d, 31e, 31f, 31g, 31h, 31i, 32a, 32b, 32c, 32d, 32e, 32f, 32g, 32h and 32i are of height levels corresponding to those of the horizontal sections 39a, 39b, 39c, 39d, 39e, 39f, 39g, 39h, 39i of the first cam plate 4.

These second cam plates 3, 3 may be moved between a forward side position, that is a supporting position, of superimposing the abutting supports 31a, 31b, 31c, 31d, 31e, 31f, 31g, 31h, 31i, with the guide slits 8, 9, and a rear position, that is a non-supporting position, of receding the abutting supports 31a, 31b, 31c, 31d, 31e, 31f, 31g, 31h, 31i towards the back side of the guide slits 8, 9.

A lower mid side of the second cam plate 3 is provided with a slit 44 through which a support shaft 24 of a rotary cam member 25 as later explained is passed and a profiling pin 40 engaged for profiling movement in a cam groove 27 in the rotary cam member 25.

The profiling pins 12, 13, 12, 13 are passed through the guide slits 8, 9, 8, 9 and through the through-holes 45, 46, 45, 46 in the second cam plates 3, 3 and the cam slits 38, 39, 38, 39 of the first cam plates 4, 4.

The movement device is provided with movement means composed of a left pair and a right pair of rotary cam members 25, 25, rotatably mounted on the sidewall sections 1, 2 via supporting shafts 24, 24 and a motor 14 as rotational driving means for the rotary cam members 25, 25.

Figure 8:
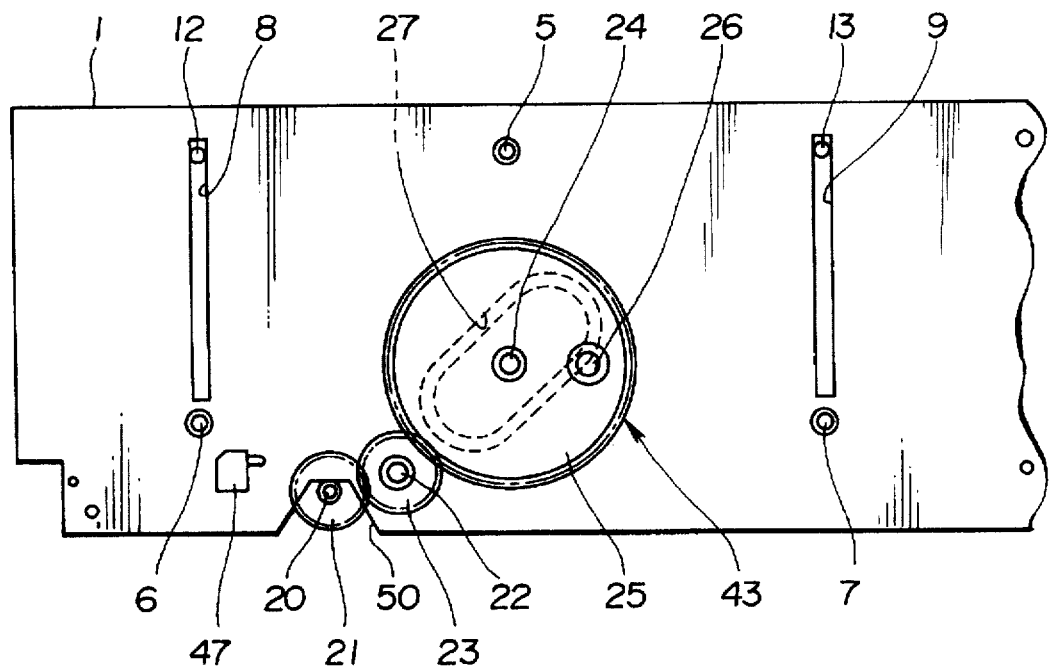
FIG. 8 is a side view, partially broken away, showing an arrangement of movement means constituting the movement device.
Figure 9:
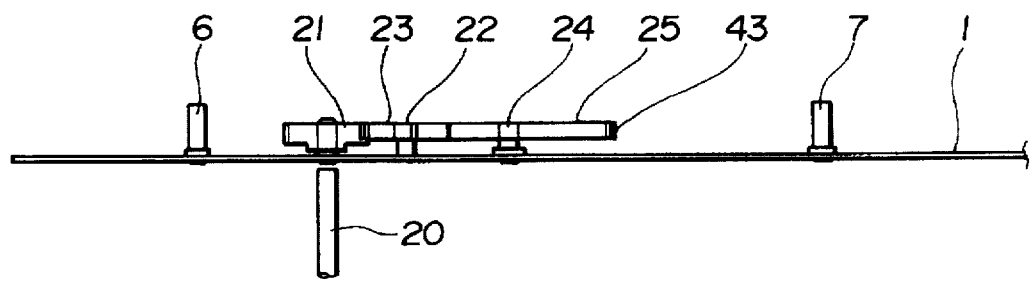
FIG. 9 is a plan view, partially broken away, showing an arrangement of the movement means.
Figure 10:
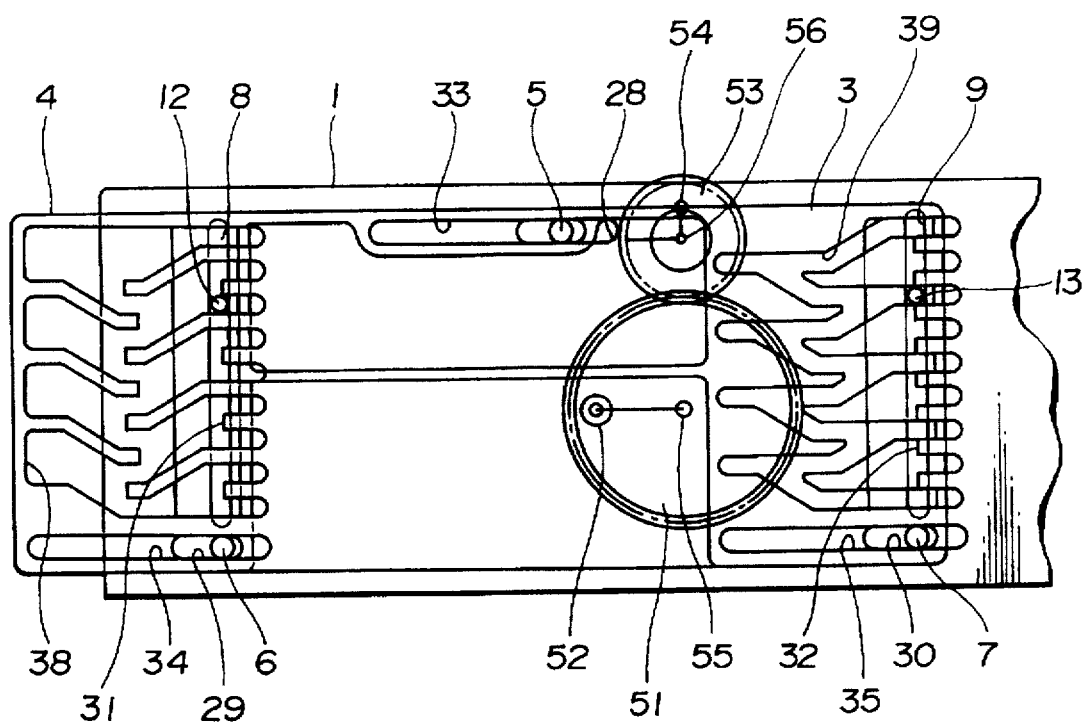
FIG. 10 is a side view, partially broken away, showing an arrangement of a modified movement device.

The motor 14 is mounted on the base 10. A driving pulley 15 is mounted on a driving shaft of the motor 14. An endless driving belt 16 is placed around the driving pulley 15. The endless driving belt 16 is placed around a follower pulley 17 rotatably mounted on the base 10. That is, the follower pulley 17 is rotated by the motor 14. A worm gear 18 is mounted as one and coaxially with the follower pulley 17. The worm gear 18 meshes with a worm wheel 19 mounted on a rotation transmitting shaft 20 mounted for rotation between the sidewall sections 1 and 2. The rotation transmitting shaft 20 has its both ends protruded outwardly of the sidewall sections 1 and 2 and first transmission gears 21, 21 are mounted on the protruded ends of the shaft 20, as shown in FIGS. 8 and 9. Each of the first transmission gears 21, 21 meshes with second transmission gears 23, 23 rotatably mounted on the sidewall sections 1, 2 via support shafts 22, 22. These first transmission gears 21, 21 are engaged in gears 43, 43 formed on the outer rims of the rotary cam members 25, 25. That is, the rotary cam members 25, 25 are run in rotation in the same direction (in the mutually reverse directions when looking from the side of the support shaft 24) by the motor 14 which is run in rotation.

The rotary cam members 25, 25 are arranged between the first cam plates 4, 3, 4, 3 by the support shafts 24, 24 being passed through the slits 44, 44 in the second cam plates 3, 3. On the surface of the rotary cam member 25 facing the back side of the first cam plate 4 is set a driving pin 28 acting as a first cam member. The driving pin 26 is passed through and engaged with a profiling slit 36 formed in an up-and-down direction at a mid portion of the first cam plate 4. That is, when the rotary cam members 25, 25 make one complete revolution, the first cam plates 4, 4 perform a complete revolution between the initial position and the operative position as indicated by arrow A in FIG. 2. The back surface of the first cam plate 4 is formed a recess 37 for avoiding abutment by the rotary cam member 25.

On the back sides of the rotary cam members 25, 25 facing the front surfaces of the second cam plates 3, 3 are formed the cam grooves 27, 27 acting as second cam members. These cam grooves 27, 27 are oval-shaped and include two distal points separated 180° from each other and two medial points separated 90° from these distal points and separated 180° from each other. The cam groove 27 is engaged by the profiling pin 40 set upright on the surface of the second cam plate 3. That is, when the rotary cam members 25, 25 complete one revolution, the second cam plates 3, 3 are reciprocated twice in the fore-and-aft direction between the supporting position and the non-supporting position as indicated by arrow B in FIG. 2.

Meanwhile, both sides of the second cam plate 3 may be used and, to this end, a pair of engagement openings 41, 42 are formed on both sides of the slit 44 in order to permit the profiling pins 40 to be set upright on both sides of the second cam plate. Specifically, the second cam plates 3, 3 are of the same shape and the cam plate 3 mounted on the sidewall section 1 has its front surface directed to the outer lateral side of the base 10 while the cam plate 3 mounted on the opposite sidewall section 2 has its back surface directed to the outer side of the base 10. The profiling pin 40 is set on one of the engagement holes 41, 42 and on the front or back surface of the second cam plate 3 depending on which of the sidewall sections 1, 2 the second cam plate 3 is mounted. That is, the profiling pin 40 is set in the rear engagement opening 41 in a direction towards the outer surface of the base 10 on the second cam plate 3 mounted on one of the sidewall sections 1, and in the front engagement opening 42 in a direction towards the outer surface of the base 10 on the second cam plate 3 mounted on the opposite sidewall sections 2.

Figure 51:
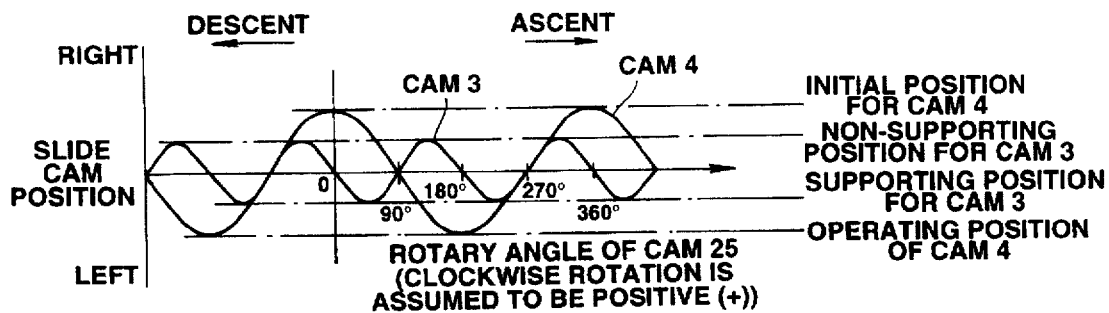
FIG. 51 is a graph showing the moved state of each phase-shifted cam plate in the movement device shown in FIGS. 1 to 24.
Figure 52:
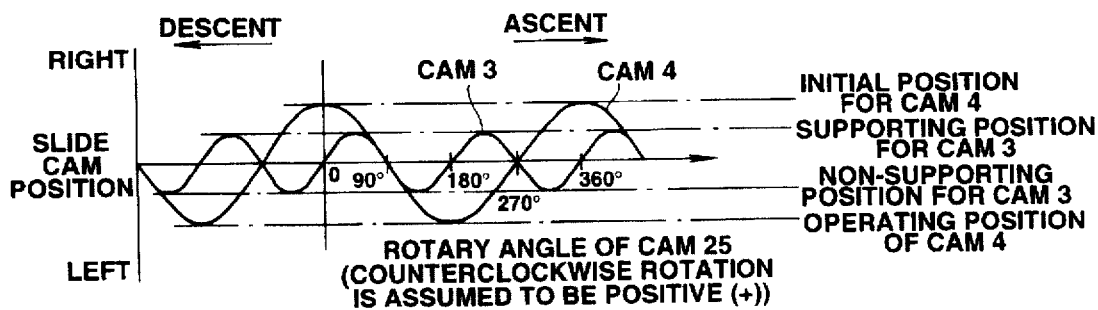
FIG. 52 is a graph showing the moved state of each cam plate in the movement device shown in FIGS. 1 to 24, with the phase-shift direction of each cam plate having been reversed.

The first and second cam plates 4, 3, 4, 3 are periodically reciprocated with a pre-set phase difference from each other by rotation of the rotatable cam members 25, 25. As regards the cam plates 3, 4 mounted on the sidewall section 1, if the rotary cam member 25 is rotated clockwise, there is produced a phase difference such that the maximum point of the sliding movement of the second cam plate 3, corresponding to the maximum rightward movement of the second cam plate to the non-supporting position, is delayed 45° in terms of the rotational angle of the rotary cam member 25 with respect to the maximum point of the sliding movement of the first cam plate 4 corresponding to the maximum rightward or leftward movement of the first cam plate 4 to the initial position or to the operative position, as shown in FIG. 51. As regards the cam plates 3, 4 mounted on the opposite sidewall section 2, if the rotary cam member 25 is rotated counterclockwise, there is produced a phase difference such that the maximum point of the sliding movement of the second cam plate 3, corresponding to the maximum rightward movement of the second cam plate to the supporting position, is advanced 45° in terms of the rotational angle of the rotary cam member 25 with respect to the maximum point of the sliding movement of the first cam plate 4 corresponding to the maximum rightward or leftward movement of the first cam plate 4 to the initial position or to the operative position, as shown in FIG. 52.

The sidewall section 1 or 2 is provided with a thrust switch 47 for detecting that the first cam plate 4 is at the initial position, as shown in FIG. 8. When the first cam plate 4 is at the above-mentioned initial position, the thrust switch 47 is thrust by a switch thrusting piece 48 or 49 protruded from the lower surface of the first cam plate 4 for detecting that the first cam plate 4 is not at the initial position. If the first cam plate 4 is not at the initial position, the thrust switch 47 is not thrust.

Figure 50:
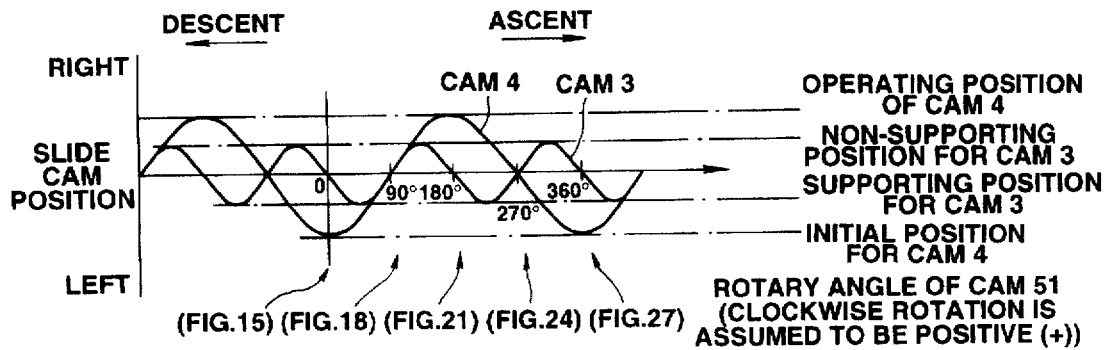
FIG. 50 is a graph showing the moved state of each cam plate in the movement device shown in FIGS. 1 to 24.

With the above-described movement device, the rotary cam member 25 may be replaced by first and second cam gears 51, 53 meshing with each other, as shown in FIGS. 10–24. In such case, the first cam plate 4 is periodically reciprocated by a driving pin 52 set upright on the first cam gear 51. The second cam plate 3 is periodically reciprocated by a driving pin 54 set upright on the second cam gear 54. The second cam gear 53 has the number of teeth equal to one-half that of the first cam gear 51 and hence is rotated at a period equal to one-half that of the first cam gear 51. Consequently, the operation of the cam plates 3 and 4 is similar to the operation of the movement device having the rotatable cam member 25. In this case, the first and second cam gears 51, 53 are rotated in mutually reverse directions. Consequently, as regards the cam plates 3, 4, if the first cam gear 51 is rotated clockwise, there is produced a phase difference such that the maximum point of the sliding movement of the second cam plate 3 corresponding to the maximum rightward movement of the second cam plate as far as the non-supporting position is delayed 45° in terms of the rotational angle of the first cam gear 51 with respect to the maximum point of sliding movement of the first cam plate 4 corresponding to the maximum rightward or leftward movement of the first cam plate as far as the above-mentioned initial position or the operative position, as shown in FIG. 50.

With the above-mentioned movement device having the first and second cam plates 4, 3, the object 11 is raised or lowered depending on whether the rotational driving direction of the motor 14 is positive or negative.

Figure 11:
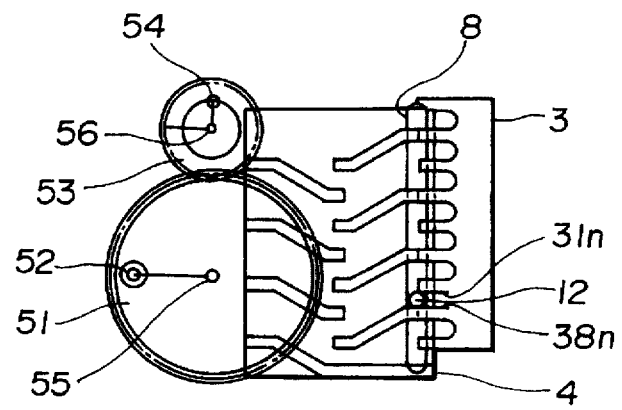
FIG. 11 is a side view showing the state of each cam plate in the initial state of the movement device.
Figure 12:
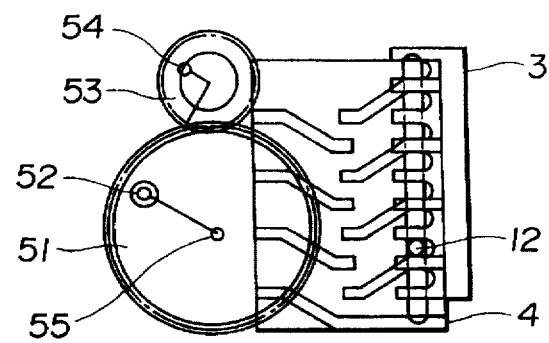
FIG. 12 is a side view showing the state of each cam plate when the driving gear in the movement device is rotated through FIG. 13 is a side view showing the state of each cam plate when the driving gear in the movement device ms rotated through 60°.
Figure 13:
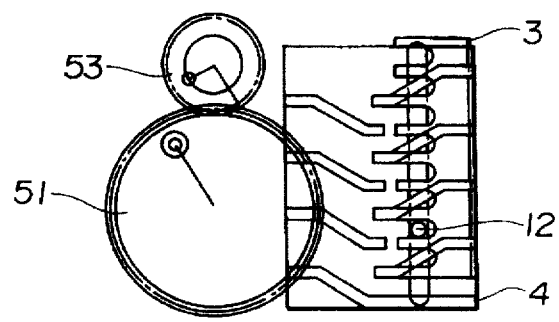

Specifically, it is assumed that, when the first cam gear 51 is at the initial position (0° position), the first cam plate 4 is at the initial position and the profiling pin 12 is positioned at the n'th horizontal section 38n of the cam slit 38, as shown in FIG. 11. If the fist cam gear 51 starts to be rotated and has assumed a position rotated clockwise 30°, the second cam plate 3 is at the above-mentioned support position, as shown in FIG. 12. That is, the profiling pin 12 is supported at the n'th abutting supporting section 31n. When the first cam gear 51 is at the 60° position, the second cam plate 3 is still at the above-mentioned support position, while the profiling pin 12 is still at the branch point of the cam slit 38, as shown in FIG. 13. However, the profiling pin 12 is supported by the n'th abutting support 31n without being moved downwards.

Figure 14:
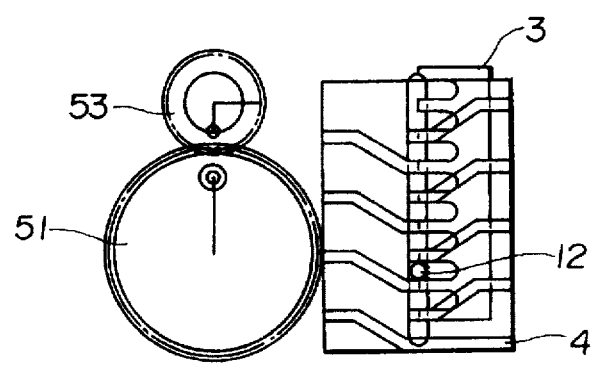
FIG. 14 is a side view showing the state of each cam plate when the driving gear in the movement device is rotated through 90°.
Figure 15:
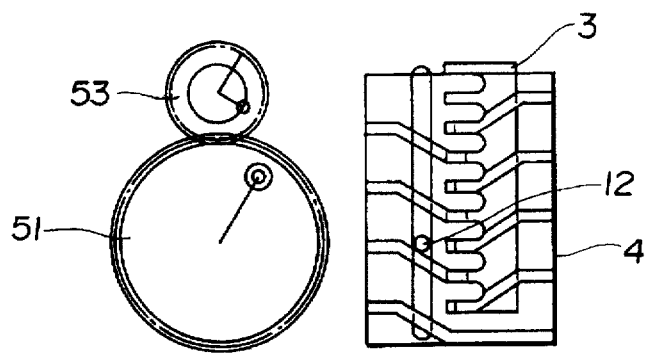
FIG. 15 is a side view showing the state of each cam plate when the driving gear in the movement device is rotated through 120°.
Figure 16:
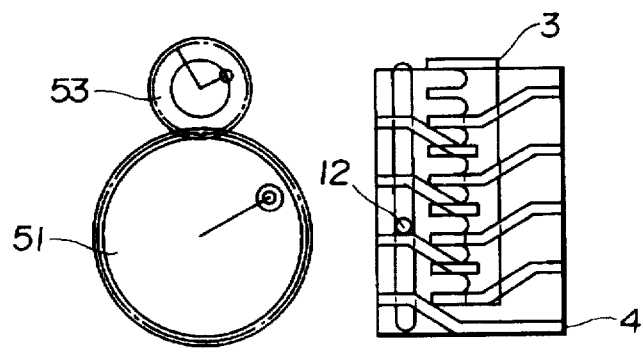
FIG. 16 is a side view showing the state of each cam plate when the driving gear in the movement device is rotated through 150°.

When the first cam gear 51 is at the 90° position, the second cam plate 3 is about to be moved away from the supporting position towards the non-supporting position, as shown in FIG. 14. The profiling pin 12 traverses the branch point of the cam slit 38 and is about to reach the first inclined section. When the first cam gear 51 reaches the 120° position, the profiling pin 12 traverses the branch point of the cam slit 38 and is supported on the first inclined section, as shown in FIG. 15. Since the second cam plate 3 is at the non-supporting position, the profiling pin 12 is moved upwards along the first inclined section. When the first cam gear 51 reaches the 150° position, the profiling pin 12 is at the second horizontal section 38(n–1), with the horizontal section 38n being assumed to be the first horizontal section, as shown in FIG. 18.

Figure 17:
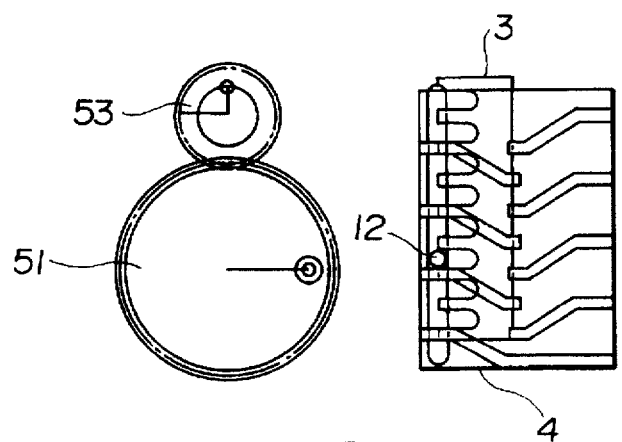
FIG. 17 is a side view showing the state of each cam plate when the driving gear in the movement device is rotated through 180°.
Figure 18:
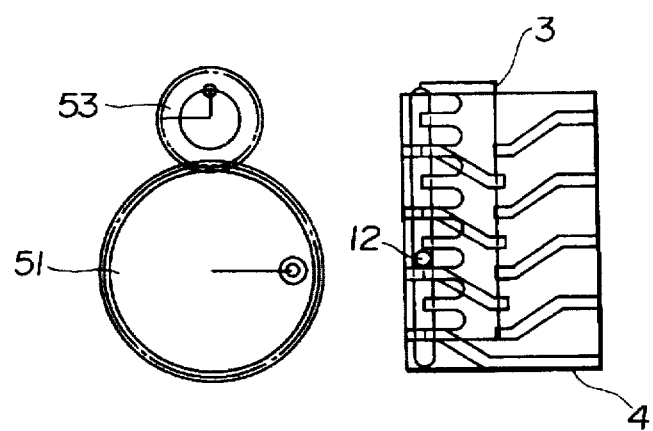
FIG. 18 is a side view showing the state of each cam plate when the driving gear in the movement device is rotated through 180°.
Figure 19:
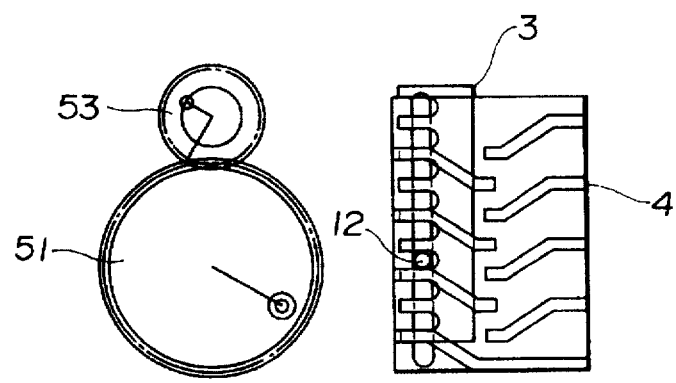
FIG. 19 is a side view showing the state of each cam plate when the driving gear in the movement device is rotated through 210°.
Figure 20:
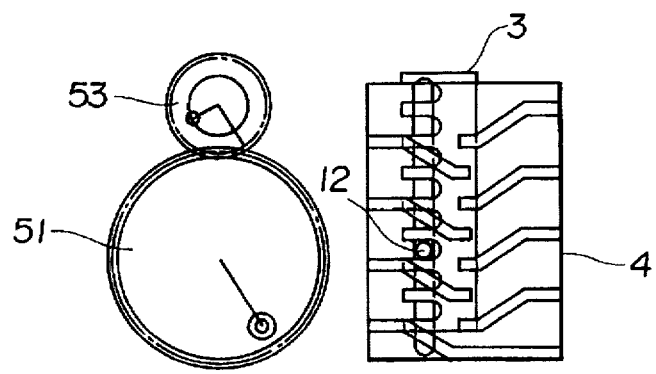
FIG. 20 is a side view showing the state of each cam plate when the driving gear in the movement device is rotated through 240°.

When the first cam gear 51 is at the 180° position, the first cam plate 4 is at the operative position, while the profiling pin 12 is supported by the horizontal section, as shown in FIGS. 17 and 18. When the first cam gear 51 is further rotated as far as the 210° position, the second cam plate 3 is at the above-mentioned supporting position, as shown in FIG. 19. That is, the profiling pin 12 is supported by the abutment support. When the first cam gear 51 is at the 240° position, the second cam plate 3 is still at the above-mentioned supporting position, as shown in FIG. 20. Although the profiling pin 12 is positioned at the branch point of the cam slit 38, it is supported by the abutment support without being moved downwards.

Figure 21:
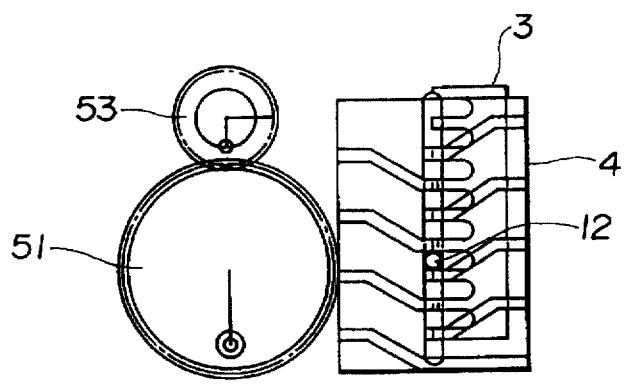
FIG. 21 is a side view showing the state of each cam plate when the driving gear in the movement device is rotated through 270°.
Figure 22:
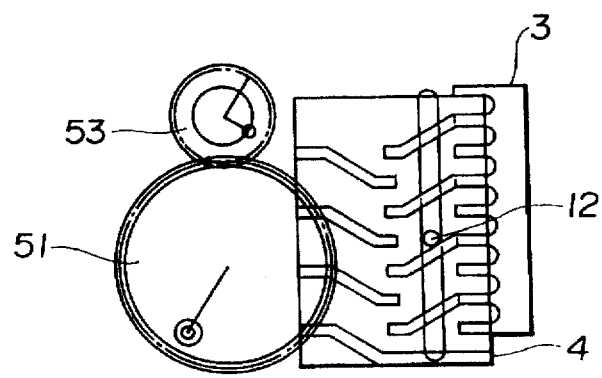
FIG. 22 is a side view showing the state of each cam plate when the driving gear in the movement device is rotated through 300°.
Figure 23:
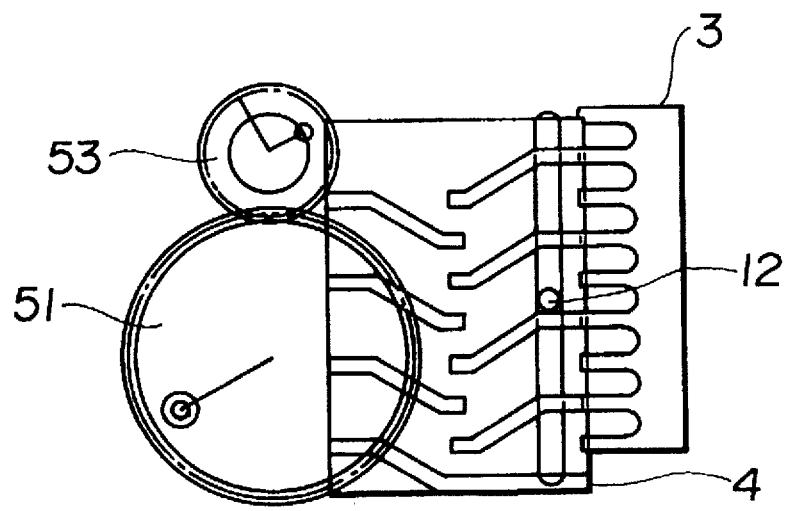
FIG. 23 is a side view showing the state of each cam plate when the driving gear in the movement device is rotated through 330°.

When the first cam gear 51 reaches the 270° position, the second cam plate 3 is about to be moved away from the supporting position to the non-supporting position, as shown in FIG. 21. However, the profiling pin 12 traverses the branch point of the cam slit 38 and is about to reach the inclined section. When the first cam gear reaches the 300° position, the second cam plate 3 is at the non-supporting position, as shown in FIG. 22. However, the profiling pin 12 already traverses the branch point of the cam slit 38 and is now supported on the inclined section. When the first cam gear reaches the 330° position, the traversing pin 12 is in the vicinity of the horizontal section, as shown in FIG. 23. When the first cam gear 51 is further rotated 30° to return to the 360° position, that is to the 0° position, the first cam plate 4 is at the initial position, while the profiling pin 12 is at the (n–2)th horizontal section 38(n–2) of the cam slit 38.

That is, by one complete clockwise rotation of the first cam gear 51, the profiling pin 12 is moved from the n'th horizontal section 38n of the cam slit 38 to the horizontal section 38(n–2) directly above the horizontal section 38n. Thus the object 11 is sequentially moved towards above by continued positive rotation of the first cam gear 51.

Figure 24:
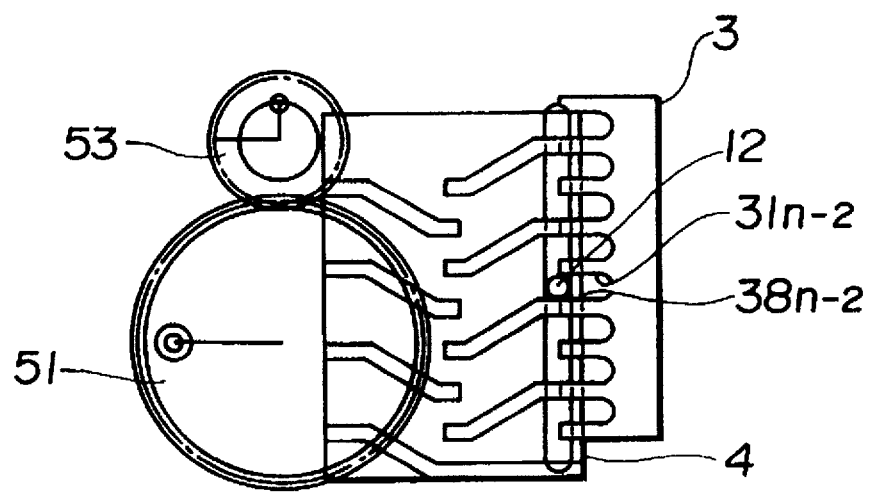
FIG. 24 is a side view showing the state of each cam plate when the driving gear in the movement device is rotated through 360°.

If the first cam gear 51 is rotated counterclockwise, the process reversed from the process shown in FIGS. 11 to 24 is followed, that is the state shown in FIG. 11 in which the profiling pin 12 is positioned at the horizontal section 38n is reached beginning from the state shown in FIG. 24 in which the profiling pin 12 is positioned at the horizontal section 38(n–2). This causes descent of the object 11. Thus the object 11 is sequentially lowered by continued counterclockwise rotation of the first cam gear 51.

Figure 25:
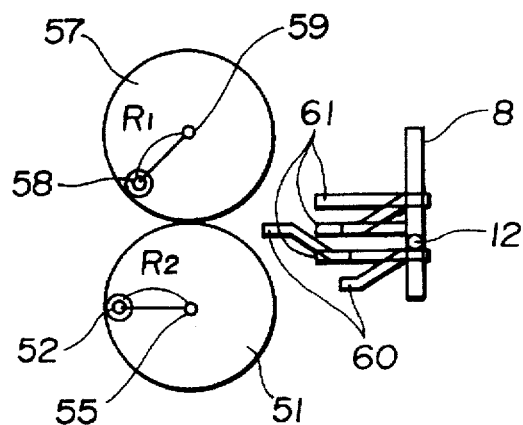
FIG. 25 is a side view showing the state of each cam plate in the initial state of a modification of the movement device.
Figure 49:
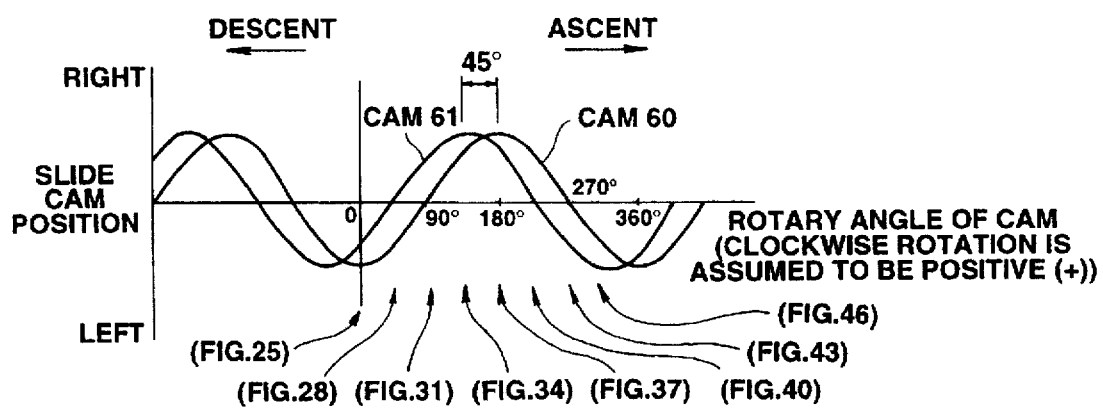
FIG. 49 is a graph showing the moved state of each cam plate in the movement device shown in FIGS. 25 to 48.

The abutment support of the second cam plate 3 in the movement device according to the present invention is not limited to the above-described comb-shaped abutting support 61 as shown in FIG. 25 in which both ends are free ends to permit passage of the profiling pin 12. In this case, the second cam gear 53 is replaced by a cam gear 57 having the same radius as the first cam gear 51 ($R_1=R_2$) and the same number of teeth as that of the first cam gear 51, as shown in FIG. 25. The cam gear 57 causes the periodic reciprocating movement of the third cam plate 3 by a driving pin 58. With the present movement device, the cam plates 3, 4 are reciprocated with the same period with a phase difference therebetween such that, when the first cam gear 51 is rotated clockwise in FIG. 49, the second cam gear 3 is delayed relative to the first cam plate 4 by 45° in terms of the rotational angle of the first cam gear 51.

With the present movement device, the movement device 11 may be raised or lowered depending on whether the direction of rotational driving of the motor 14 is forward or reverse, that is whether the rotational direction of the first cam gear 51 is forward or reverse.

Figure 26:
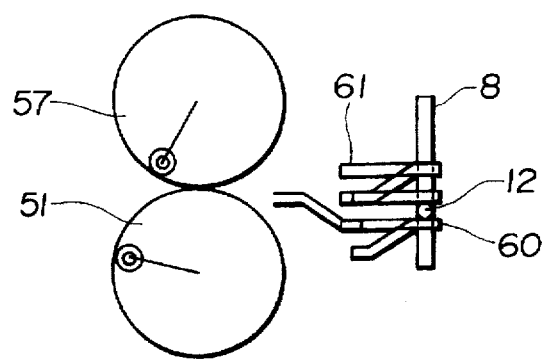
FIG. 26 is a side view showing the state of each cam plate when the driving gear in the movement device shown in FIG. 25 is rotated through 30°.
Figure 27:
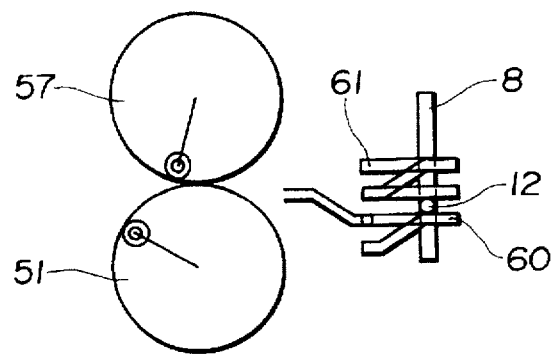
FIG. 27 is a side view showing the state of each cam plate when the driving gear in the movement device shown in FIG. 25 is rotated through 60°.
Figure 28:
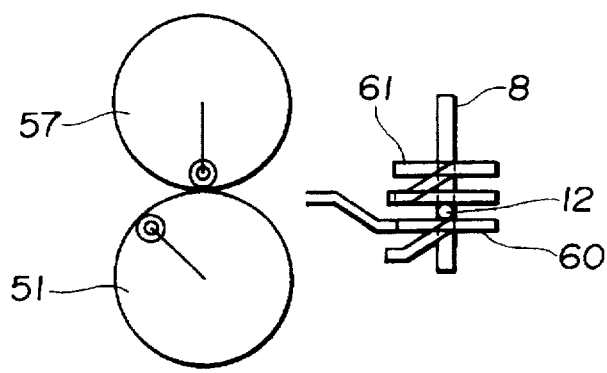
FIG. 28 is a side view showing the state of each cam plate when the driving gear in the movement device shown in FIG. 25 is rotated through 45°.
Figure 29:
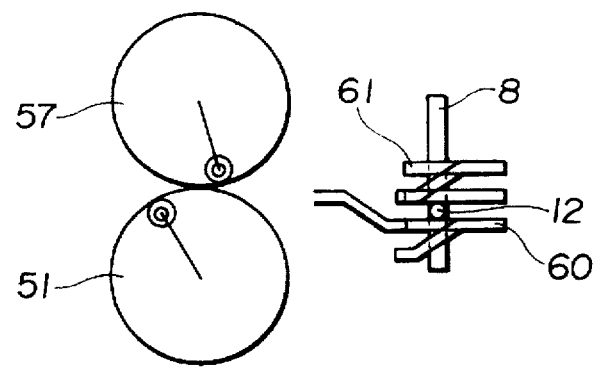
FIG. 29 is a side view showing the state of each cam plate when the driving gear in the movement device shown in FIG. 25 is rotated through 60°.

Specifically, it is assumed that, when the first cam gear 51 is at the initial position (0° position), the first cam plate 4 is at the initial position and the profiling pin 12 is at the horizontal section of the cam slit 60, as shown in FIG. 25. When the first cam gear 51 starts its rotation and assumes the position in which it has been rotated 30° clockwise, the second cam plate 3 is the supporting position, as shown in FIGS. 26 to 27. That is, the profiling pin 12 is supported on the abutting support 61. When the first cam gear 51 is at the 60° position, the second cam plate 3 is still at the above-mentioned support position, with the profiling pin 12 being positioned at the branch point of the cam slit 60, as shown in FIGS. 28 to 29. The profiling pin 12, however, is supported by the abutting support member 61 without being moved downwards.

Figure 30:
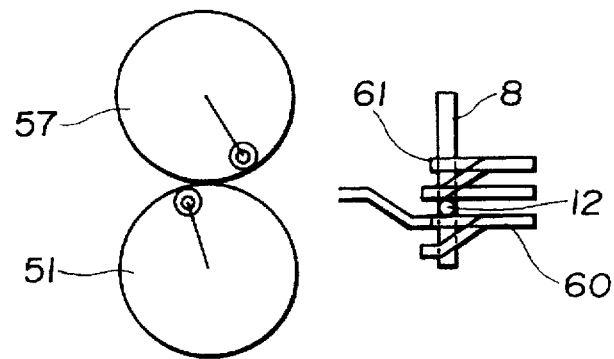
FIG. 30 is a side view showing the state of each cam plate when the driving gear in the movement device shown in FIG. 25 is rotated through 75°.
Figure 31:
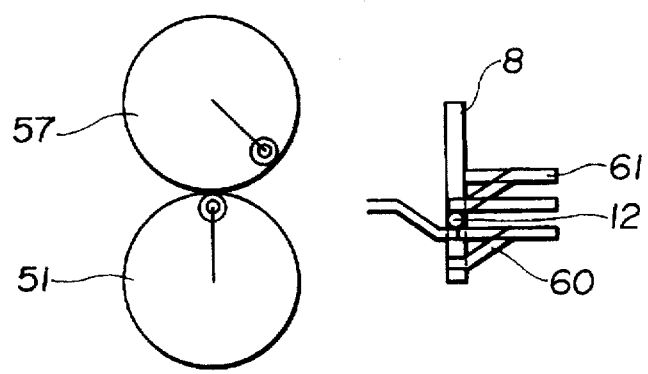
FIG. 31 is a side view showing the state of each cam plate when the driving gear in the movement device shown in FIG. 25 is rotated through 90°.
Figure 32:
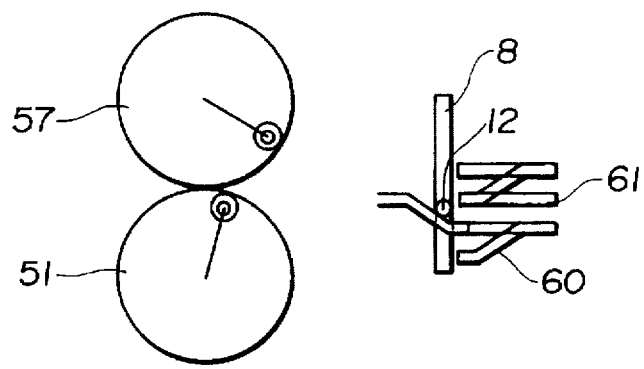
FIG. 32 is a side view showing the state of each cam plate when the driving gear in the movement device shown in FIG. 25 is rotated through 105°.
Figure 33:
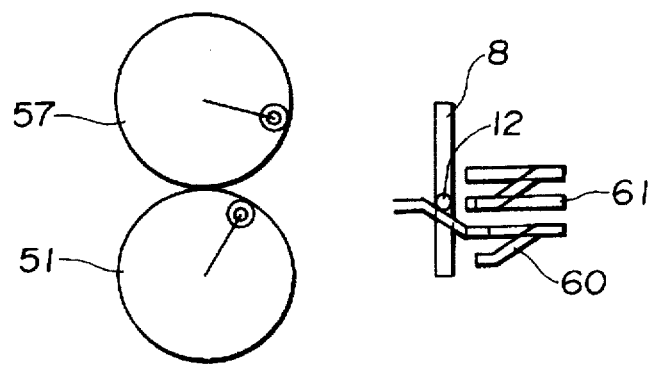
FIG. 33 is a side view showing the state of each cam plate when the driving gear in the movement device shown in FIG. 25 is rotated through 120°.
Figure 34:
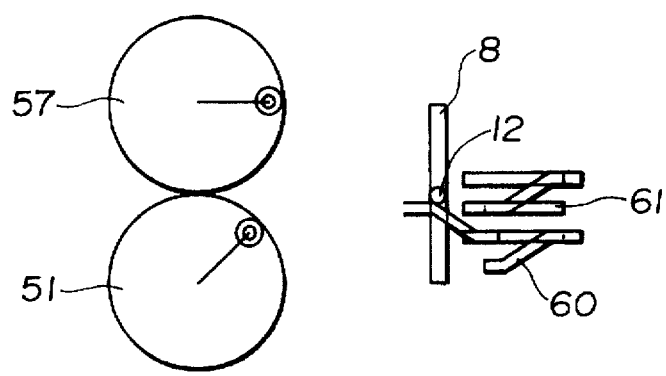
FIG. 34 is a side view showing the state of each cam plate when the driving gear in the movement device shown in FIG. 25 is rotated through 135°.
Figure 35:
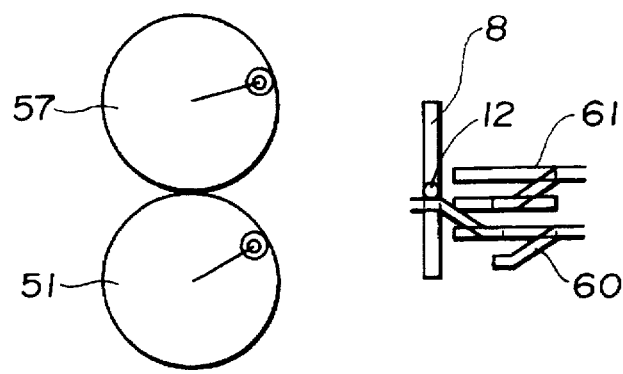
FIG. 35 is a side view showing the state of each cam plate when the driving gear in the movement device shown in FIG. 25 is rotated through 150°.

When the first cam gear 51 is at the 90° position, the second cam plate 3 is about to be moved away from the supporting position to the non-supporting position, as shown in FIGS. 30 to 31. However, the profiling pin 12 traverses the branch point of the cam slit 60 and is about to reach the first inclined section. When the first cam gear 51 is at the 120° position, the second cam plate 3 is at the above-mentioned non-supporting position, as shown in FIGS. 32 to 33. However, the profiling pin 12 already traverses the branch point of the cam slit 60 and is supported on the first inclined section. When the first cam gear 51 is at the 150° position, the profiling pin 12 is at the second horizontal section, with the horizontal section positioned at the initial position being assumed to be the first horizontal section, as shown in FIGS. 34 to 35.

Figure 36:
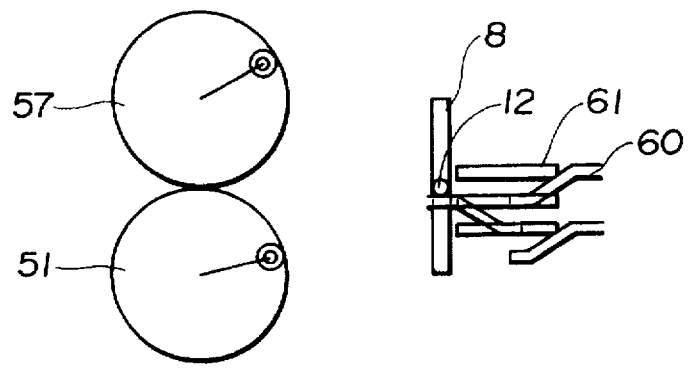
FIG. 36 is a side view showing the state of each cam plate when the driving gear in the movement device shown in FIG. 25 is rotated through 165°.
Figure 37:
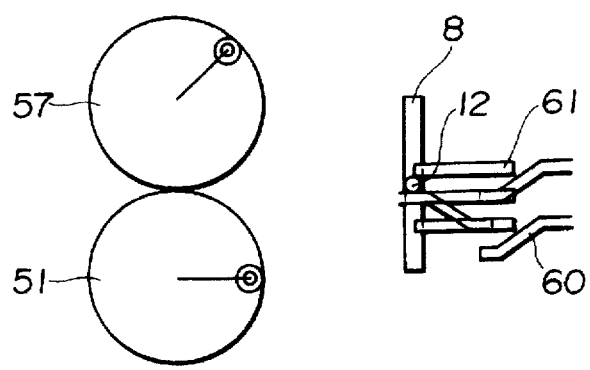
FIG. 37 is a side view showing the state of each cam plate when the driving gear in the movement device shown in FIG. 25 is rotated through 180°.
Figure 38:
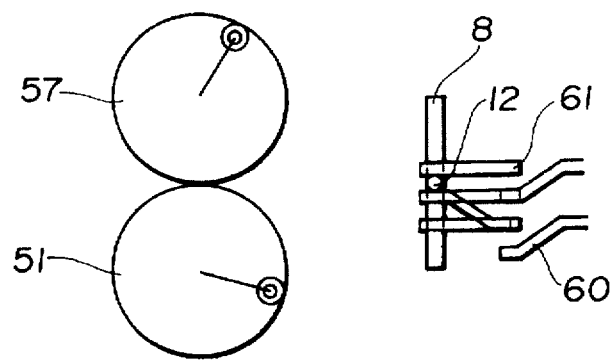
FIG. 38 is a side view showing the state of each cam plate when the driving gear In the movement device shown in FIG. 25 is rotated through 195°.
Figure 39:
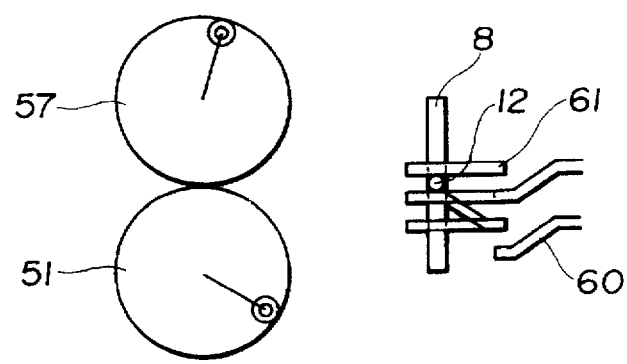
FIG. 39 is a side view showing the state of each cam plate when the driving gear in the movement device shown in FIG. 25 is rotated through 210°.
Figure 40:
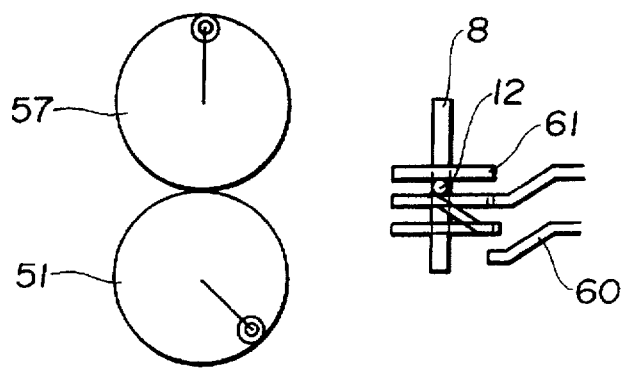
FIG. 40 is a side view showing the state of each cam plate when the driving gear in the movement device shown in FIG. 25 is rotated through 225°.
Figure 41:
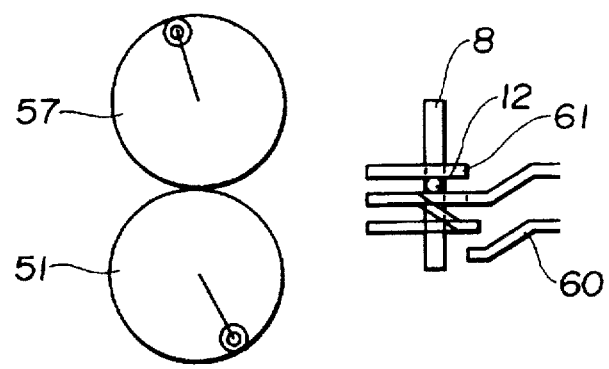
FIG. 41 is a side view showing the state of each cam plate when the driving gear in the movement device shown in FIG. 25 is rotated through 240°.

When the first cam gear 51 reaches the 180° position, the first cam plate 4 is at the operative position, with the profiling pin 12 being supported on the horizontal section, as shown in FIGS. 36 to 37. When the first cam gear 51 is rotated further to its 210° position, the second cam plate 3 is at the above-mentioned supporting position, as shown in FIGS. 38 to 39. That is, the profiling pin 12 is supported on the abutting support member 61. When the first cam gear 51 is at the 240° position, the second cam plate 3 is still at the supporting position, with the profiling pin 12 being positioned at the branch point of the cam slit 60, as shown in FIGS. 40 to 41. However, the profiling pin 12 is supported by the abutting support member without being moved downwards.

Figure 42:
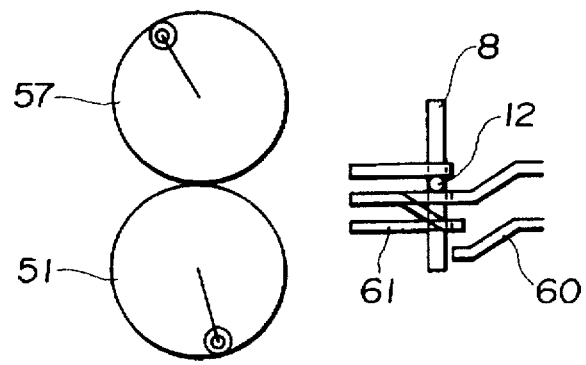
FIG. 42 is a side view showing the state of each cam plate when the driving gear in the movement device shown in FIG. 25 is rotated through 255°.
Figure 43:
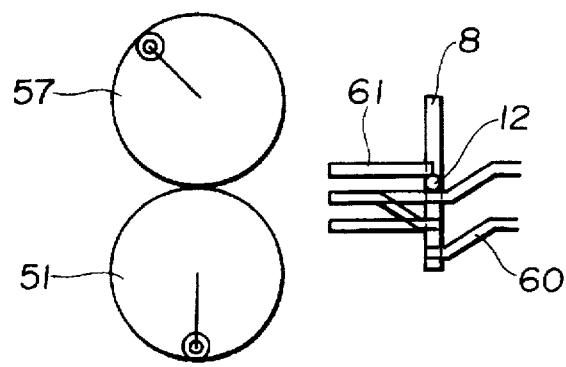
FIG. 43 is a side view showing the state of each cam plate when the driving gear in the movement device shown in FIG. 25 is rotated through 270°.
Figure 44:
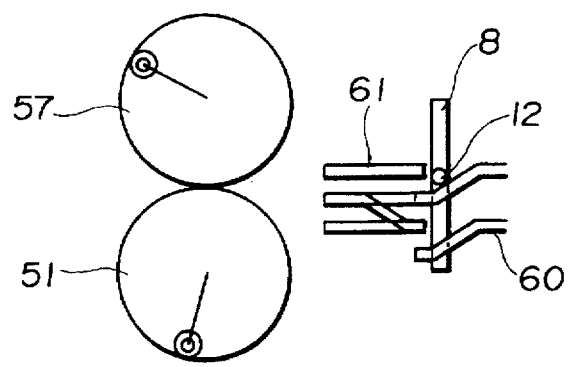
FIG. 44 is a side view showing the state of each cam plate when the driving gear in the movement device shown in FIG. 25 is rotated through 285°.
Figure 45:
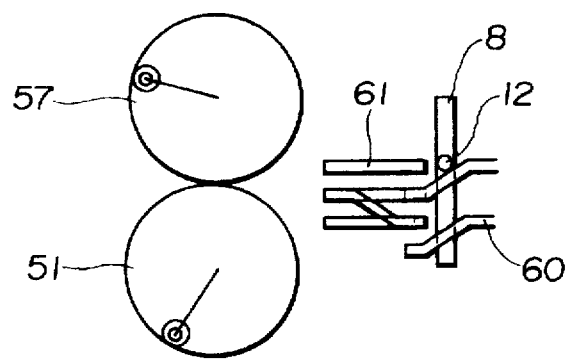
FIG. 45 is a side view showing the state of each cam plate when the driving gear in the movement device shown in FIG. 25 is rotated through 300°.
Figure 46:
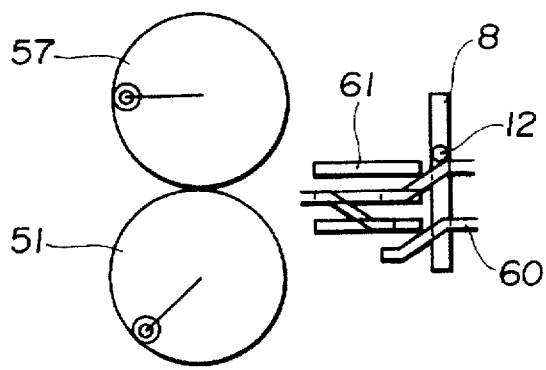
Figure 47:
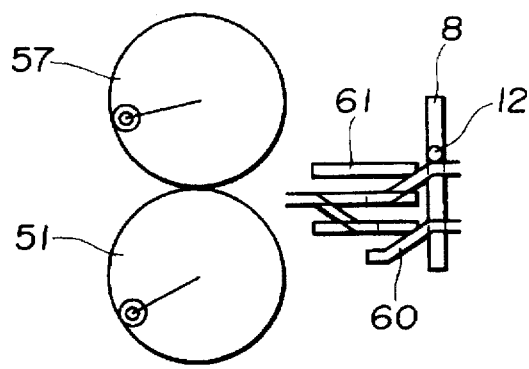
FIG. 47 is a side view showing the state of each cam plate when the driving gear in the movement device shown in FIG. 25 is rotated through 330°.
Figure 48:
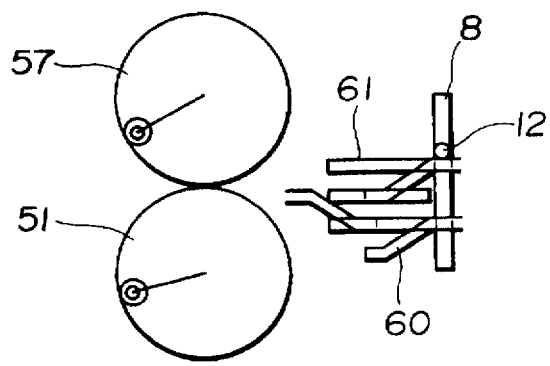
FIG. 48 is a side view showing the state of each cam plate when the driving gear in the movement device shown in FIG. 25 is rotated through 315°.

When the first cam gear 51 is at the 270° position, the second cam plate 3 is about to be moved from the supporting position towards the non-supporting position, as shown in FIGS. 42 to 43. However, the profiling pin traverses the branch point of the cam slit 60 and is about to reach the inclined section. When the first cam gear 51 is at the 300° position, the second cam plate 3 is at the non-supporting position, as shown in FIGS. 44 to 45. However, the profiling pin 12 already traverses the branch point of the cam slit 60 and is supported on the inclined section. When the first cam gear 51 is at the 330° position, the profiling pin 12 is positioned in the vicinity of the horizontal section, a shown in FIGS. 46 to 47. When the first cam gear 51 is further rotated 30° and returned to the 360° or 0° position, via the 345° position, the first cam plate 4 is at the initial position, with the profiling pin 12 being positioned at the horizontal section directly above the horizontal section on which it was supported in the initial state.

That is, by the clockwise complete revolution (in the positive direction) of the first cam gear 51, the profiling pin 12 is moved away from the n'th horizontal section 60n of the cam slit 60 to the horizontal section 60(n−2) directly above the n'th horizontal section. Thus the object 11 is sequentially moved towards above as a result of continued rotation of the first cam gear 51 in the positive direction.

If the first cam gear 51 is rotated in reverse, the process reverse to that shown in FIGS. 25 to 48 is followed, with the object 11 being moved downwards. Thus the object is sequentially moved downwards as a result of continued counterclockwise rotation of the first cam gear 51.

Figure 53:
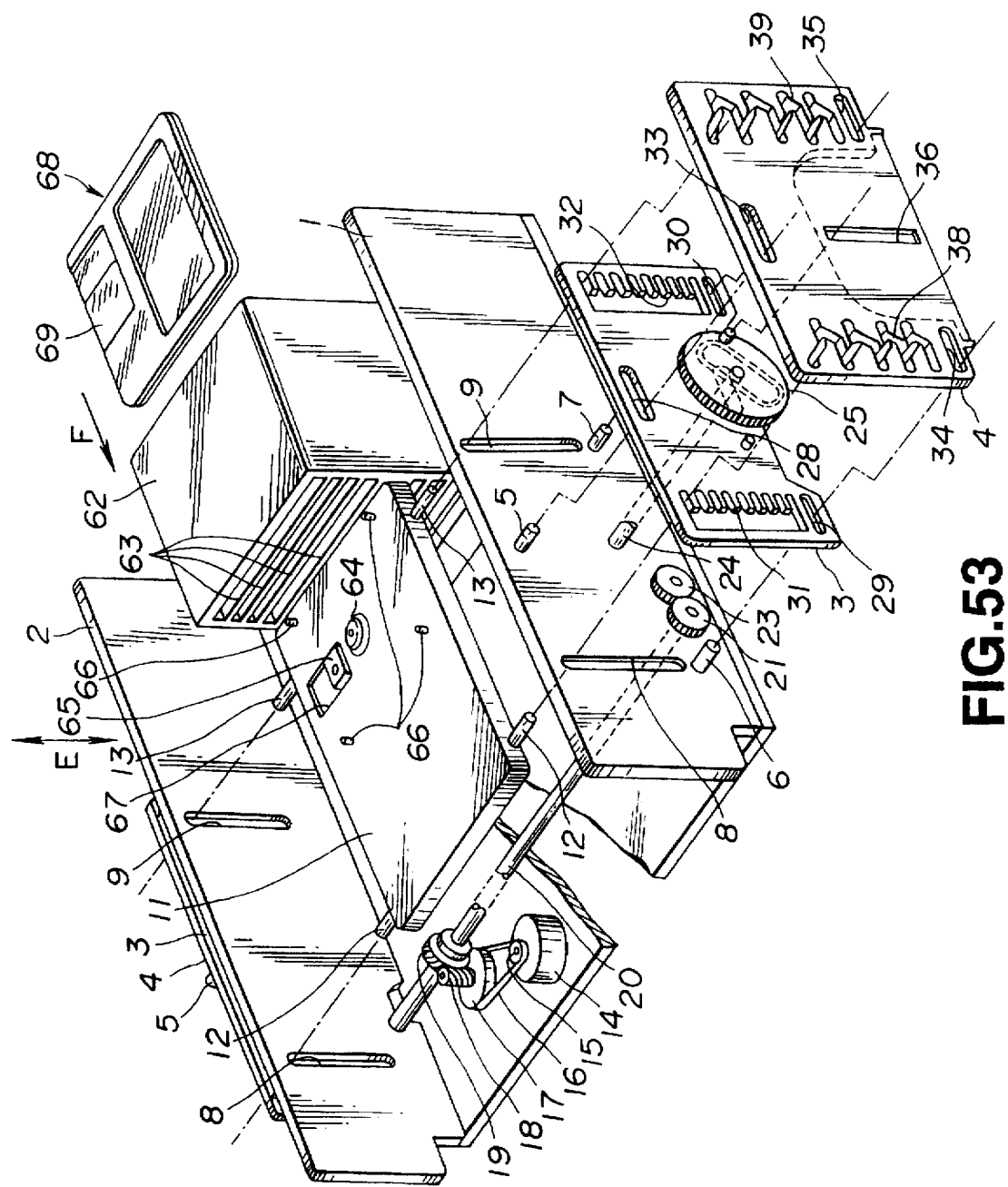
FIG. 53 is an exploded perspective view showing an arrangement of a recording and/or reproducing apparatus having the movement device.
Figure 54:
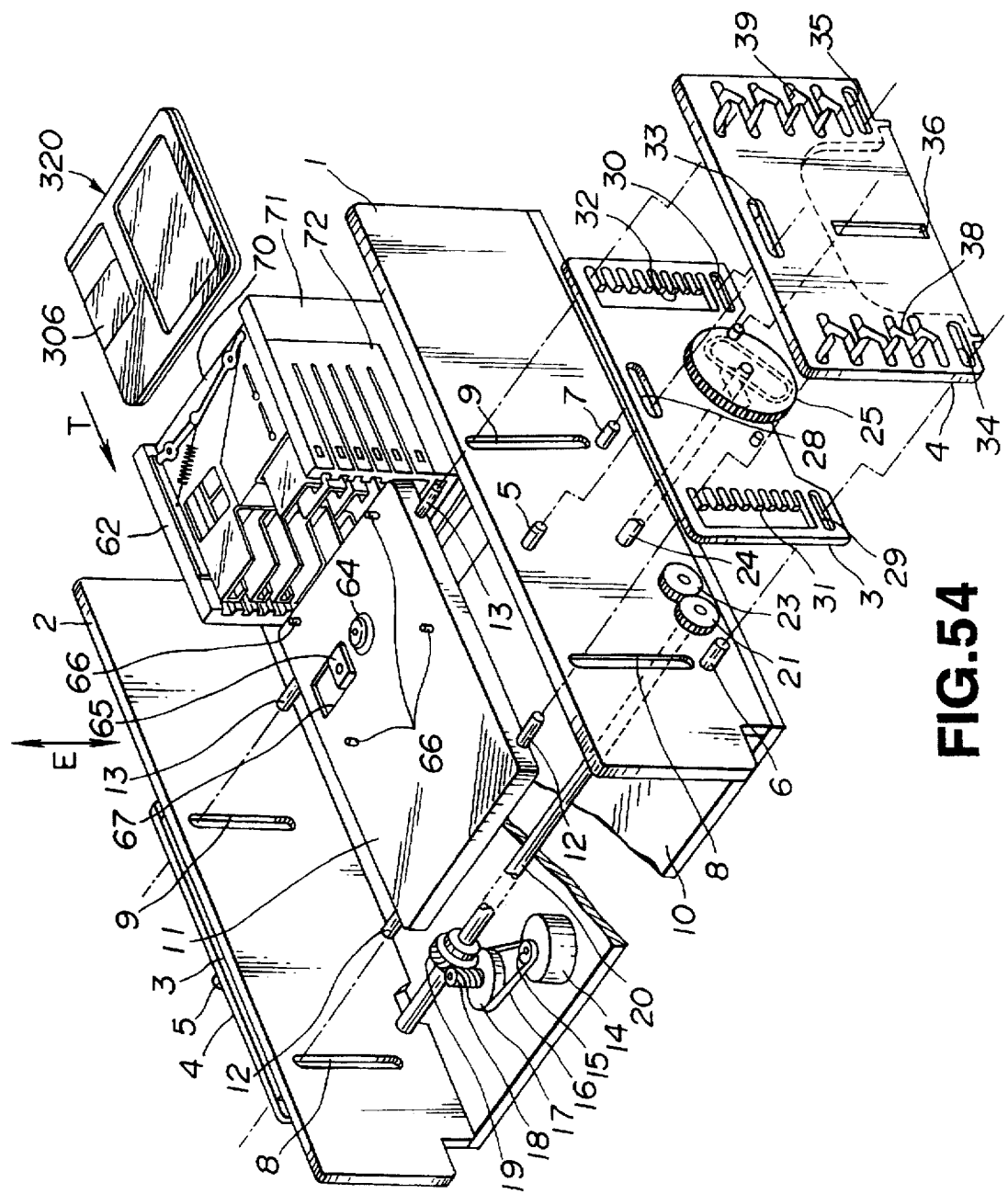
FIG. 54 is a schematic exploded perspective view showing an overall arrangement of the recording and/or reproducing apparatus according to the present invention.
Figure 55:
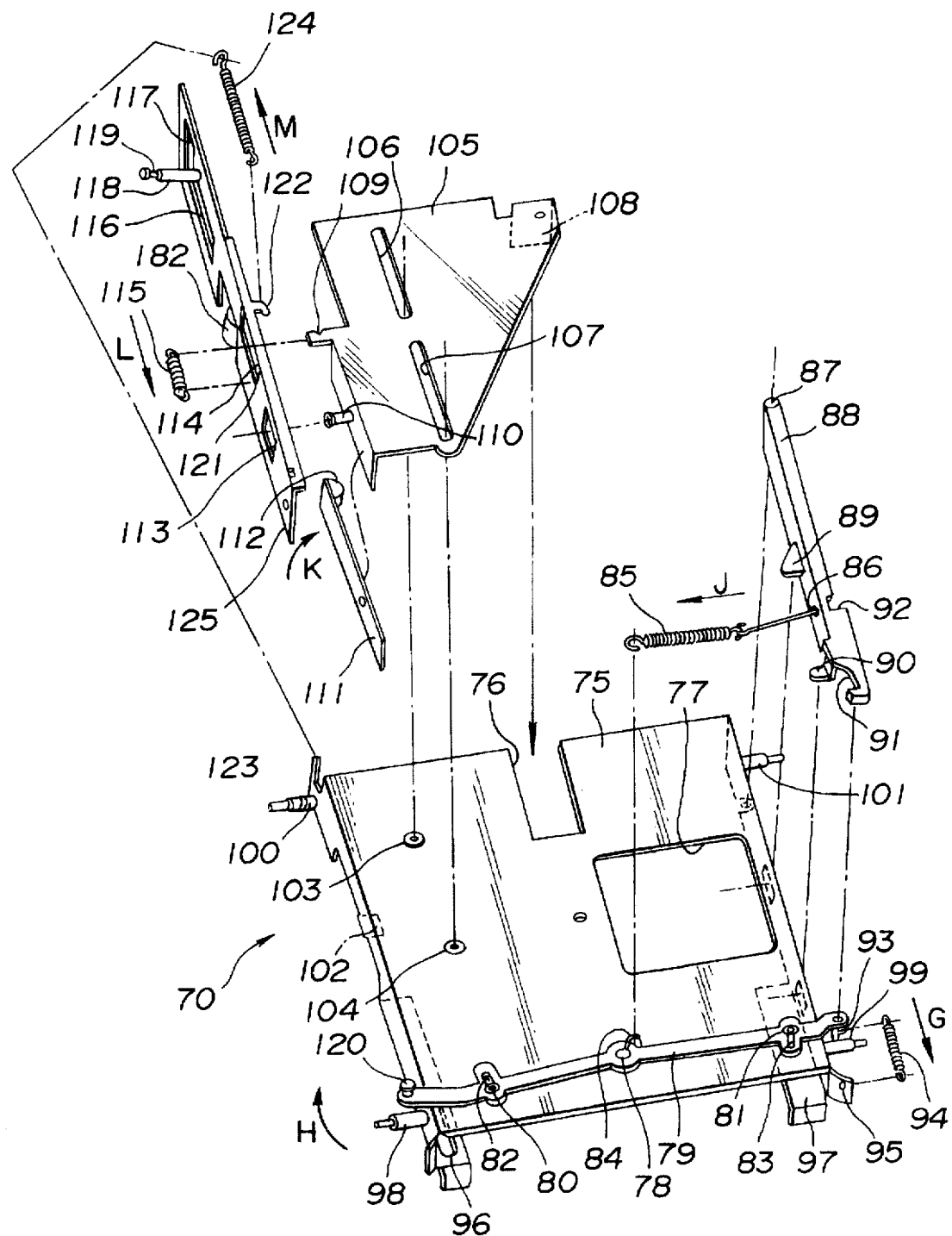
FIG. 55 is an exploded perspective view showing an arrangement of a cartridge holder of the recording and/or reproducing apparatus.

The above-described movement device according to the present invention may be applied to a disc changer device, which is the recording and/or reproducing apparatus, as shown in FIG. 53. That is, the above-mentioned disc changer device is completed by arranging a disc player having an optical pickup 65, a disc table 64 and disc cartridge positioning pins 66, 66, 66, 66 on the movement device 11, and by causing the object 11 to face a disc stocker 62 in which plural disc cartridges 68 are stacked in tiers.

With the disc changer device, the object 11 is moved in the up-and-down direction for selecting one of plural disc cartridges 68 housed within the disc stocker 62. The selected disc cartridge 68 is loaded by a pull-out mechanism as later explained, and the information signals are recorded on or reproduced from a recording disc housed within the disc cartridge 68. The disc changer device may also be arranged as a recording/reproducing device employing a tape cassette as a recording medium in place of the disc cartridge 68.

Figure 98:
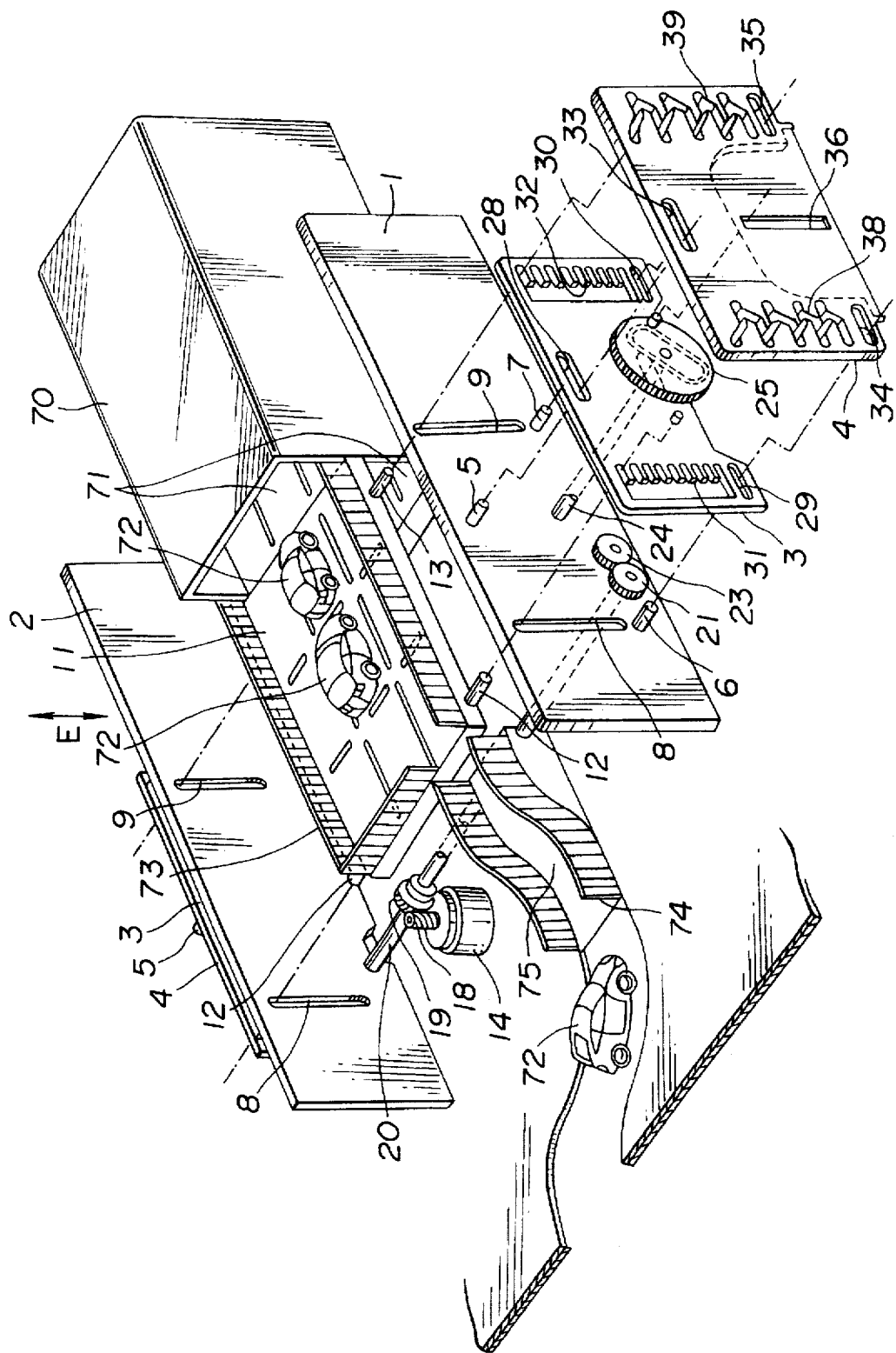
FIG. 98 is a perspective view showing an arrangement of a grade parking place having the above movement device.
Figure 99:
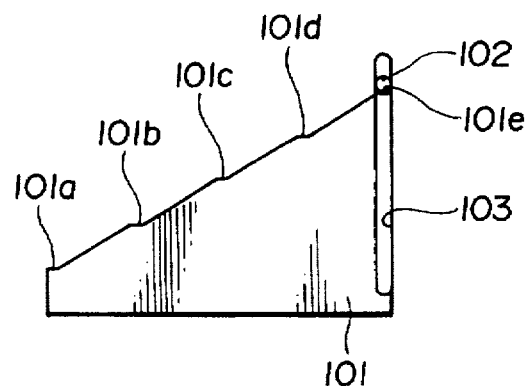
FIG. 99 is a schematic side view showing an arrangement of a first example of a conventional movement device in an initial state.
Figure 100:
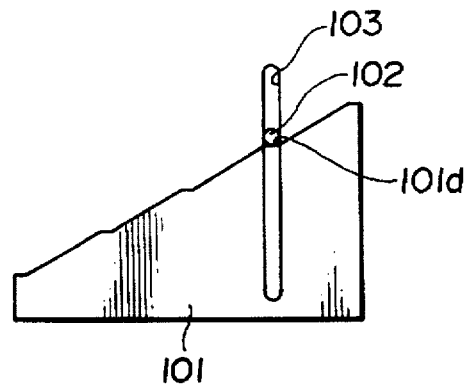
FIG. 100 is a side view showing the state in which a plate cam has been moved by one-quarter in the movement device shown in FIG. 99.
Figure 101:
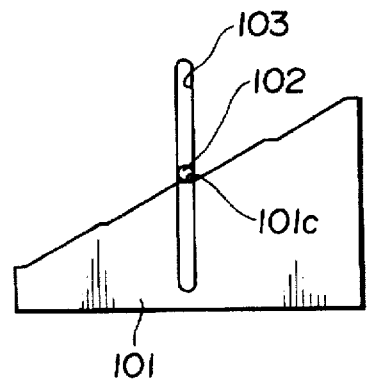
FIG. 101 is a side view showing the state in which the plate cam has been moved by one-half in the movement device shown in FIG. 99.
Figure 102:
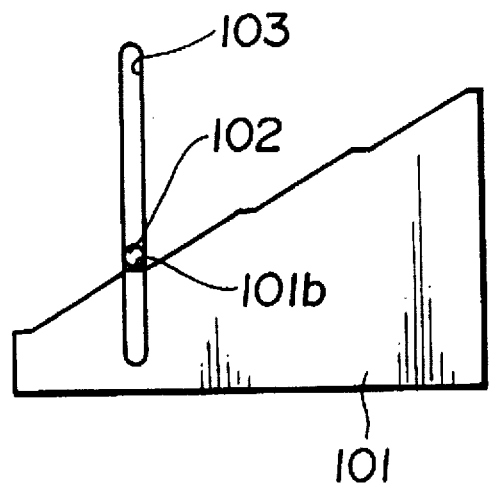
FIG. 102 is a side view showing the state in which the plate cam has been moved by three-fourths in the movement device shown in FIG. 99.
Figure 103:
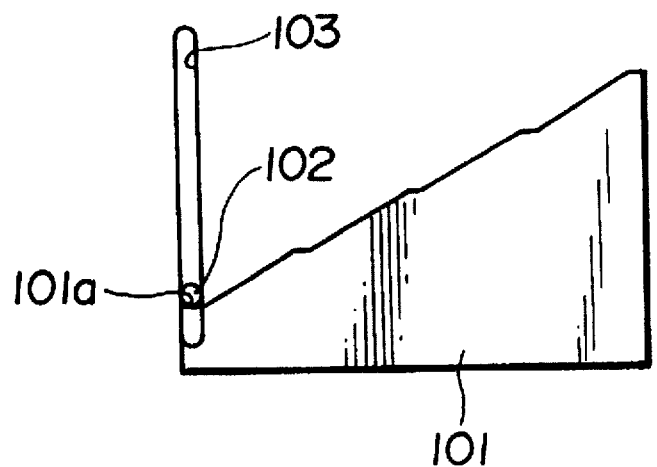
FIG. 103 is a side view showing the state in which movement of the plate cam has been completed in the movement device shown in FIG. 99.
Figure 104:
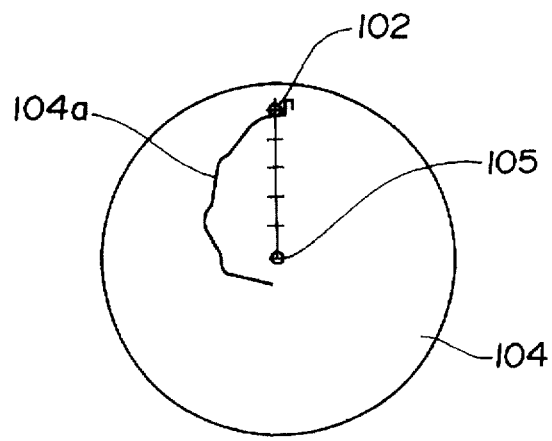
FIG. 104 is a schematic side view showing an arrangement of a second example of the conventional movement device in its initial state.
Figure 105:
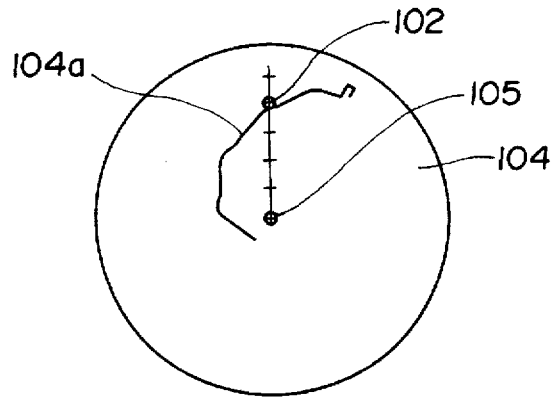
FIG. 105 is a side view showing the state in which a rotary plate cam has been rotated by one-quarter in the movement device shown in FIG. 104.
Figure 106:
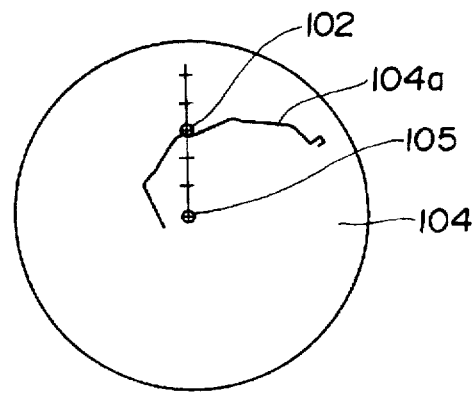
FIG. 106 is a side view showing the state in which the rotary plate cam has been rotated by one-half in the movement device shown in FIG. 104.
Figure 107:
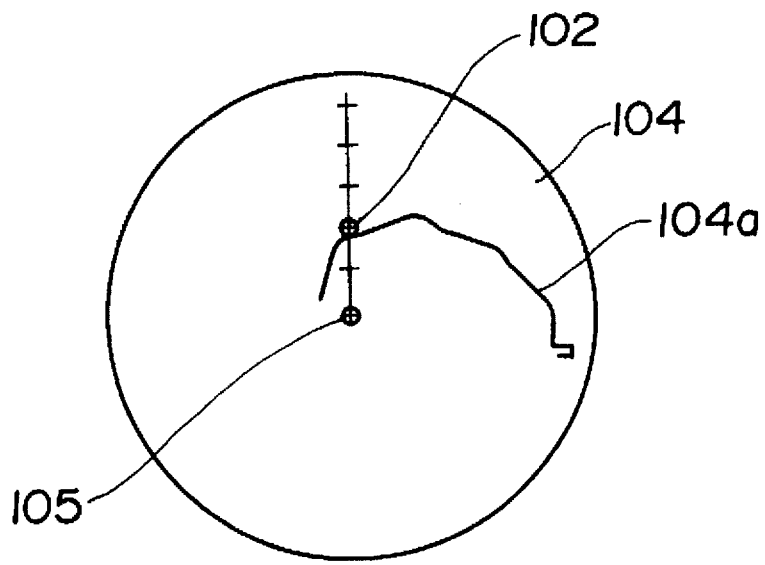
FIG. 107 is a side view showing the state in which the rotary plate cam has been rotated by three-fourths in the movement device shown in FIG. 104.
Figure 108:
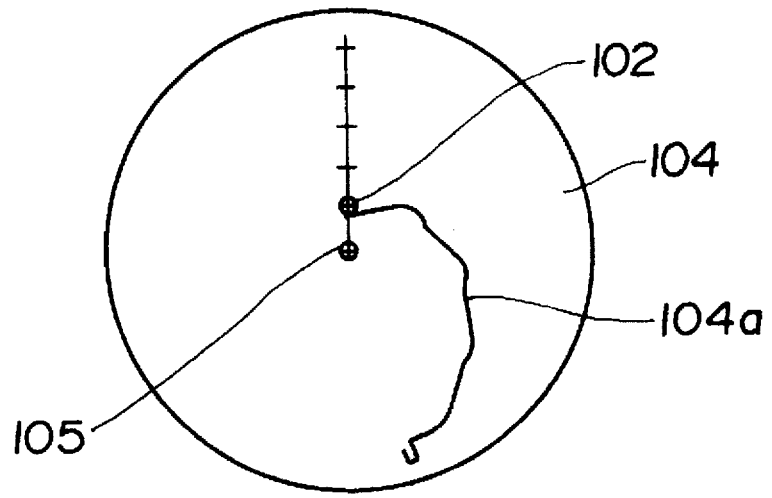
FIG. 108 is a side view showing the state in which movement of the rotary plate cam has been completed in the movement device shown in FIG. 104.
Figure 109:
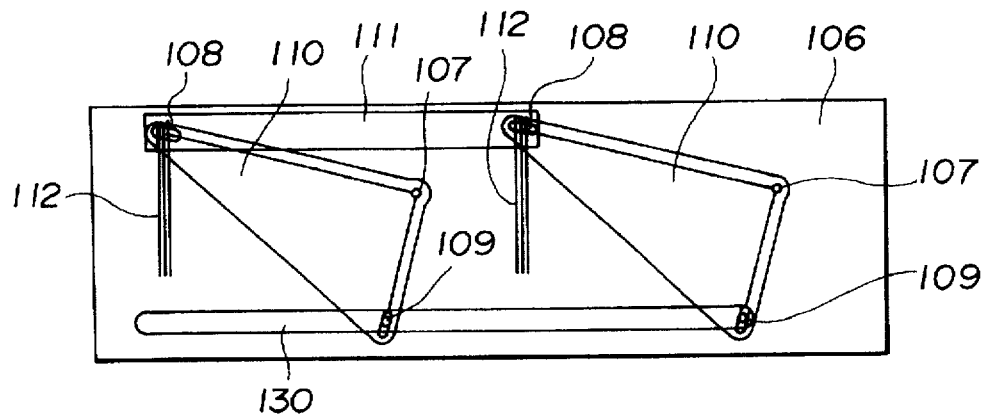
FIG. 109 is a schematic showing an arrangement of a third example of the conventional movement device in its initial state.
Figure 110:
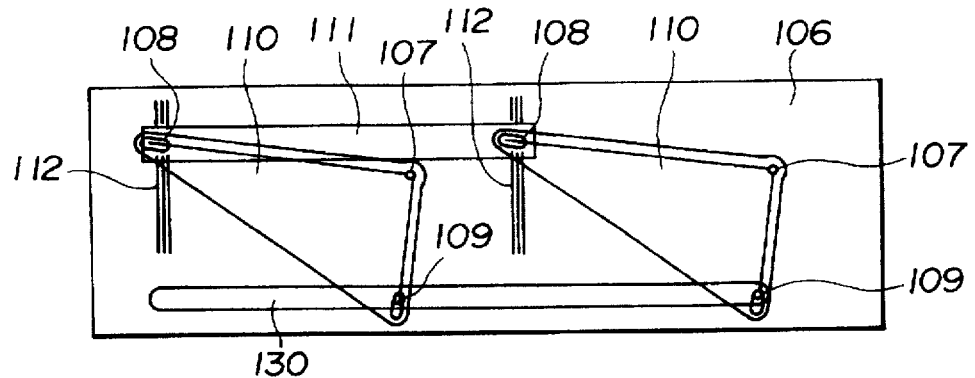
FIG. 110 is a side view showing the state in which a bell crank has been rotated by one-quarter in the movement device shown in FIG. 109.
Figure 111:
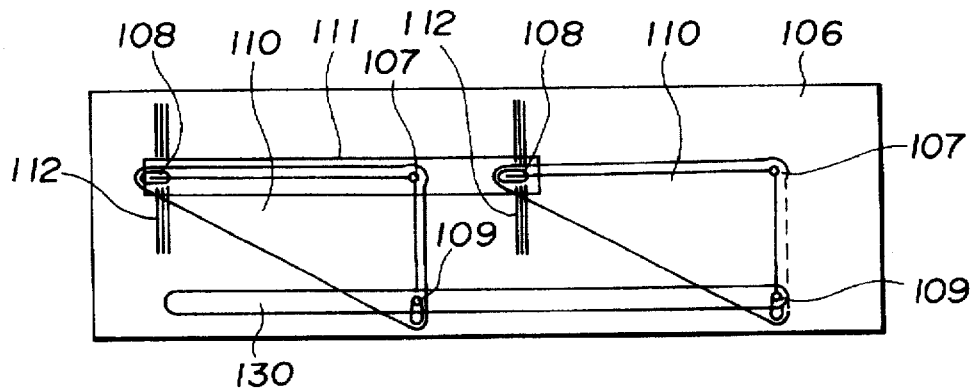
FIG. 111 is a side view showing the state in which the bell crank has been rotated by one-half in the movement device shown in FIG. 109.
Figure 112:
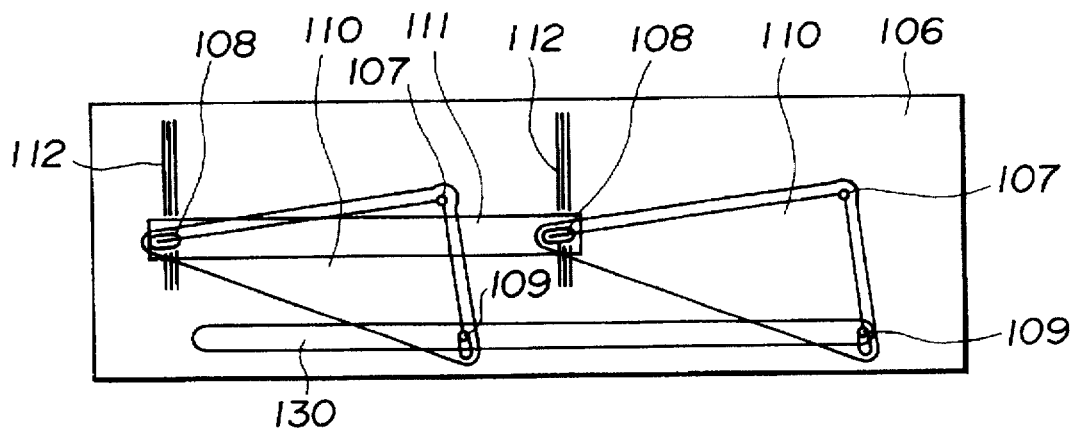
FIG. 112 is a side view showing the state in which the bell crank has been rotated by three-fourths in the movement device shown in FIG. 109.
Figure 113:
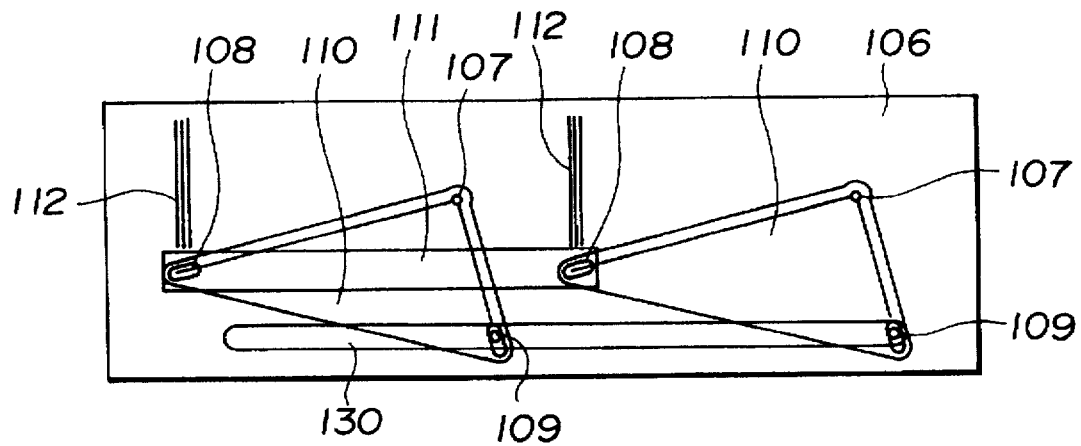
FIG. 113 is a side view showing the state in which movement of the bell crank has been completed in the movement device shown in FIG. 104.
Figure 114:
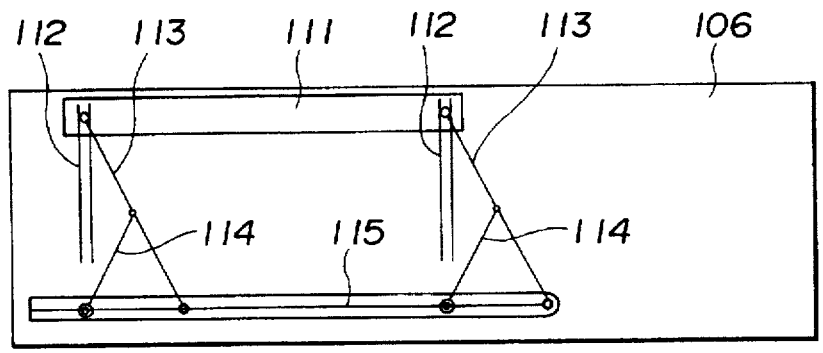
FIG. 114 is a schematic showing an arrangement of a fourth example of the conventional movement device in its initial state.
Figure 115:
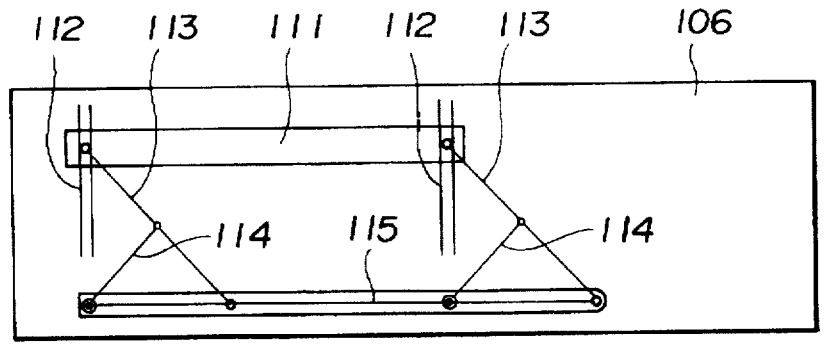
FIG. 115 is a side view showing the state in which a horizontal rod has been rotated by one-half in the movement device shown in FIG. 114.
Figure 116:
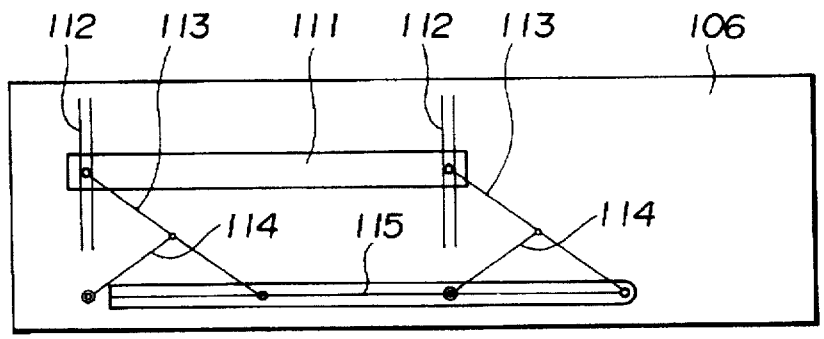
FIG. 116 is a side view showing the state in which the horizontal rod has been rotated by one-quarter in the movement device shown in FIG. 114.
Figure 117:
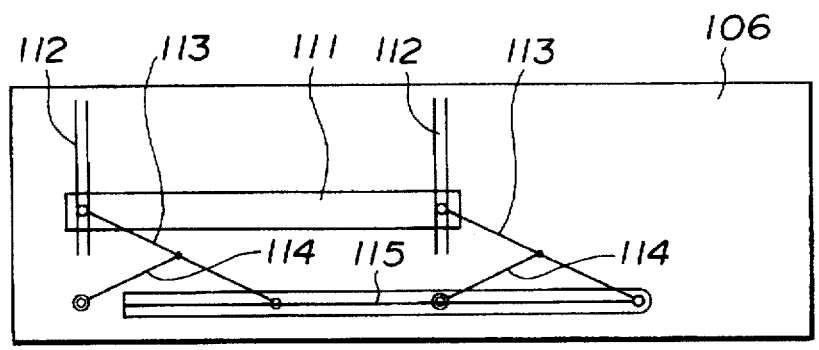
FIG. 117 is a side view showing the state in which the horizontal rod has been rotated by three-fourths in the movement device shown in FIG. 114.
Figure 118:
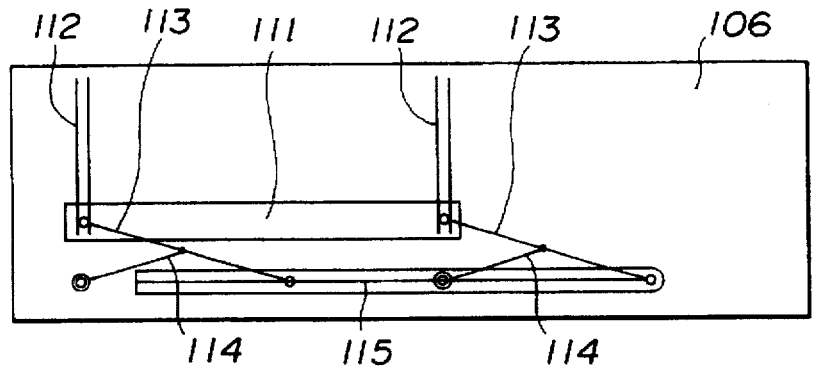
FIG. 118 is a side view showing the state in which movement of the horizontal rod has been completed in the movement device shown in FIG. 114.
Figure 119:
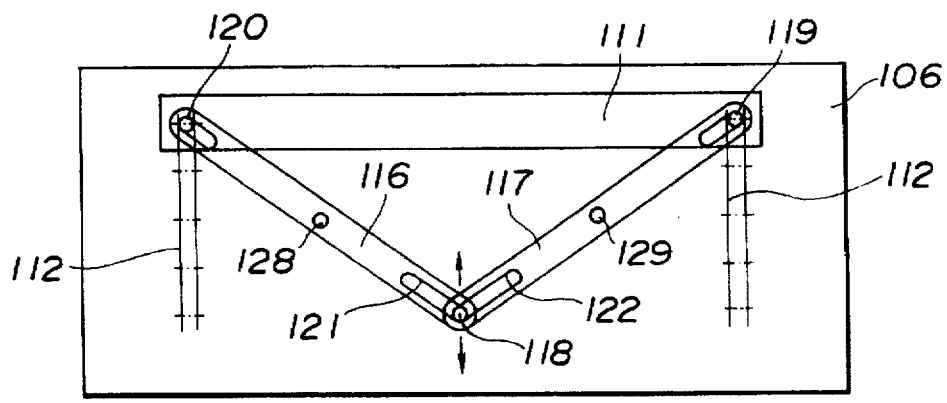
FIG. 119 is a schematic showing an arrangement of a fifth example of the conventional movement device in its initial state.
Figure 120:
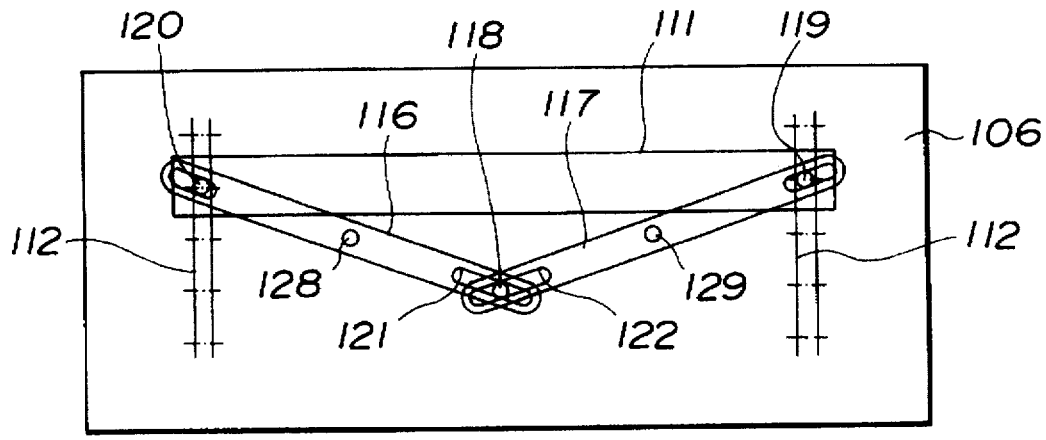
FIG. 120 is a side view showing the state in which each rotary link has been rotated by one-fourth in the movement device shown in FIG. 119.
Figure 121:
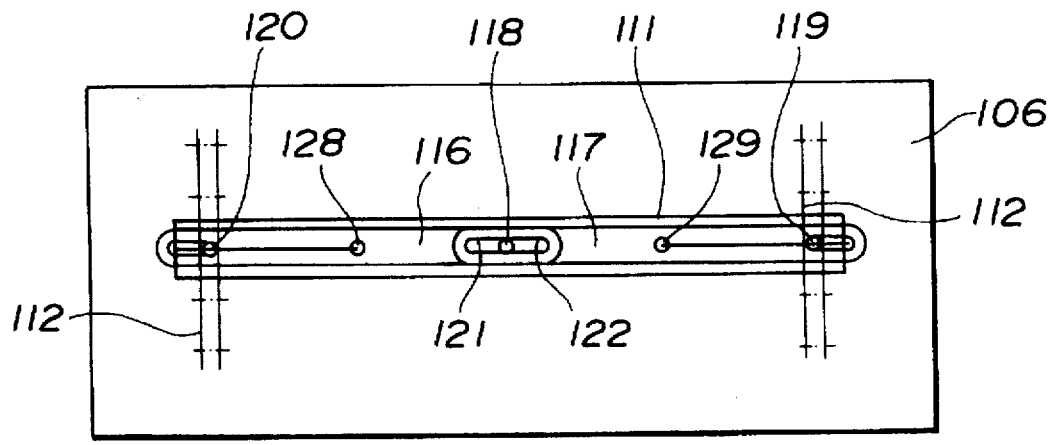
FIG. 121 is a side view showing the state in which each rotary link has been rotated by one-half in the movement device shown in FIG. 119.
Figure 122:
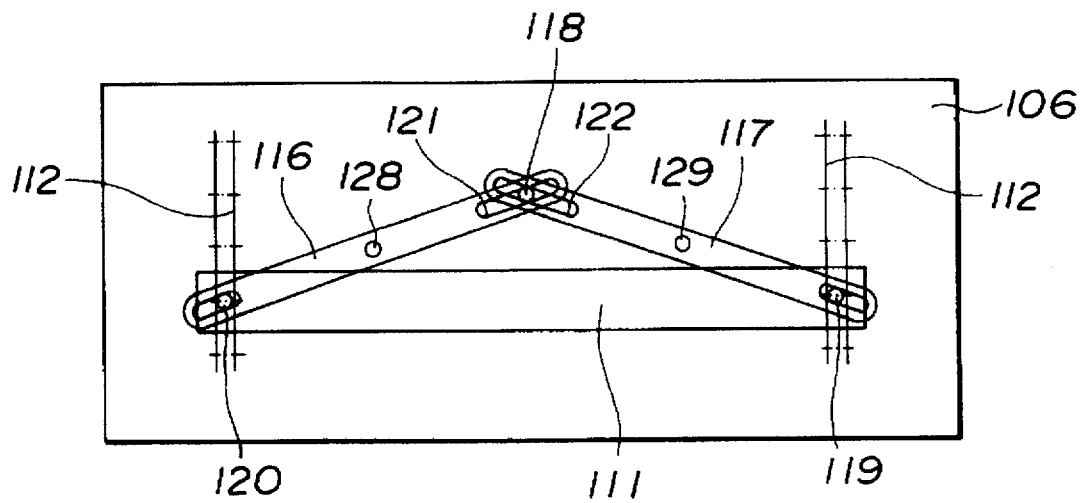
Figure 123:
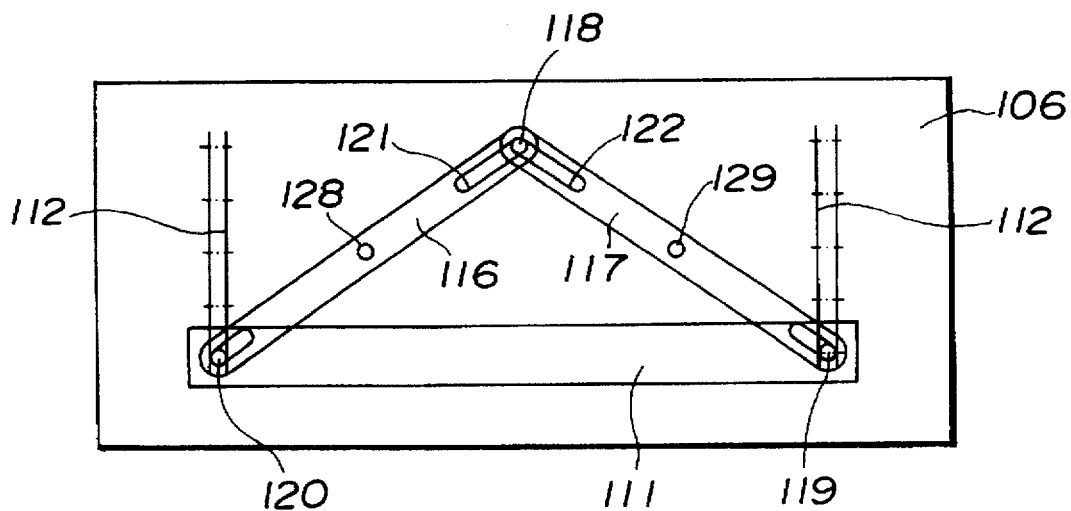

The movement device according to the present invention may be employed as a so-called lift device such as is employed in a grade car-parking area, as shown in FIG. 98. That is, the object 11 is adapted to support a car 72 thereon, which car may be accommodated on a selected floor on selecting the floor by the object 11 being moved in the up-and-down direction. In the present embodiment, a fence 73 is provided around the object 11. There is also provided a slope 75 having a fence 74 on both sides in order to permit facilitated entrance of the car 72 on the object 11. The lift device may also be configured to lift the personnel or the cargo in general in place of the car 72.

The movement device according to the present invention is not limited to the device for lifting the object 11, as in the above-described embodiment. Thus it may be arranged as a device for moving the object 11 in the horizontal direction or in the inclined direction by unidirectionally biasing the object 11 by an elastic member such as a spring. That is, the object 11 may be positively moved in a pre-set direction corresponding to the direction of rotation of the motor 14 if the object 11 is biased in downward movement, even if in the levelled down state. In the following, the recording and/or reproducing apparatus according to the present invention is designed as a disc changer device in which a plurality of disc cartridges each comprised of a recording disc contained in a cartridge main member and in which one of these disc cartridges is selected for recording/reproducing information signals on or from the disc contained therein. The disc changer device is now explained in the following sequence.

(i) Construction of a disc cartridge (FIGS. 94 to 97)

(ii) Outline of a disc changer device (FIGS. 54 and 61 to 63)

(iii) Construction of a lift device (FIGS. 1 to 24)

(iv) Construction of a mechanical chassis (FIGS. 82 to 88)

(v) Construction of a cartridge holder (FIGS. 55 to 58 and 69)

(vi) Construction of a disc stocker (FIGS. 60, 64 to 68)

(vii) Construction of a transporting device (FIGS. 59, 61, 70 to 81 and 89 to 92)

Figure 93:
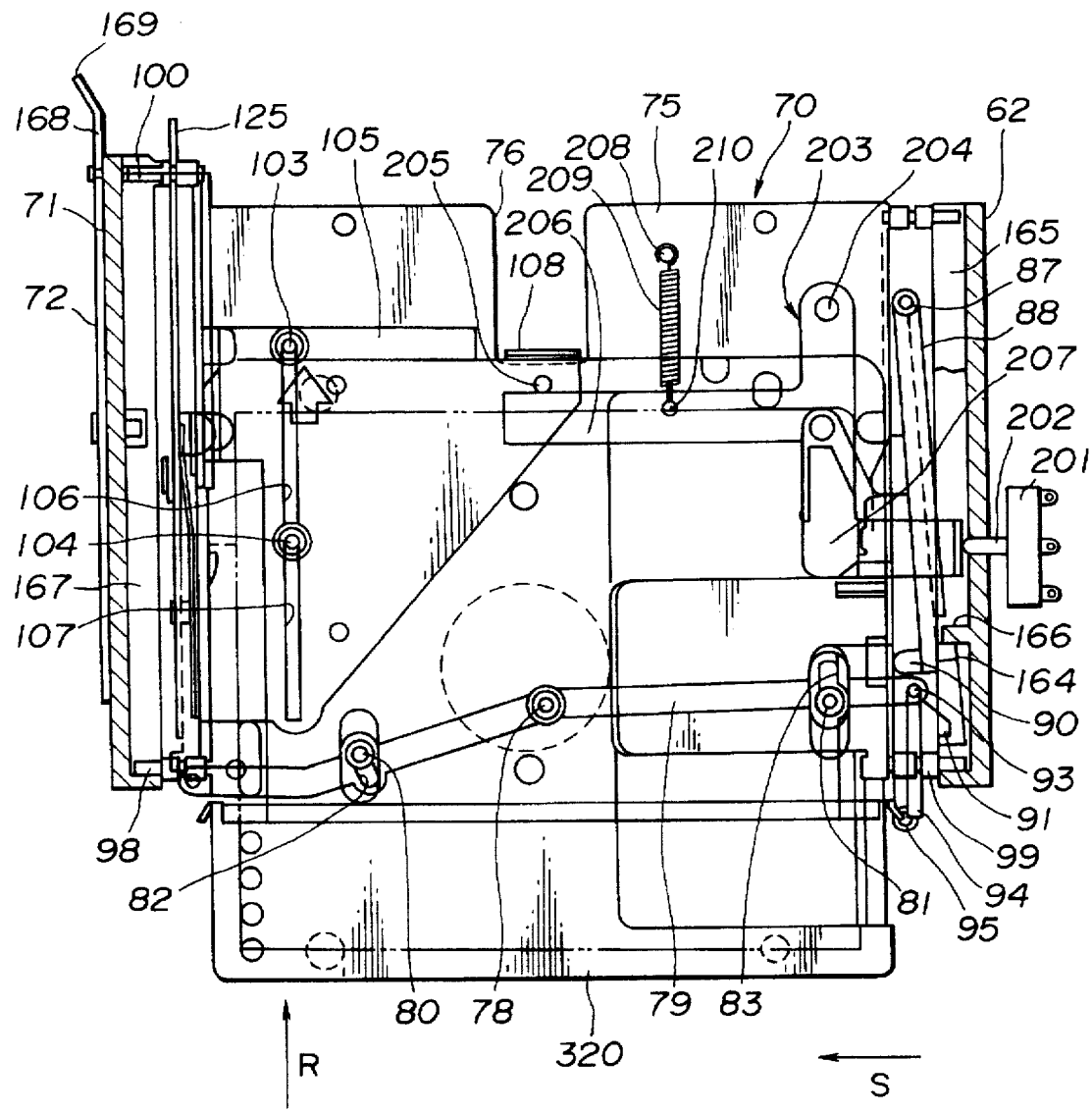
FIG. 93 is a plan view showing a modification of the cartridge holder.

(viii) Operation of a disc changer device (iX) Another construction of a cartridge holder (FIG. 93)

(i) Construction of a disc cartridge (FIGS. 94 to 97)

Figure 94:
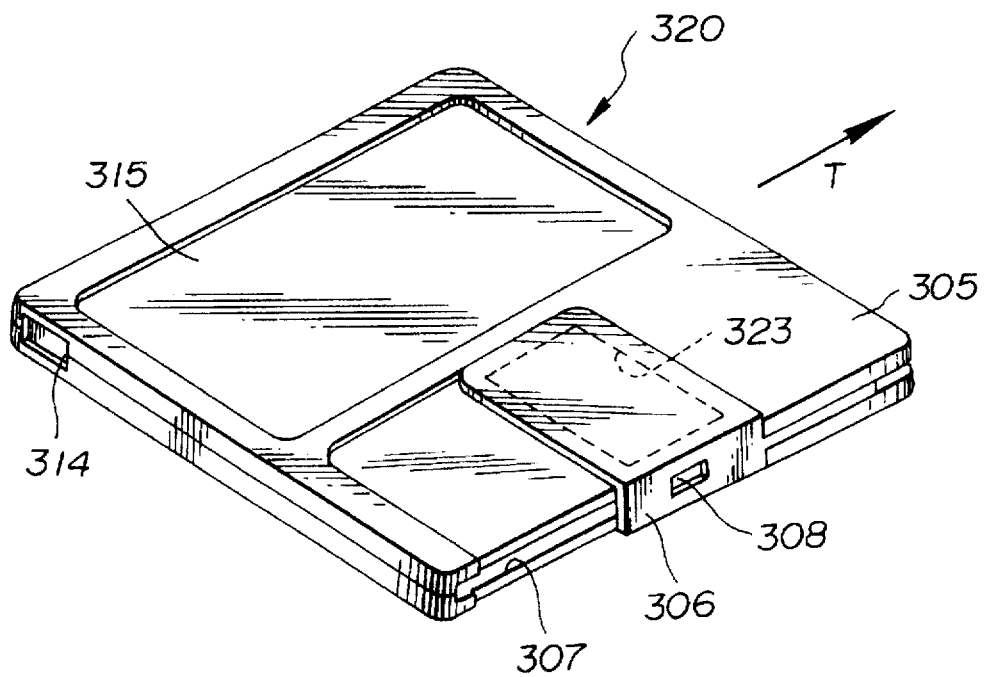
FIG. 94 is a perspective view showing an arrangement of a recording/reproducing disc cartridge loaded on the recording and/or reproducing apparatus, when looking from above.
Figure 95:
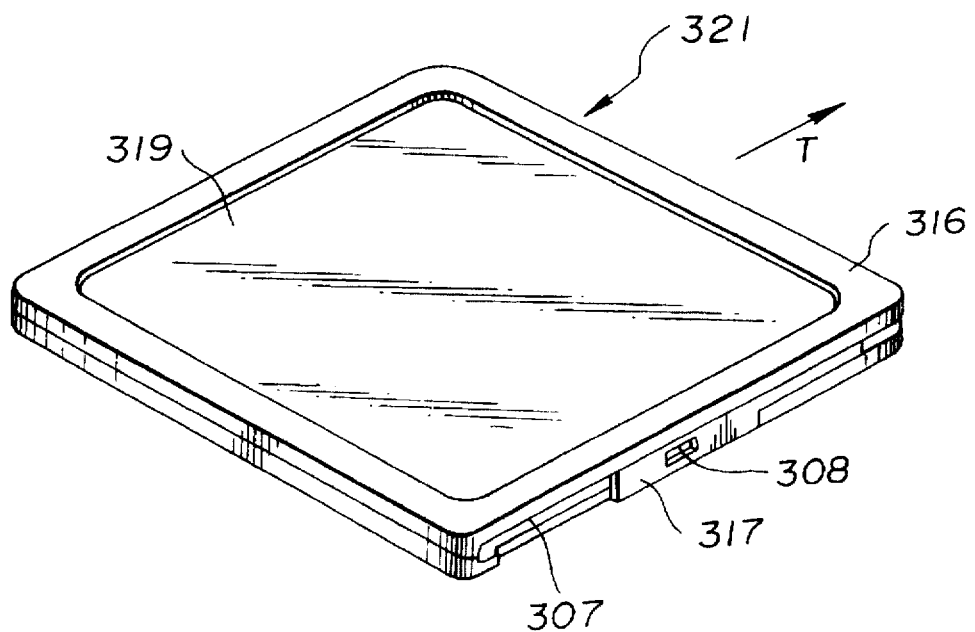
FIG. 95 is a perspective view showing an arrangement of a replay-only disc cartridge loaded on the recording and/or reproducing apparatus, when looking from above.
Figure 96:
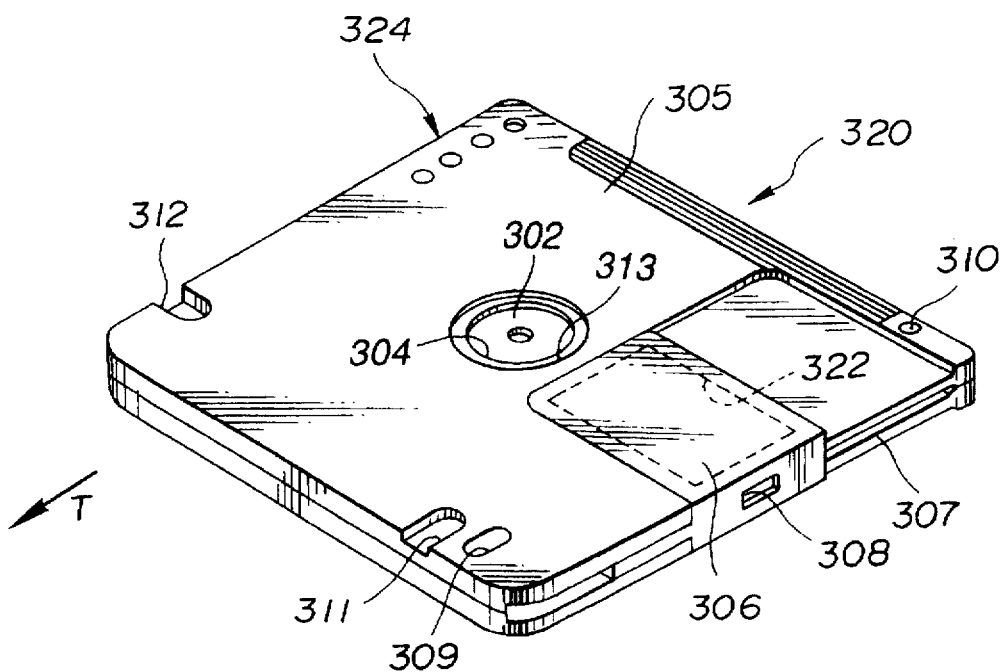
FIG. 96 is a perspective view showing an arrangement of a recording/reproducing disc cartridge loaded on the recording and/or reproducing apparatus, when looking from below.

As the disc cartridge employed in the disc changer device, a recording/reproducing disc cartridge 320, employing a magneto-optical disc as a recording disc, as shown in FIGS. 94 to 96, and a read-only disc cartridge 321, employing an optical disc as a recording disc, are selectively employed.

The magneto-optical disc is comprised of a disc substrate, about 64 mm in diameter, formed of a transparent synthetic resin, such as polycarbonate, and a signal recording layer deposited thereon. Information signals are recorded on the signal recording layer by locally heating it to a temperature higher than the Curie temperature by radiation of a converged laser beam and by applying an external magnetic field to the heated area. The information signals thus written may be read out by radiating a linearly polarized light beam on the signal recording layer and by detecting the rotation of the reflected light beam in the direction of polarization on the signal recording layer under the Kerr effect.

The optical disc is comprised of a disc substrate similar to that of the magneto-optical disc and a reflective layer of aluminum or the like metal deposited thereon. Micro-sized pits corresponding to information signals are formed by, for example, injection molding, on the disc substrate of the optical disc. The information signals written on the optical disc may be read by radiating a coherent light beam, such as a laser light beam, on the pits, and by detecting changes in the light volume caused by diffusion or interference of the reflected light beam by the signal recording layer.

The magneto-optical disc and the optical disc are rotatably housed within disc cartridges 305, 316 for making up disc cartridges, respectively, as shown in FIGS. 94 to 97. The cartridge main member 305, housing the magneto-optical disc for completing the recording/reproducing disc cartridge 320, is in the form of a thin casing having a rectangular-shaped major surface having a side substantially equal in length to the diameter of the magneto-optical disc. The cartridge main member 305 has an aperture 323 for a magnetic head on its upper major surface for exposing a portion of the signal recording surface of the disc to outside, as shown in FIG. 94. The cartridge main member 305 has an aperture 302 for an optical pickup on its lower major surface facing the aperture 323 for the magnetic head and a chuck aperture 313 at a mid portion of the lower major surface, as shown in FIG. 96. The recording/reproducing disc cartridge 320 is inserted in the forward direction into the recording/reproducing apparatus for loading as indicated by arrow T in FIGS. 94 to 96.

With the cartridge main member 305 of the recording/reproducing disc cartridge 320, the aperture 323 for the magnetic head and the aperture 322 for the optical head may be opened and closed by a shutter member 306. The shutter member 306, integrally formed of a synthetic resin or metal, is made up of shutter plate portions parallel to and facing each other and a connection portion interconnecting the shutter plate portions. The shutter plate portions are associated with and correspond in size to the apertures 323, 322. The shutter member 306 has the connecting portion slidably supported in a supporting groove 307 formed on one side of the cartridge main member 305. The shutter member 306 is slid towards rear along a lateral side of the cartridge main member 305 for opening the apertures 323, 322, while being returned to the initial position by being slid from the rear side towards the front side for closing the aperture 323, 322 by the shutter plate portions.

Figure 97:
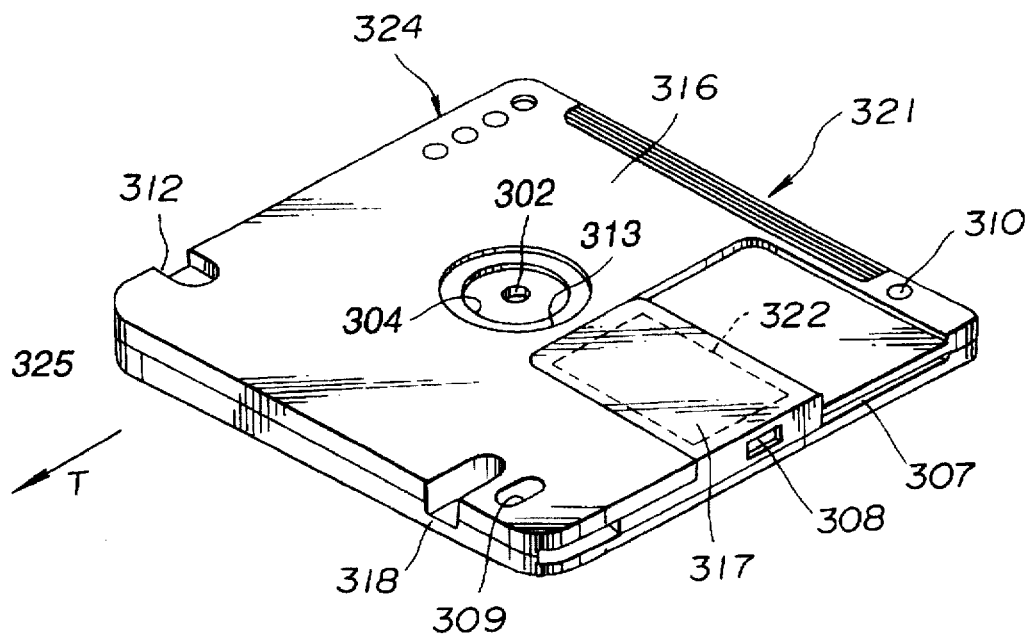
FIG. 97 is a perspective view showing an arrangement of a replay-only disc cartridge loaded on the recording and/or reproducing apparatus, when looking from below.

The cartridge main member 316, housing the optical disc for constituting the read-only disc cartridge 321, is in the form of a thin casing having a rectangular-shaped major surface having a side substantially equal to the diameter of the optical disc. The cartridge main member 316 is not provided with an aperture in its upper major surface, as shown in FIG. 95. The cartridge main member 316 has an aperture 322 for an optical pickup in its lower major surface, and a chuck aperture 313 at a mid portion in the lower major surface, as shown in FIG. 97. The read-only disc cartridge 321 is introduced in the forward direction into the recording and/or reproducing apparatus as shown by arrow T in FIGS. 95 and 97.

The aperture 322 for the optical pickup in the cartridge main member 316 of the read-only optical pickup may be opened and closed by a shutter member 317. The shutter member 317 is integrally formed of synthetic resin or metal and is made up of shutter plate members associated with the aperture 322 for the optical pickup and a supporting portion provided at one end of the shutter plate portions. The shutter member 317 has its supporting portion slidably supported in a supporting groove 307 formed on one lateral side of the cartridge main member 316. The shutter member 317 is slid towards rear along a lateral side of the cartridge main member 316 for opening the aperture 322, while being returned to the initial position by being slid from the rear side towards the front side for closing the aperture 322 by the shutter plate portions.

A shutter closure opening 308 is formed at a mid portion of the connecting portion or the supporting portion of the shutter member 306 or 317 for extending to the lateral surface. The shutter opening aperture 308 is adapted for being engaged by a closure member of the disc changer device for closing the shutter members 306 or 317.

A circular chuck aperture 304 is formed at a mid portion of the magneto-optical disc or the optical disc. The circular chuck aperture 304 is closed from its upper surface by a chuck plate 302. The chuck plate 302 is formed of a magnetic metal material, such as iron or stainless steel, and is formed as a disc of a diameter substantially corresponding to the size of the chuck aperture 304. The chuck aperture 304 and the chuck plate 302 are exposed to the outside of the cartridge main members 305, 316 via the chuck aperture 313.

The lower major surfaces of the cartridge main members 305, 316 are each formed with forward and rear positioning holes 309, 310. The forward positioning hole 309 is positioned near the edge of the forward major surface of the aperture 322 for the optical pickup and is in the form of an oblong circle having the long diameter extending in the fore-and-aft direction. The rear positioning hole 310 is circular-shaped and positioned near the edge of the rear major surface of the aperture 322 for the optical pickup.

A plurality of discrimination openings 324 are formed near the edge of the rear side of the lower major surface of each of the cartridge main members 305, 316. These discrimination openings 324 are used for identifying the type of state of the disc housed within the cartridge main member 305 or 316, for example, for judging whether or not information signals can be recorded thereon. The rear side of the cartridge main member 305 of the recording/reproducing disc cartridge 320 has a save notch 314 in association with the discrimination openings 324. On sliding movement, the save notch 314 is intruded into and receded from one of the discrimination openings 324 for varying the depth of the opening 324 for changing over the discriminating state as to recordability of the information signals. The front side of the lower major surface of each disc cartridge 305, 316 is formed with a mating engagement recess 312.

With the cartridge main member 305 of the recording/reproducing disc cartridge 320, a discrimination recess 311 for discriminating the magneto-optical disc is formed in the forward edge of the lower major surface of the cartridge main member. With the cartridge main member 316 of the read-only disc cartridge 321, a discrimination recess 318 for discriminating the optical disc is formed in the forward edge of the lower major surface of the cartridge main member. The discrimination recess 311 for the magneto-optical disc and the discrimination recess 318 for the optical disc are different in depth from the lower major surface in order to permit the disc housed in the cartridge main member to be identified to be a magneto-optical disc or an optical disc based on such difference in depth.

(ii) Outline of a disc changer device (FIGS. 54 and 61 to 63)

As shown in FIGS. 54 and 61 to 63, the disc changer device has disc stockers 62, 71 for housing a plurality of cartridge holders 70 in tiers. Each cartridge holder 70 is designed to hold a disc cartridge 320 or 321 introduced therein from the front side, as shown by arrow T in FIG. 54. The disc changer device has a mechanical chassis 11 and a lift device for vertically moving the chassis between positions facing respective ones of the cartridge holders 70. The mechanical chassis 11 has an optical pickup 65 and a disc table 64 for recording and/or reproducing information signals on or from the loaded disc cartridge. The disc changer device also has a transporting device as means for transporting the cartridge holder 70 facing the mechanical chassis as far as the mechanical chassis 11. The transporting device 126 is arranged on the mechanical chassis 11. The disc stockers 62, 71, lift device and the mechanical chassis 11 are mounted on the base chassis 10 as the base and are housed in their entirety in an outer casing 74.

With the present disc changer device, control of the motors, detection switches, optical pickup unit and the magnetic head and signal exchange with these devices are performed by a control circuit, not shown, that is operated responsive to an input device, also not shown.

(iii) Construction of a lift device (FIGS. 1 to 24)

As previously discussed, the lift device represents the movement device as applied to the present disc changer device. The lift device is adapted for moving the mechanical chassis 11 on a straight locus of movement within a pre-set range as an object to be moved, as shown in FIGS. 1 to 4. With the present disc changer device, the lift device is adapted for moving the mechanical chassis 11 vertically as indicated by arrows C and D in FIG. 2.

The mechanical chassis 11 is biased into downward movement under the force of gravity. The mechanical chassis 11 has a forward pair and a rear pair of profiling pins 12, 13, 12, 13. The mechanical chassis 11 is arranged between the sidewall sections 1 and 2 set upright for facing and parallel to each other on the base chassis 10 of the disc changer device.

The mechanical chassis 11 is sequentially uplifted by continued rotation of the first cam gear 51 in the positive direction. The mechanical chassis 11 is sequentially lowered by continued rotation of the first cam gear 51 in the reverse direction, as discussed above.

(iv) Construction of a mechanical chassis (FIGS. 82 to 88)

The mechanical chassis 11, lifted by the lift device, is substantially planar, and has a disc drive unit 174 as a recording and/or reproducing apparatus at a forward portion thereof, as shown in FIGS. 82 to 88.

Figure 82:
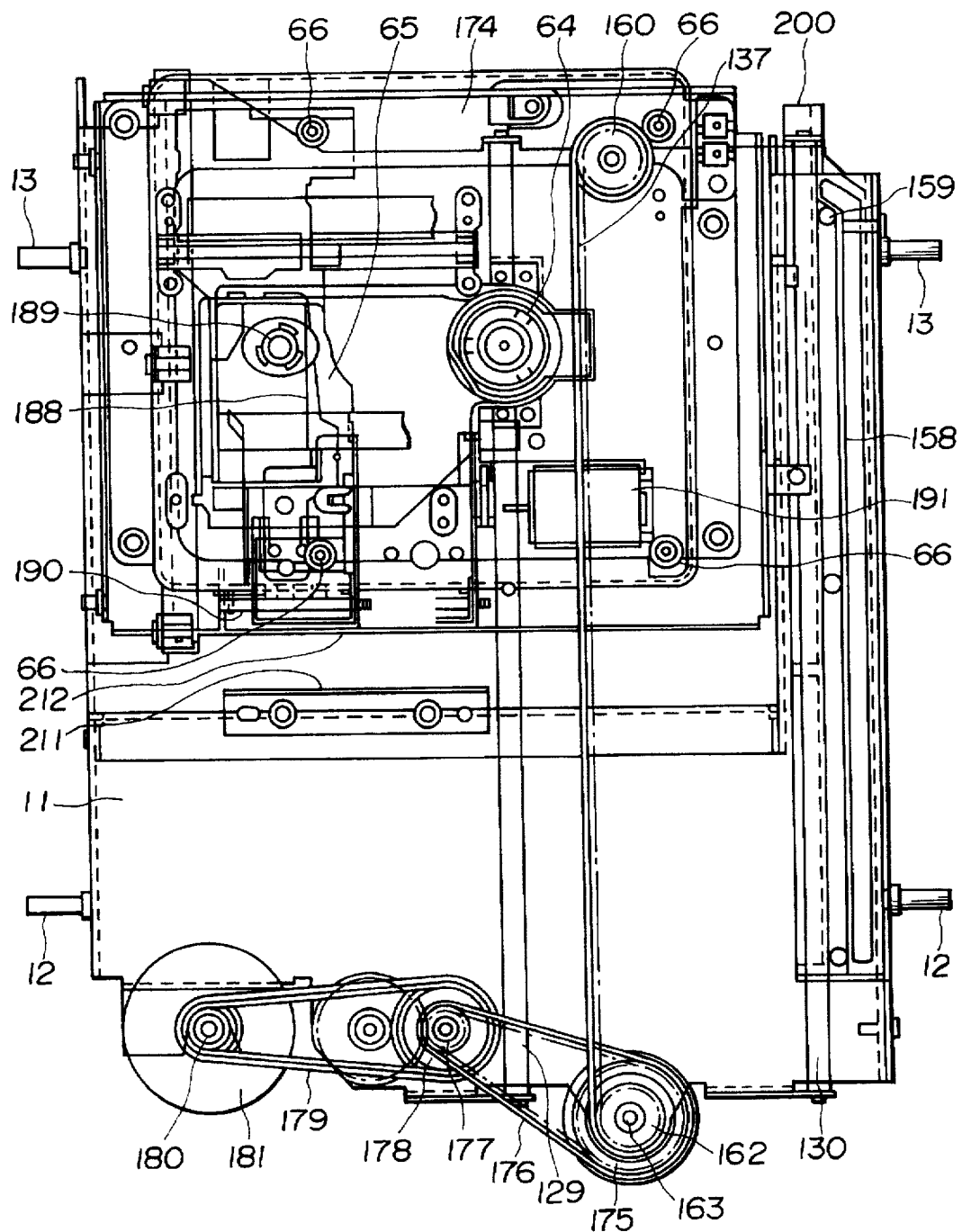
FIG. 82 is a plan view showing an arrangement of a mechanical chassis on which the disc cartridge is to be loaded, with the inside of the chassis being seen from outside.
Figure 83:
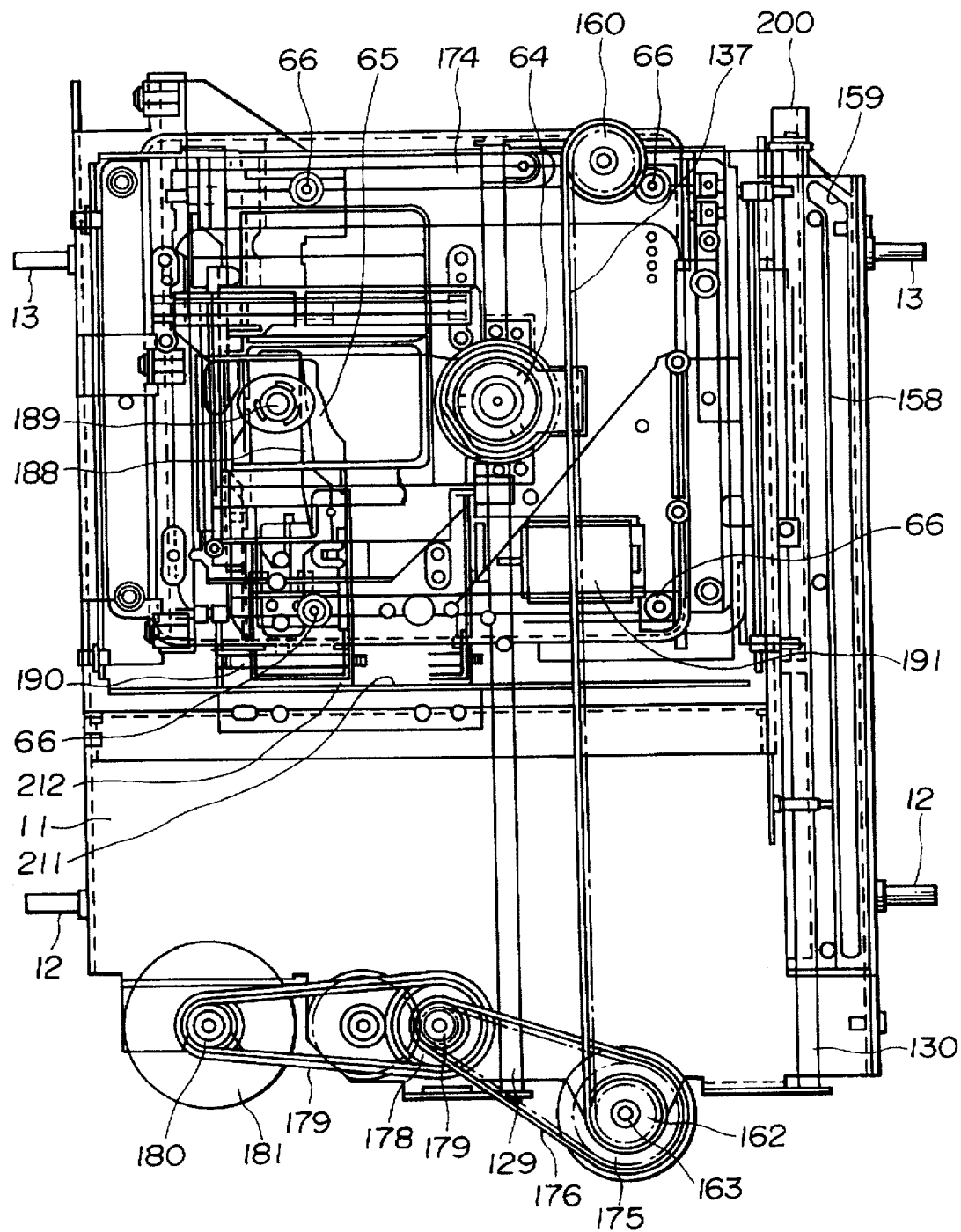
FIG. 83 is a plan view showing the mechanical chassis when loading the disc cartridge.
Figure 84:
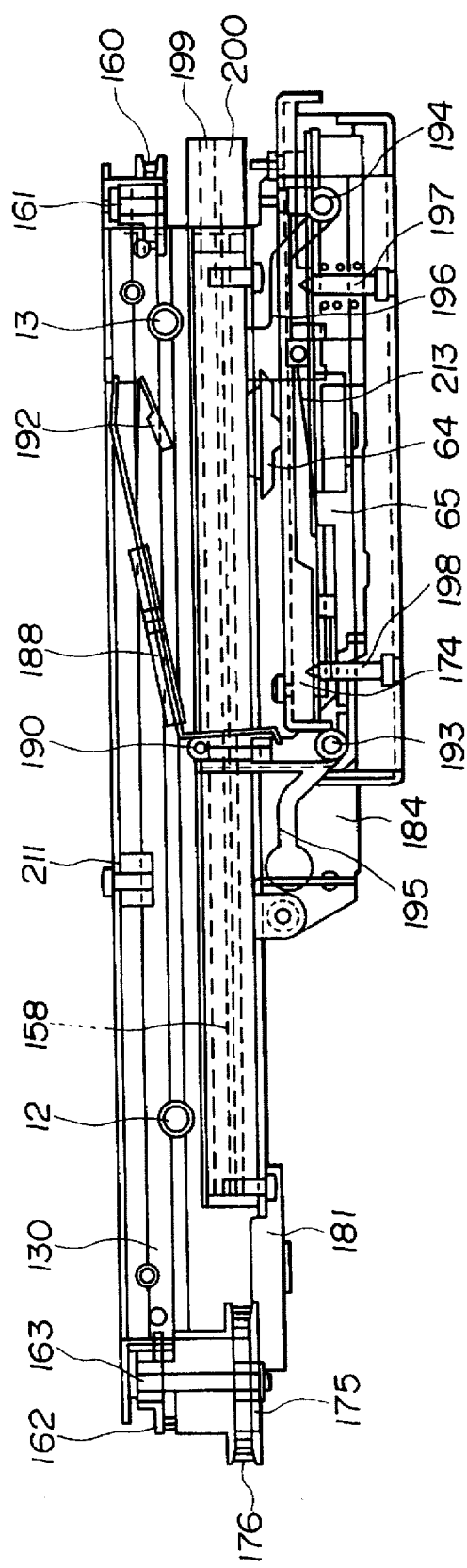
FIG. 84 is a side view showing an arrangement of a mechanical chassis on which the disc cartridge is to be loaded, with the inside of the arrangement being seen from outside.
Figure 85:
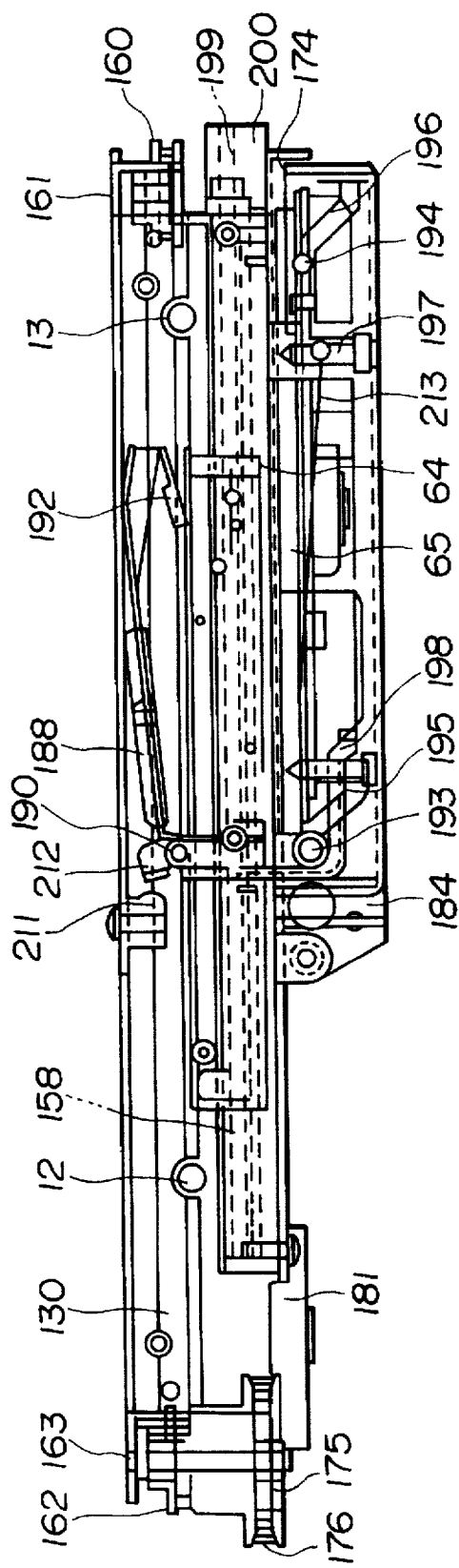
FIG. 85 is a side view showing the mechanical chassis when the disc cartridge is loaded for executing the playback mode.

The disc drive unit 174 has a rectangular-shaped chassis, substantially equal in size to the disc cartridge 320 or 321, carrying thereon a disc table 64 engaged in a chuck aperture 304 of the disc and an optical pickup unit 65 for writing or reading information signals on or from the disc. The chassis of the disc driving unit 174 has a forward pair and a rear pair of supporting pins 193, 193, 194, 194 by which the chassis is supported by a left pair and a right pair of support pieces 184, 184 of the mechanical chassis 11. Each of the support pieces 184, 184 has a forward pair and a rear pair of inclined slits 195, 195, 196, 196 passed through by the support pins 193, 193, 194, 194. These inclined slits 195, 195, 196, 196 are inclined so that the rear portions thereof are higher in level than the forward portions thereof. Thus the disc drive unit 174 is set to a release position lowered relative to the mechanical chassis 11, as shown in FIGS. 82 and 84, by being moved forwardly relative to the mechanical chassis 11. On the other hand, the disc drive unit 174 is set to a chuck position uplifted relative to the mechanical chassis 11, as shown in FIGS. 83 and 85, by being moved rearwardly relative to the mechanical chassis 11.

The disc drive unit 174 is moved towards rear in this manner by a transporting device 126 as later explained. The disc drive unit 174 is biased into forward movement by a tension coil spring 213 mounted between it and the mechanical chassis 11. The disc drive unit 174 is supported on the mechanical chassis 11 via plural dumpers 197, 198.

The optical pickup unit 65 includes an optical block within which are enclosed a light source, such as a semiconductor laser, an optical system for guiding a light beam from the light source, an objective lens 189 for converging and emitting the light beam, and a photodetector for detecting the return light beam from the objective lens 189. The disc table 64 is substantially in the form of a disc on the upper surface of which there is formed a central conically-shaped protrusion engaged in the chuck aperture 304. The protrusion has enclosed therein a permanent magnet for magnetically attracting the chuck plate 302.

The disc table 64 is set at a mid portion of the chassis of the disc drive unit 174, and is adapted for being rotated by a spindle motor mounted on the lower surface of the chassis. The optical pickup unit 65 is mounted on the lower surface of the chassis of the disc drive unit and directs the light beam from the objective lens 189 upwards through a through-hole 67 formed in the chassis. The optical pickup unit 65 is mounted laterally of the disc table 64 and is adapted for being movable along the chassis in a direction towards and away from the disc table 64.

On the chassis of the disc driving unit 174 are set four positioning pins 66 at the corner regions. When the disc cartridge 320 or 321 is set and loaded on the chassis, those of the positioning pins 66 disposed ahead and at back of the optical pickup unit 65 are engaged in the forward and rear positioning holes 309 and 310 for positioning the disc cartridge 320 or 321. The recording disc is held in position by the protrusion of the disc table 64 engaged in the chuck aperture 304 and by the chuck plate 302 attracted by the permanent magnet. On the chassis of the disc driving unit 174 is mounted a detection switch for detecting the depth of the discrimination opening 324.

Figure 86:
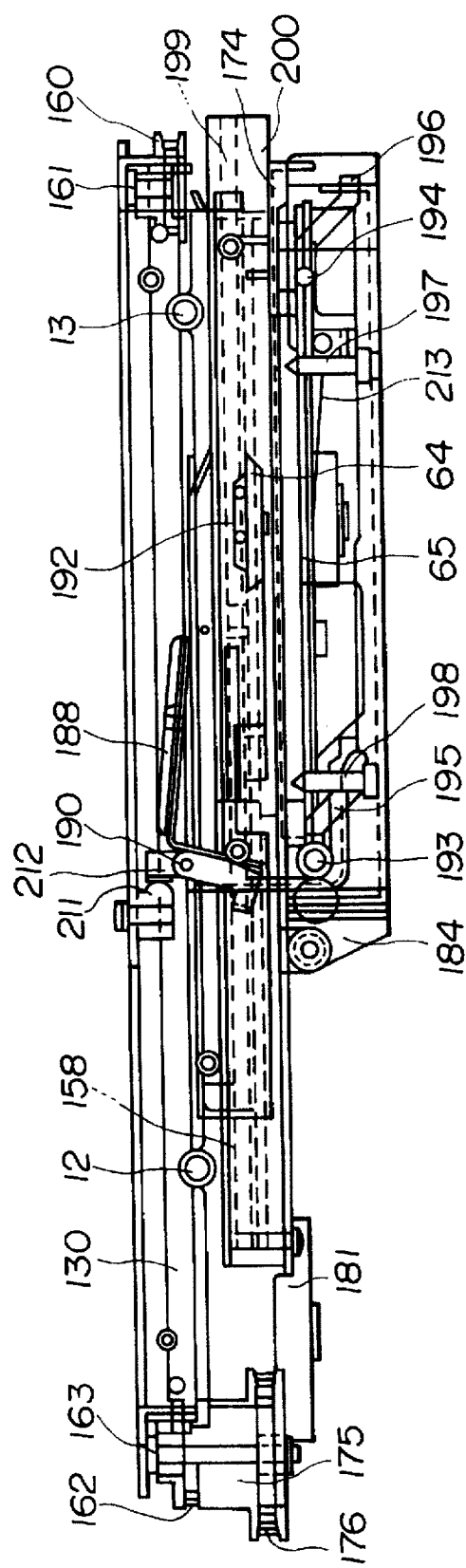
FIG. 86 is a side view showing the mechanical chassis when the disc cartridge is loaded for executing the recording mode.
Figure 87:
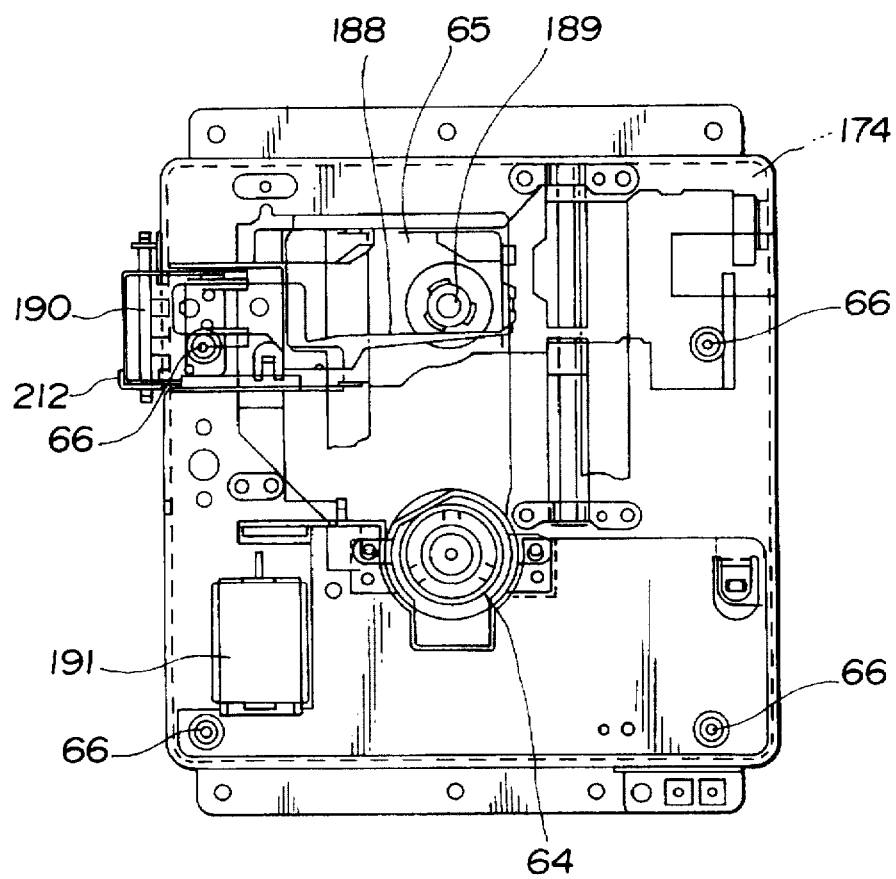
FIG. 87 is a plan view showing a disc drive constituting the mechanical chassis, with the inside of the disc drive being seen from outside.
Figure 88:
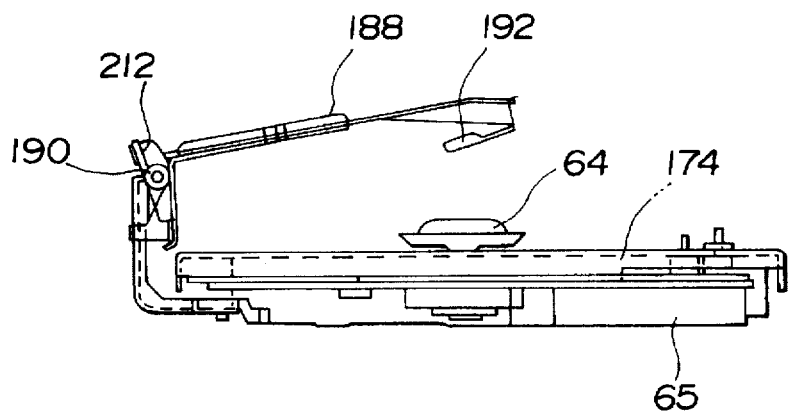
FIG. 88 is a side view showing an arrangement of the disc drive, with the inside of the arrangement being seen from outside.

A magnetic head 192 is mounted on the optical pickup unit 65 via a head arm 188. The head arm 188 has its proximal end rotatably supported via a support shaft 190 relative to the optical pickup unit 65 and carries at its distal end the magnetic head 192 via a gimbal spring so that the magnetic head is movable towards and away from the objective lens 189. The head arm 188 is biased by a spring placed around the support shaft 190 into rotation for moving the magnetic head 192 upwards away from the objective lens 189. The head arm 188 has an abutment piece 212 at its proximal portion. By the disc drive unit 174 in the chuck position being moved further to its recording position, as shown in FIG. 85, the abutment piece 212 is caused to bear against the abutment piece 211 mounted on the mechanical chassis 11, as shown in FIG. 86, for rotating the head arm 188 in a direction of lowering the magnetic head 192. With the present disc changer device, the playback mode is executed while the disc drive unit 174 is at the chuck position, and the recording mode is executed while the disc drive unit 174 is at the recording position. During the recording mode, the magnetic head 192 is intruded into the cartridge main member 305 via the aperture 323 for the magnetic head into sliding contact with the magneto-optical disc.

(v) Construction of a cartridge holder (FIGS. 55 to 58 and 69)

With the present disc changer device, the disc cartridge 320 or 321 is introduced into plural cartridge holders 70 supported by the disc stockers 62, 71 as later explained.

The cartridge holder 70 has a holding plate 75 for holding the disc cartridge 320 or 321, as shown in FIGS. 55 to 58. The holding plate 75 is in the from of a substantially rectangular flat plate corresponding in shape and size to the disc cartridge 320 or 321, and has its both lateral sides bend downwards. The lateral edge portions thus bent down are further bent inward towards each other to from a pair of cartridge holding portions 98, 97. The disc cartridge 320 or 321 is inserted from the forward side into a space between the main plate portion of the holding plate 75 and the cartridge holing portions 98, 97 so as to be held by the holding plate 75.

One of the lateral sides of the holding plate 75 bent downwards is formed with an inwardly bent mistaken insertion prohibitive lug 102. The mistaken insertion prohibitive lug is intruded into a mistaken insertion prohibitive groove formed in the disc cartridge 320 or 321 when the disc cartridge is inserted in the regular direction. Conversely, when the disc cartridge 320 or 321 is about to be inserted in the incorrect direction into the holding plate 75, the lug prohibits insertion of the disc cartridge 321 or 321.

On the downwardly bent lateral sides of the holding plate 75 are formed a forward pair and a rear pair of supporting pins 98, 100, 99, 101 extending outward. The cartridge holder 70 is supported via these supporting pins by the disc stockers 62, 71, as later explained.

On the upper surface of the holding plate 75 is mounted a slider 105 for sliding in the fore-and-aft direction. The slider 105 is formed as a substantially flat triangular plate and has a forward pair and a rear pair of slits 106, 107 in which supporting shafts 103, 104 set upright on the upper surface of the holding plate 75 are introduced in order to permit the slider to be movable in the fore-and-aft direction.

The slider 105 has at its rear edge a downwardly bent tongue 108 which depends below the major plate portion of the holding plate 75 via a cut-out 76 formed in the rear edge portion of the holding plate 75 to a position of facing the forward end face of the disc cartridge 320 or 321. When the disc cartridge 320 or 321 is inserted into the holding plate 75 until the tongue 108 is caused to bear against the forward end face of the disc cartridge, the disc cartridge has its rear portion protruded towards the front side of the holding plate 75. The slider 105 has its lateral side bent downwards along one lateral side of the holding plate 75 and carries a spring plate member 111 mounted on the bent portion. The spring plate portion 111 has its forward end secured to the slider 105 while having its rear end as a free end carrying a fitting member 112. The fitting member 112 is intruded more inwardly than the bent portion of the holding plate 75 and engaged in the mating engagement recess 312 in the disc cartridge 320 or 321 held by the holding plate 75.

The major plate portion of the holding plate 75 has a through-hole 77 in registration with the aperture for the magnetic head 323.

On the lateral side of the holding plate 75 is slidably mounted a side plate 125 for sliding in the fore-and-aft direction. The side plate 125 has a forward pair and a rear pair of slits 113, 116. The side plate 125 is supported for sliding movement in the fore-and-aft direction by having an engagement pin 110 on the slider 105 in the forward side slit 113 and by having a support pin 100 formed at a rear portion on one lateral side of the slider 105 in the rear side slit 116.

The slider 105 has its slide range defined by the length of the slits 105, 106. The side plate 125 has its slide range relative to the slider 105 defined by the length of the forward side slit 113. That is, the side plate 125 may be slid relative to the holding plate 75 within a range which is equal to the sum of the slide range of the slider 105 relative to the holding plate 75 and the slide range of the side plate 125 relative to the slider 106.

On the slider 105 is mounted a spring retainer 109 extending in the same direction as the engagement pin 110. The spring retainer 109 is introduced into a through-hole 114 formed in the side plate 125 at back of the forward side slit 113. Between the spring retainer 109 and a forward edge 121 of the through-hole 114 is mounted a tension coil spring 115. That is, the slider 105 is biased into forward movement relative to the side plate 125 as indicated by arrow L in FIG. 55. The side plate 125 is biased into rearward movement relative to the holding plate 75 by a tension coil spring 124 mounted between the spring retainer 122 provided at a mid portion of the side plate 125 and a spring retainer 123 mounted at a rear side of the holding plate 75 as indicated by arrow M in FIG. 55.

The rear side of the side plate 128 is protruded further rearward from the rear edge of the holding plate 75. The rear side portion of the side plate 125 has an engagement opening 117 engaged by movement means as later explained. The engagement opening 117 is in continuation from the rear end of the rear slit 116. The rear end portion of the side plate 125 has a mating retention pin 118.

On the opposite lateral side of the holding plate 75 is mounted a lock arm 88. The lock arm 88 has its rear end rotatably supported via a support shaft 87 by a rear portion of the opposite lateral side of the holding plate 75, while having its forward end as a free end. The lock arm 88 is biased into rotation by a tension coil spring 85 in a direction in which its forward end is brought into pressure contact with the holding plate 75 as indicated by arrow J in FIG. 55. The tension coil spring 85 is mounted between a spring retainer 88 mounted at its mid portion and a spring retainer 84 mounted at a mid portion of the major plate portion of the holding plate 75. The lateral side of he lock arm 88 in contact with the holding plate 75, that is its inner side, has a shutter opening lug 89 and a shutter closing lug 90. These lugs 89, 90 are protruded inward via the downwardly directed opposite lateral side portion of the holding plate 75. The outer lateral side of the lock arm 88 has a lock recess 92 retained by the disc stocker 62 as later explained. The forward side of the lock arm 88 has a forwardly inclined taper portion 91.

On the holding plate 75 is mounted a coupling arm 79 having its mid portion rotatably supported by a support shaft 78. The coupling arm 79 has its one end positioned at the forward side of the side plate 125 and its other end facing the taper portion 91 at the forward end of the lock arm 88. One end of the coupling arm 79 carries an abutment pin 120 abutted by the forward end of the side plate 125. The opposite side of the coupling arm 79 carries a downwardly directed sliding pin 93 kept in sliding contact with the taper portion 91. Arcuate slits 82, 83 centered at the support shaft 78 are formed at one and the other end of the coupling arm 79. Rotation limiting pins 80, 81 set upright on the holding pin 75 are introduced into these slits 82, 83 for limiting the range of rotation of the coupling arm 79. The coupling arm 79 is biased into rotation by a tension coil spring 94 mounted between the slide contact pin 93 and a spring retainer 95 mounted at a forward side of the opposite lateral side of the holding plate 75 in a direction of forwardly moving the abutment pin 93 as indicated by arrow G in FIG. 55.

Figure 58:
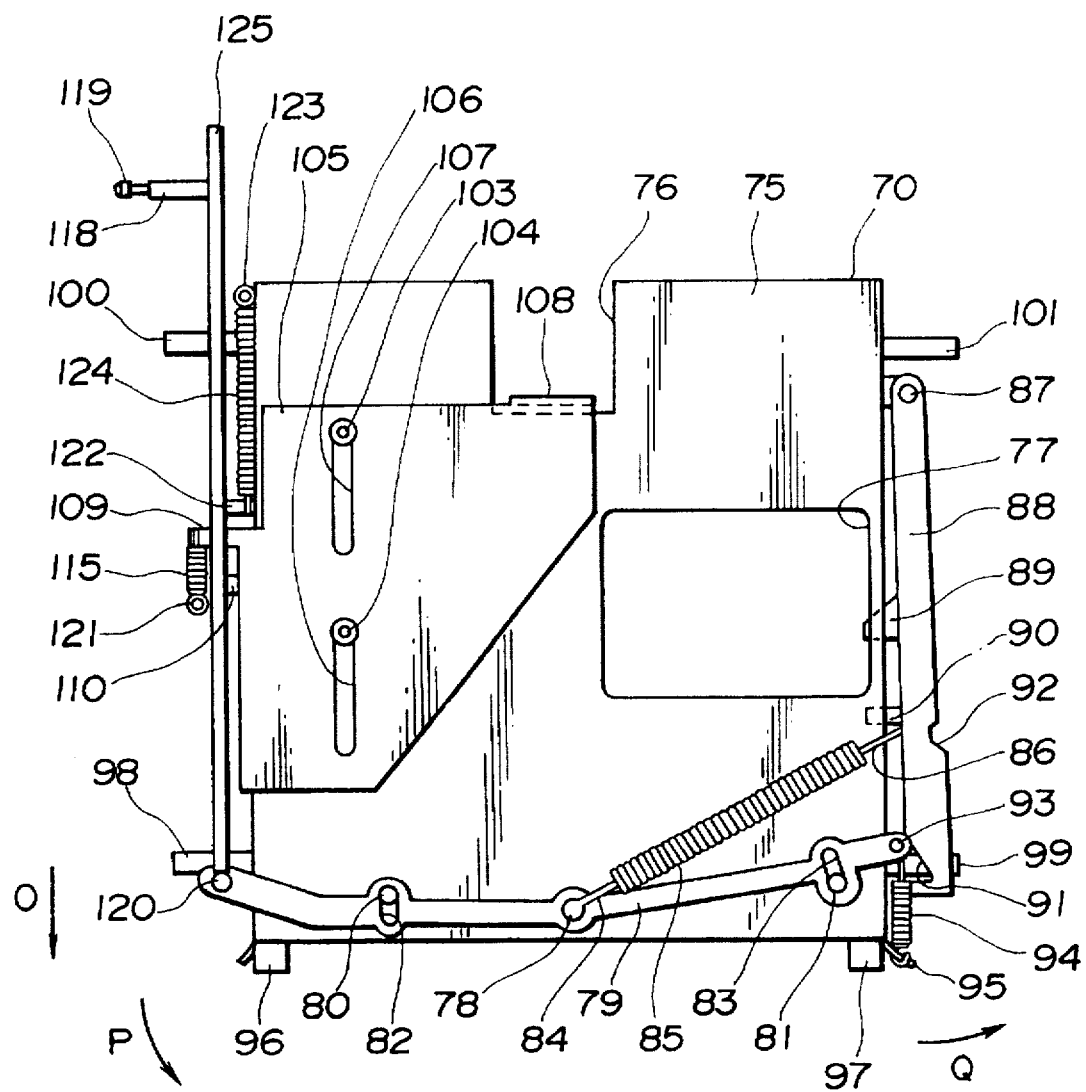
FIG. 58 is a plan view showing the state in which the side plate in the above cartridge holder is further thrust from the state shown in FIG. 30.

When the slider 105 and the side plate 125 are slid forwards as indicated by arrow O in FIG. 58, the coupling arm 79 has its abutment pin 120 thrust by the forward end of the side plate 125. Thus the coupling arm 79 is rotated against the bias of the tension coil spring 94, as indicated by arrow P in FIG. 58. The slide contact pin 93 is brought into sliding contact with the tapered portion 91 for rotating the lock arm 88 outward against the bias of the tension coil spring 85 as indicated by arrow Q in FIG. 58.

Figure 56:
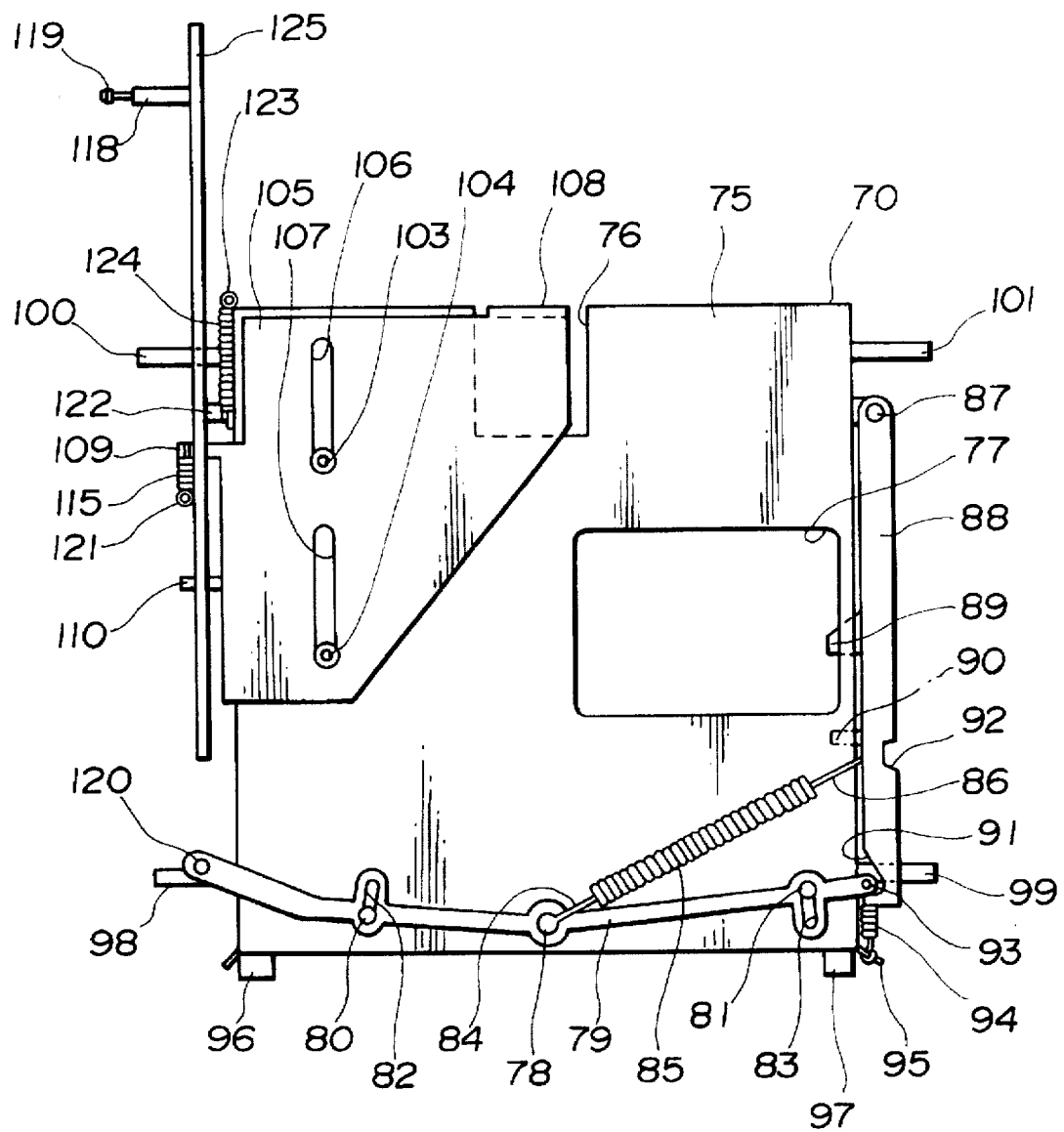
FIG. 56 is a plan view showing an arrangement of the cartridge holder.
Figure 57:
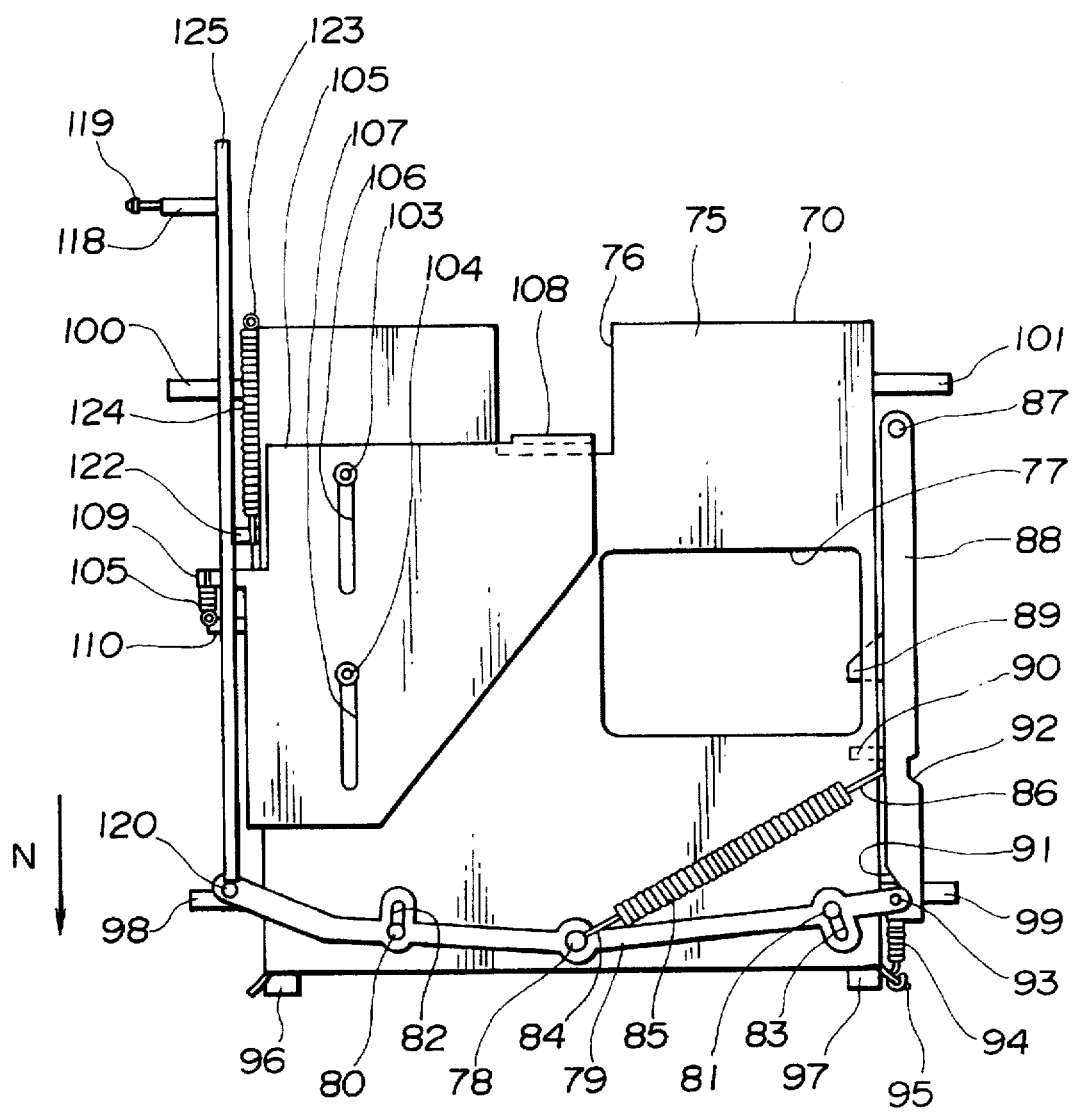
FIG. 57 is a plan view sowing a thrust state of a side plate in the cartridge holder.

The state of the cartridge holder 70 in the absence of an external pressure is such that the side plate 125 and the slider 105 are located towards rear, while the coupling arm 79 and the lock arm 88 have been rotated under the bias of the tension coil springs 94, 85, respectively, as shown in FIG. 56.

(vi) Construction of a disc stocker (FIGS. 60, 64 to 68)

Figure 60:
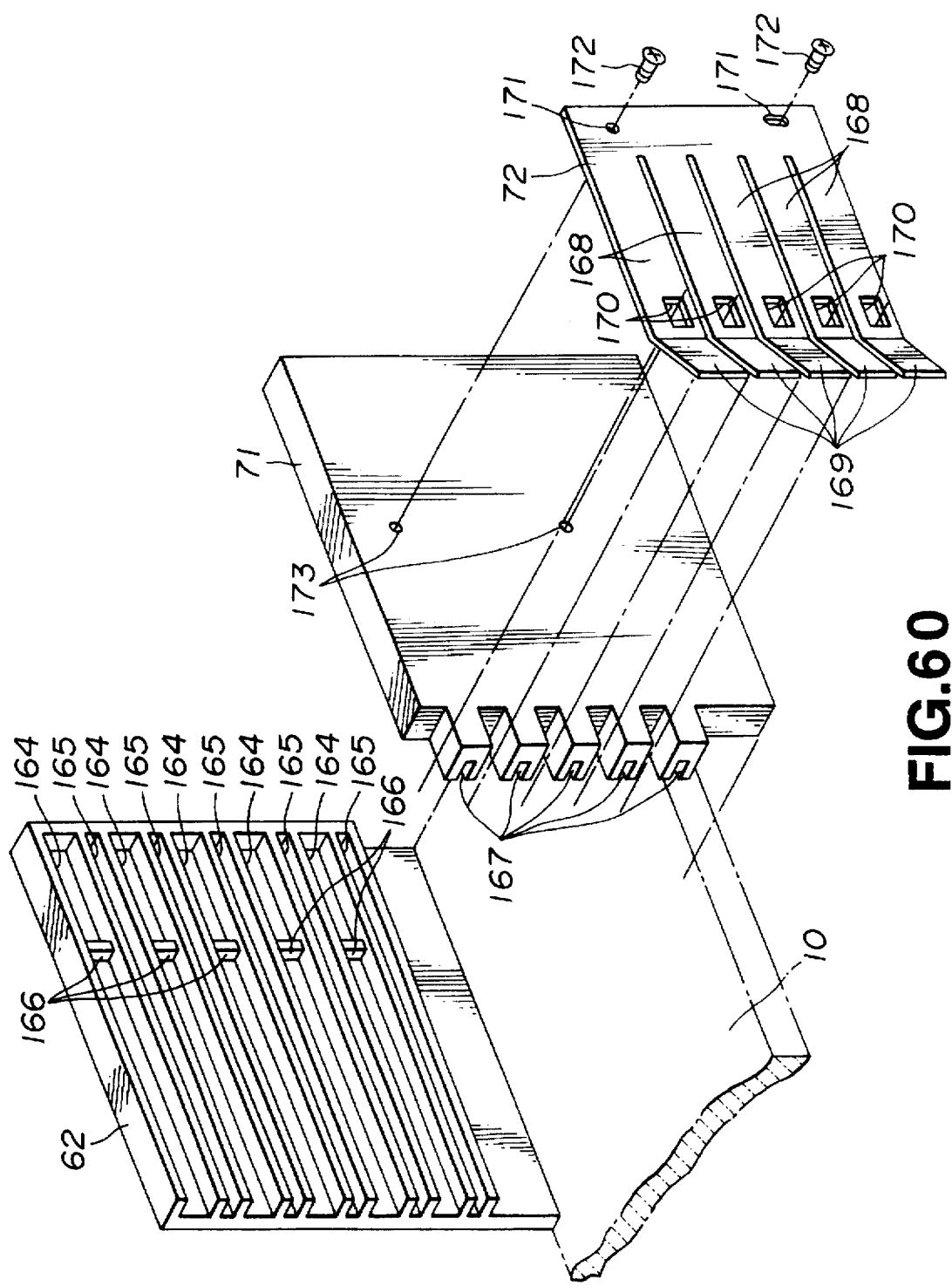
FIG. 60 is an exploded perspective view showing an arrangement of a disc stocker in the above recording and/or reproducing apparatus.

Each of the disc stockers 62, 71 is formed as a substantially flat plate, and is set on the forward side of the base chassis 10, that is on the forward side of the mechanical chassis 11, in the form of sidewall sections facing each other, as shown in FIG. 60. The distance between these disc stockers 62, 71 corresponds to the transverse width of the cartridge holder 70. The surfaces of the disc stockers 62, 71 facing each other are formed with plural support grooves 165, 165 engaged by the support pins 99, 101, 98, 100 of the cartridge holder 70. These support grooves 165, 167 face one another at the same height in vertically spaced apart positions. These support grooves 165, 167 are formed for extending from the forward side towards the rear side of each disc stocker 62, 71. The forward ends of the support grooves are closed by the front wall sections, while the rear ends thereof are opened towards rear.

A number of the disc cartridges 70 are supported in tiers for lying across the disc stockers 62, 71 by engaging the support pins 99, 101, 98, 100 in the support grooves 165, 167. The disc stocker 62 facing the opposite lateral side of the cartridge holder 70, that is the side thereof having the lock arm 88, has a plurality of grooves 164 overlying the support grooves 165 and facing the lock arm 88. Within each of these grooves 164 is formed a retention piece 166 engaged in the lock recess 92 for retaining the cartridge holder 70 when the cartridge holder 70 is at a forward position between the disc stockers 62, 71 and the lock arm 88 is rotated in a direction away from the cartridge holder 70, as shown in FIG. 65.

Figure 64:
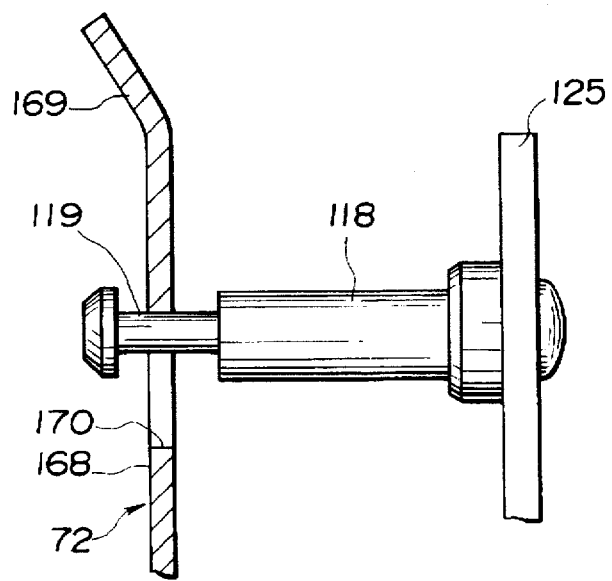
FIG. 64 is an enlarged plan view showing an arrangement of essential portions of a side plate of a cartridge holder of the above recording and/or reproducing apparatus.

On the outer side of the disc stocker 71 facing a lateral side of the cartridge holder 70 carrying the side plate 125 is mounted a lock plate 72 by set screws 172, 172. These set screws 172, 172 are passed through screw holes formed in the forward side of the lock plate 72 and are screwed into tapped holes 171, 171 formed in the forward side portion of the lock plate 72. The lock plate 72 is formed as a spring plate from an elastic material such as a metal plate. The lock plate 72 is formed with plural parallel slits extending from its rear edge towards its forward side and is thereby divided into plural strip-like portions 168. The lock plate 72 is mounted on the disc stocker 71 with the strip-like portions 168 lying on the support grooves 167. Each of the strip-like portions 168 has its rear end portion bent 30° to 40° outward to form an inclined section 169. The inclined section 169 of each strip-like portion 168 is protruded towards rear of the disc stocker 71. The rear end of each strip-like portion 168 has a lock hole 170. Each lock hole 170 is positioned at back of the rear end of the disc stocker 71. When the cartridge holder 70 is positioned at a forward side portion between the disc stockers 62, 71, and the side plate 125 is slid forwards, the side plate 125 is held at the forward side position, with the mating retention pin 118 being engaged in the lock hole 170, as shown in FIGS. 64 and 65. The mating retention pin 118 has a reduced-diameter portion at its mid portion and is prohibited from descent from the lock hole 170 by the forward edge of the lock hole 170 engaged in the reduced-diameter portion 119. The mating retention pin 118, thus engaged in and retained by the lock hole 170, is extracted out of the lock hole 170 by moving the side plate 125 further forwards for disengaging the reduced-diameter portion 119 from the forward edge of the lock hole 170 and subsequently elastically displacing the strip-like portion 168 outward away from the side plate 125. Such movement of the side plate 125 towards the forward side and displacement of the strip-like portion 168 towards outside are executed by the transporting device 126 as later explained.

Figure 65:
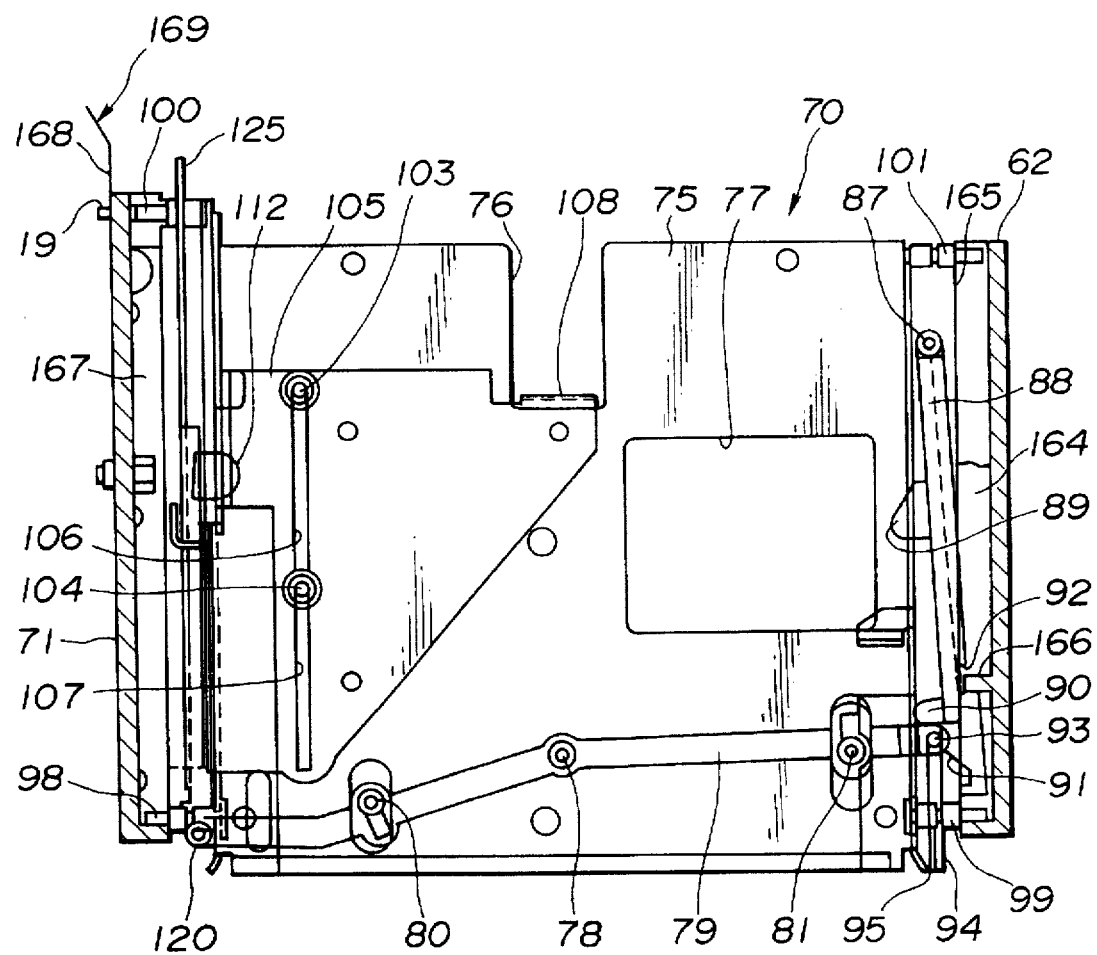
FIG. 65 is a plan view showing a cartridge holder housed in the disc stocker.

With the disc stockers 62, 71, the cartridge holder 70 is held at its forward position by the side plate 125 being held at the forward position when the mating retention pin 118 is inserted into and retained by the lock hole 170, as shown in FIG. 65. In addition, the cartridge holder 70 is held at the forward position by the forward end of the side plate 125 being caused to bear against the abutment pin 120 to rotate the coupling arm 79, with the lock arm 88 being rotated outward for retaining the lock recess 92 by the retention piece 166.

Figure 66:
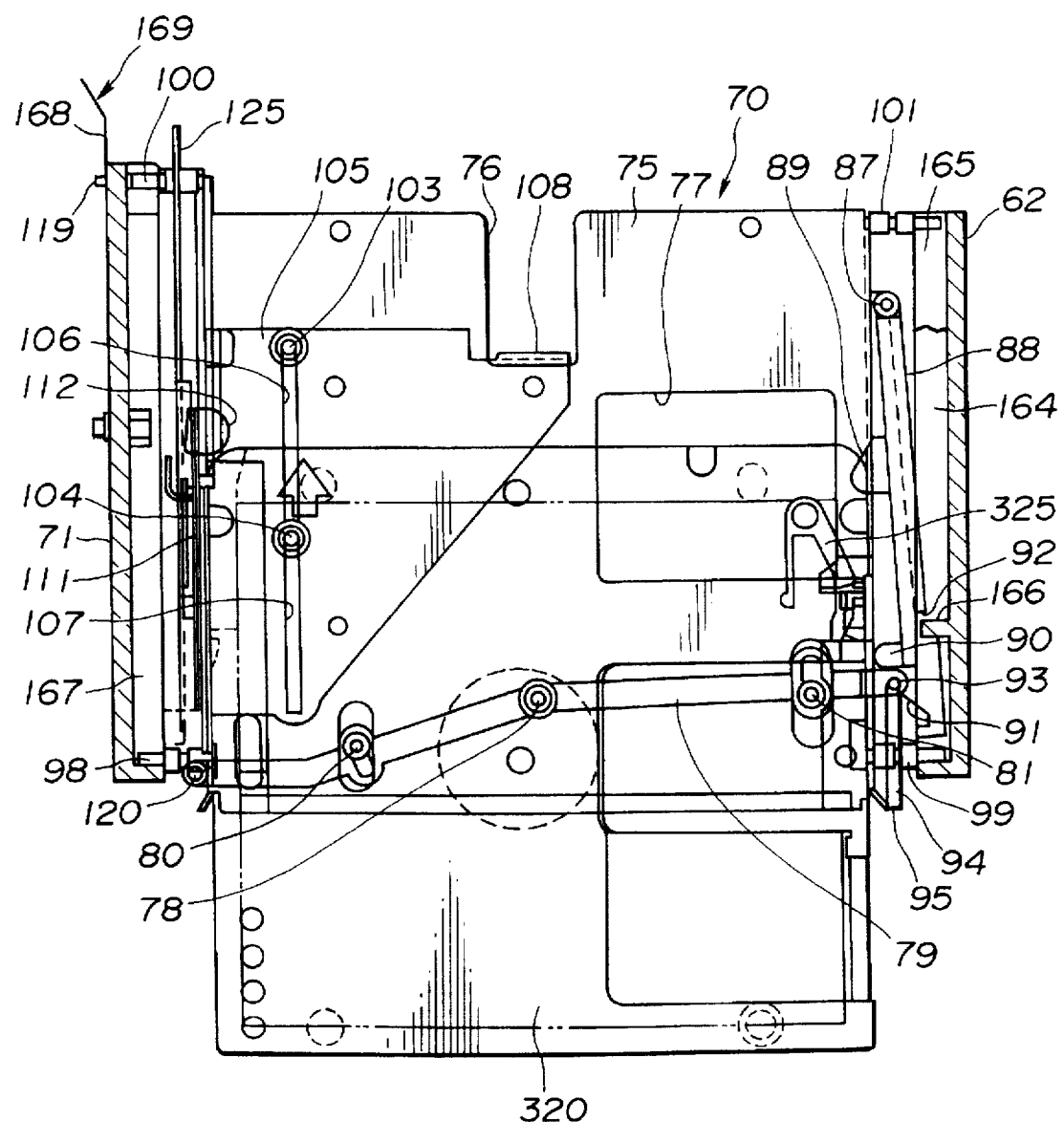
FIG. 66 is a plan view showing the state of the disc cartridge being introduced into the cartridge holder housed within the disc stocker.
Figure 67:
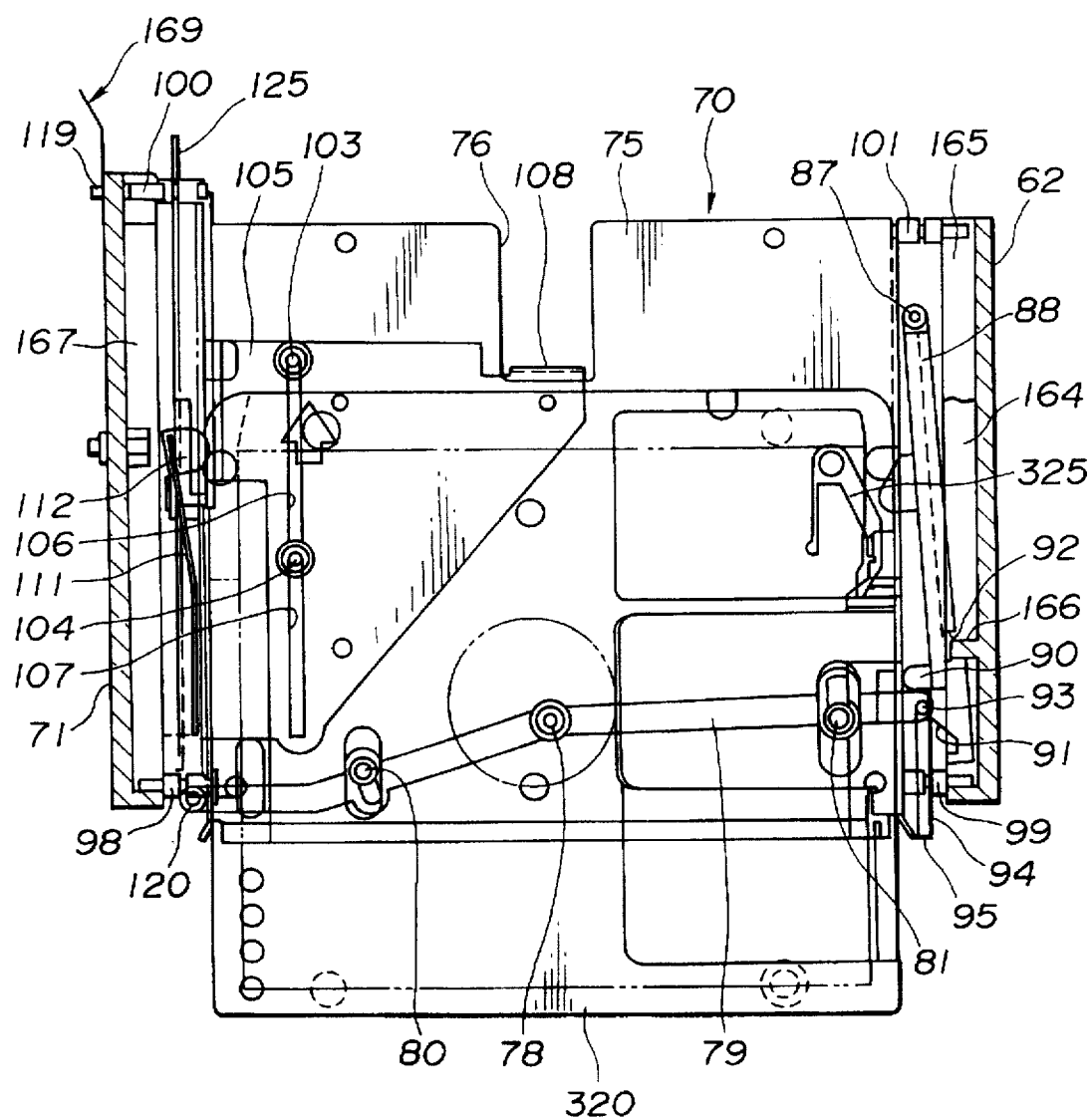
FIG. 67 is a plan view showing the state in which the disc cartridge is being introduced into the cartridge holder housed within the disc stocker.
Figure 68:
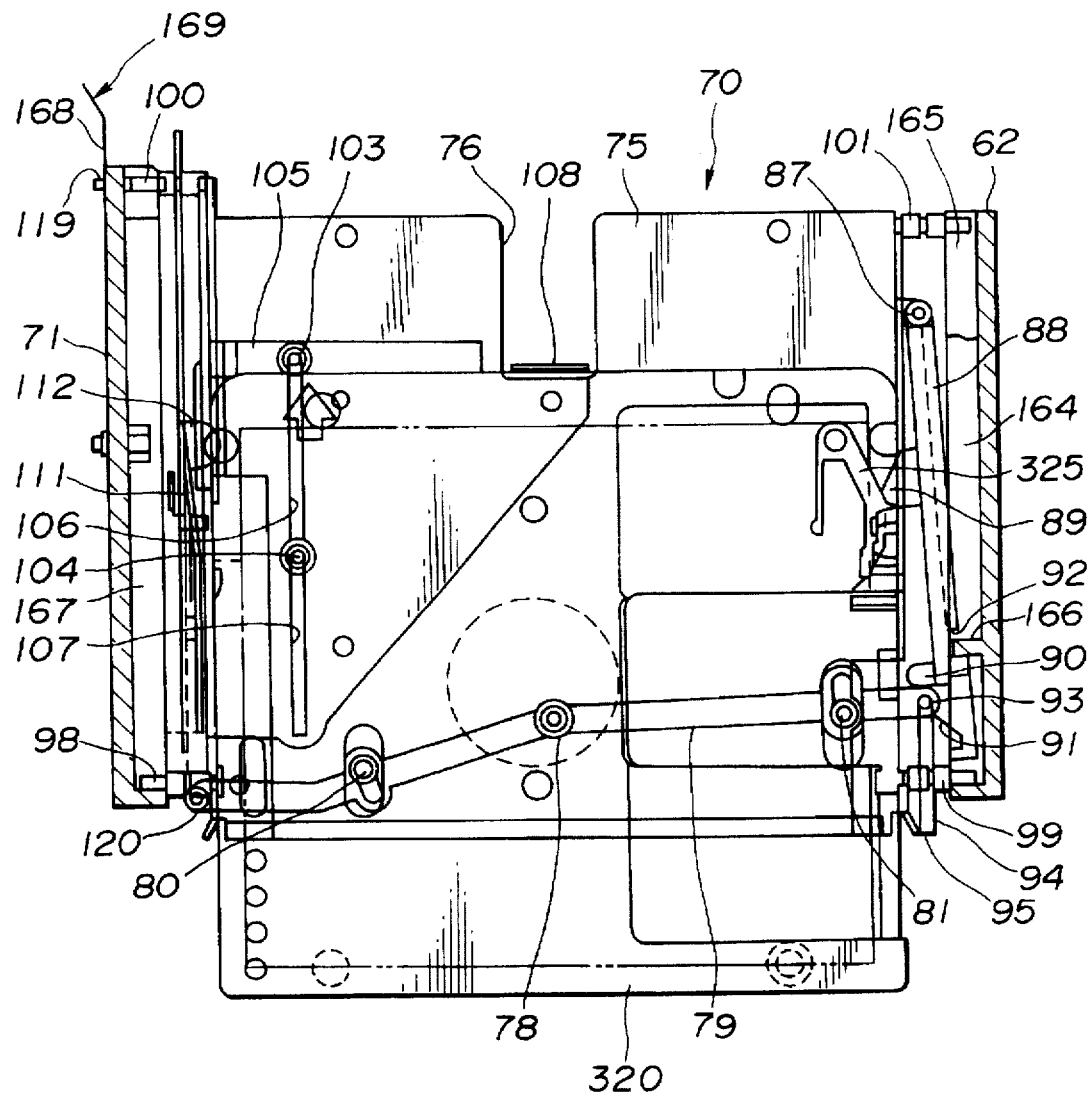
FIG. 68 is a plan view showing the state in which the disc cartridge has been introduced into the cartridge holder housed within the disc stocker.

When the disc cartridge 320 or 321 is inserted from the front side into the cartridge holder 70 held at the forward position between the disc stockers 62, 71, as shown in FIG. 66, the engagement member 112 is thrust by the forward end of the disc cartridge 320 or 321 for displacing the spring plate member 111 towards outside, as shown in FIG. 67. When the disc cartridge 320 or 321 has been inserted into the cartridge holder as far as a pre-set position at which the forbad end of the disc cartridge 320 or 321 is caused to bear against the tongue 108 of the slider 105, the engagement member 112 is engaged in the mating engagement recess 312 under the bias of the spring plate member 112. The disc cartridge 320 or 321 has its rear portion protruded at this time towards the front side of the outer casing 74.

Figure 69:
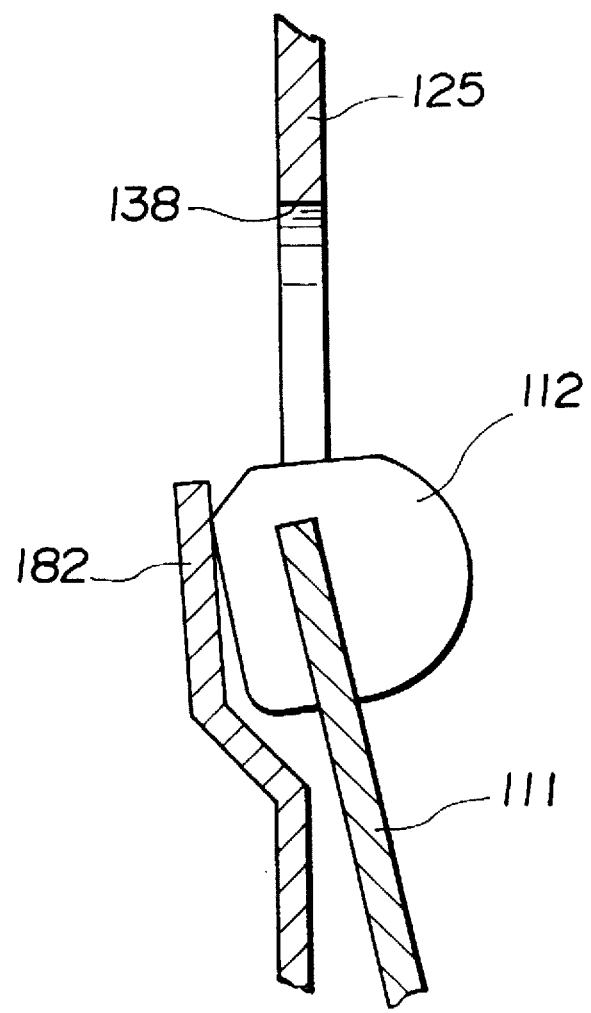
FIG. 69 is an enlarged transverse cross-sectional view showing essential portions of the cartridge holder.

The engagement member 112 may be moved outward via a cut-out 183 formed in the side plate 125, while being limited as to the distance of movement towards outside by a holding piece 182 protruded from the front side of the cut-out 183, as shown in FIG. 69.

The shutter opening protrusion 89 of the lock arm 88 now faces the front end of the shutter member 306 or 317, wile facing the lock member 325 via the support groove 307. The lock member 325 is mounted within the disc cartridge 320 or 321 for holding the shutter member 308 or 317 at the shutter closing position. The shutter closing protrusion 90 faces the shutter closing aperture 308. If, in this state, the lock arm 88 is rotated towards the shutter holder 70, the protrusion 89 of the lock arm 88 is intruded into the support groove 307 for displacing the lock member 325 into its lock state. On the other hand, the shutter opening protrusion 89 is positioned ahead of the forward end of the shutter member 306 or 317 for intruding the shutter closing protrusion 90 into the shutter closing aperture 308 while disengaging the retention piece 166 from the lock recess 92.

(vii) Construction of a transporting device (FIGS. 59, 61, 70 to 81 and 89 to 92)

Figure 59:
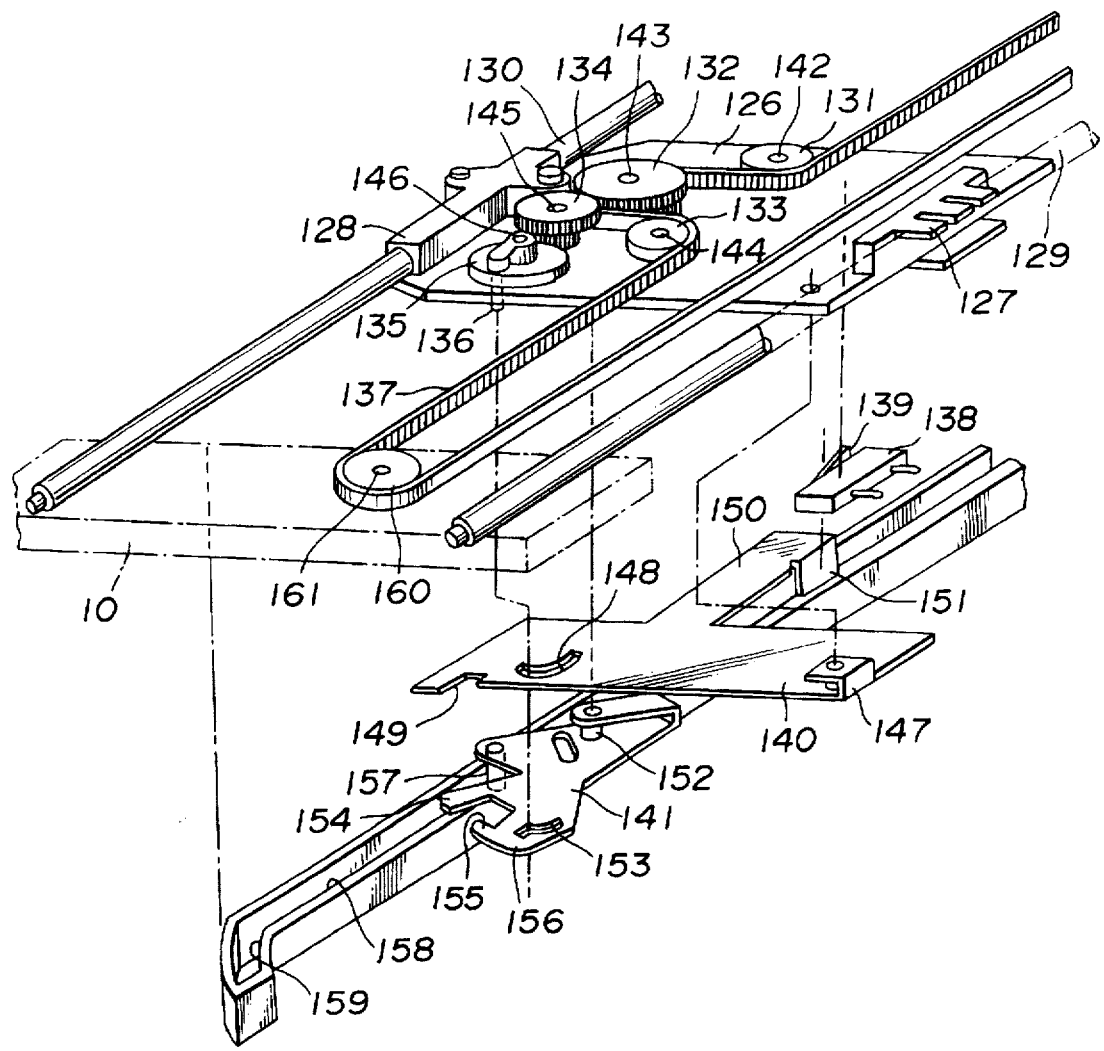
FIG. 59 is an exploded perspective view showing an arrangement of a transporting device in the above recording and/or reproducing apparatus.
Figure 61:
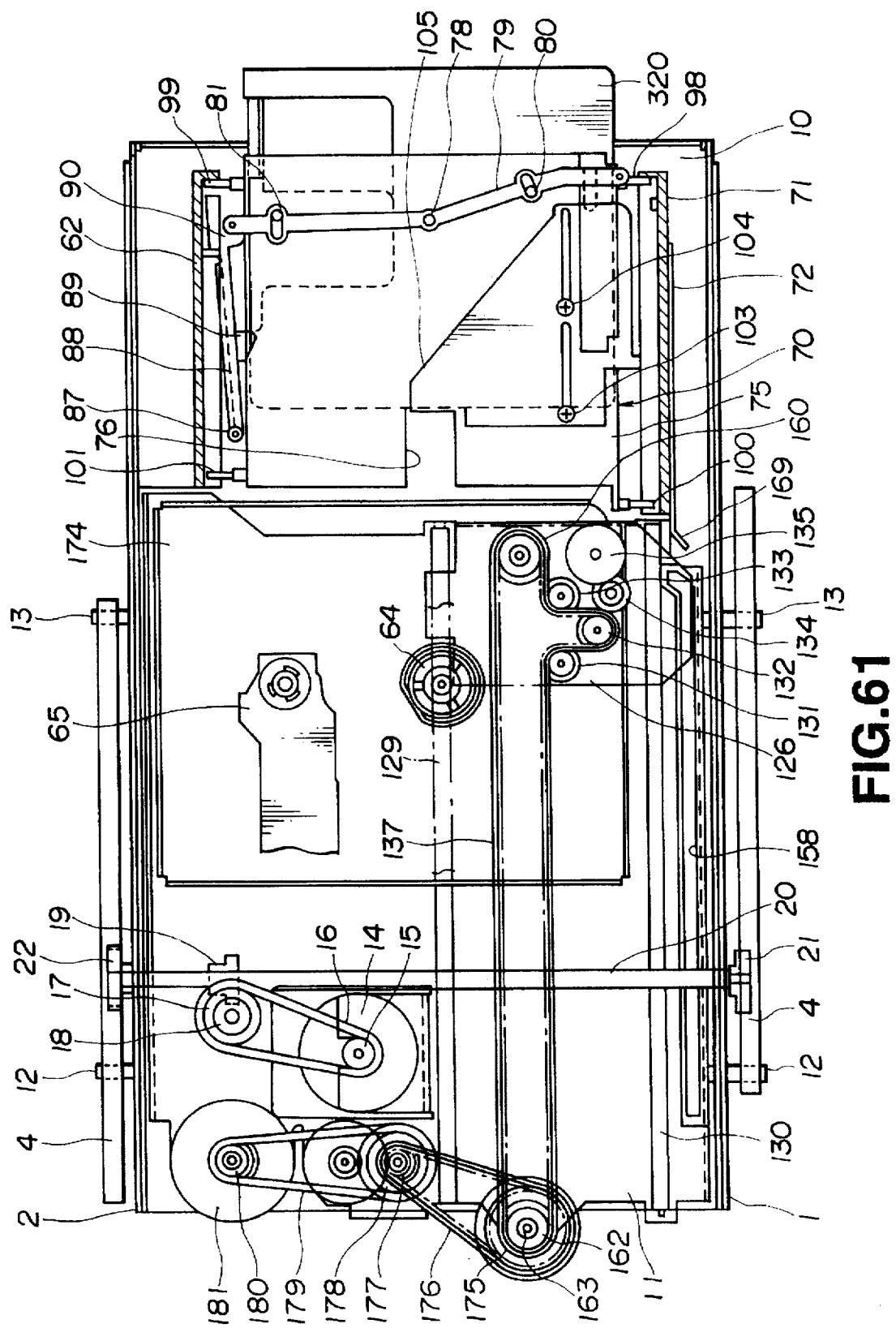
FIG. 61 is a plan view showing an arrangement of the above recording and/or reproducing apparatus, with a portion thereof being broken away in order to render the inside thereof visible.
Figure 62:
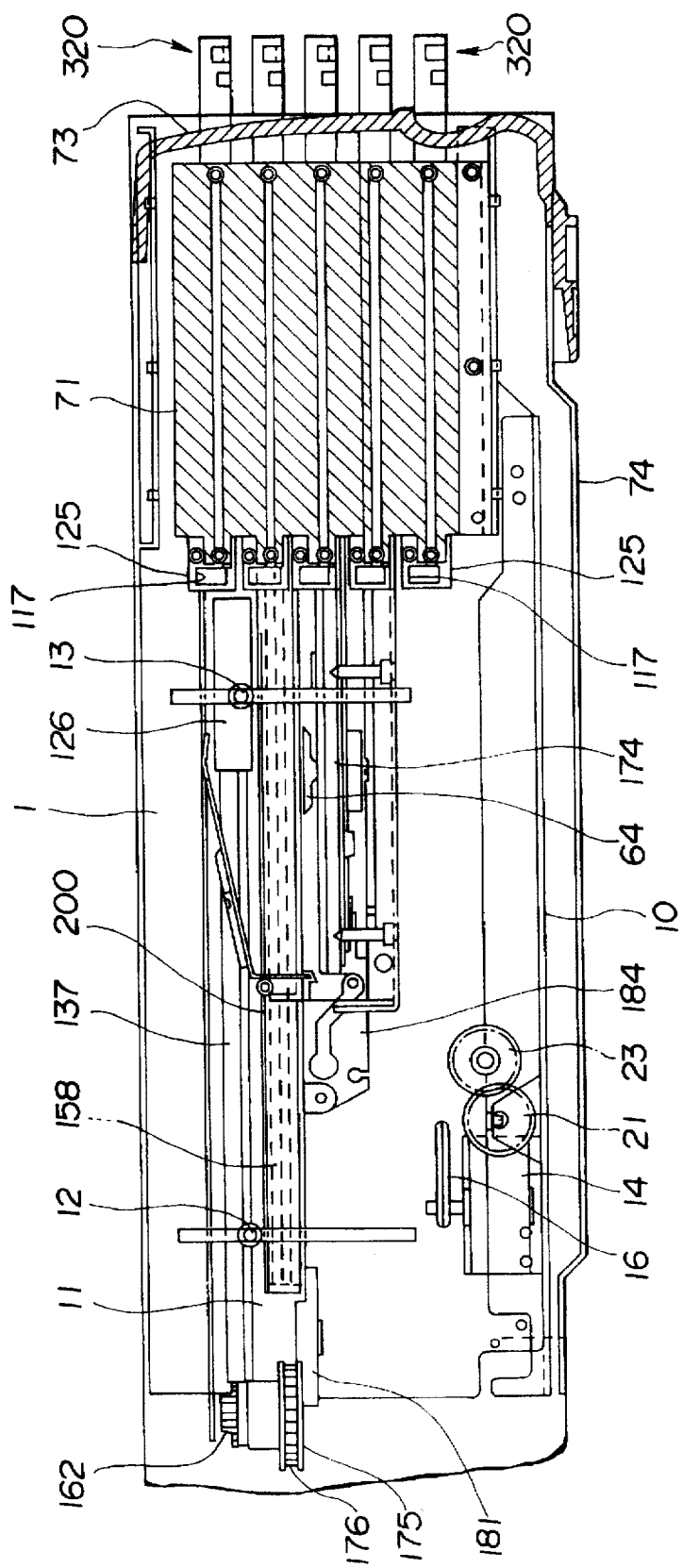
FIG. 62 is a side view showing an arrangement of the above recording and/or reproducing apparatus, with a portion thereof being broken away in order to render the inside thereof visible.
Figure 63:
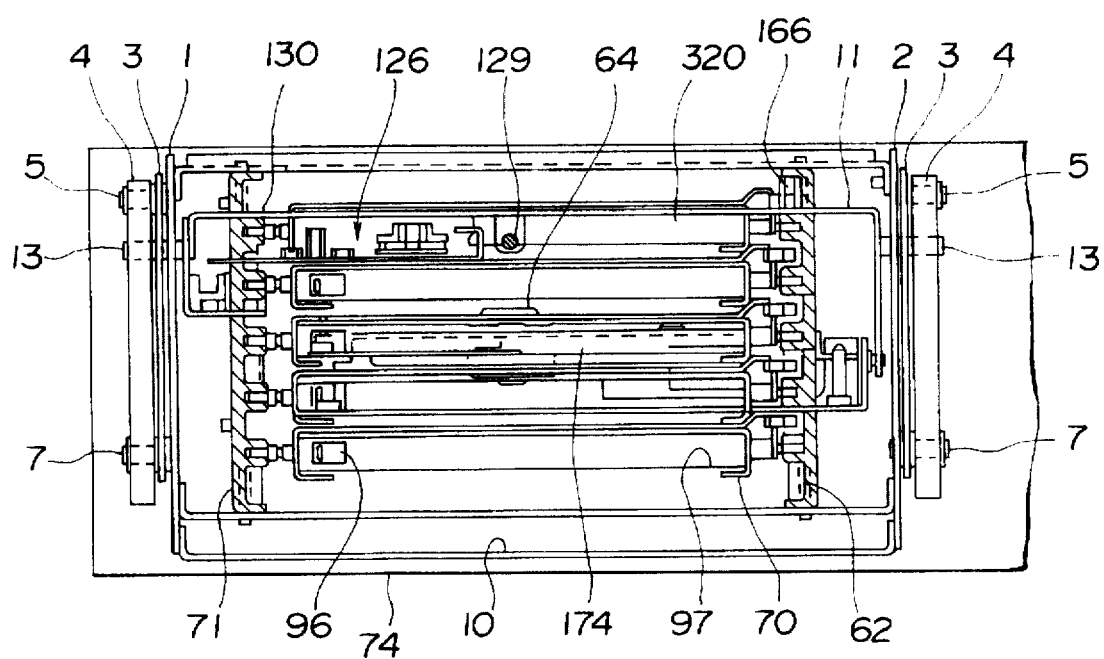
FIG. 63 is a front view showing an arrangement of the above recording and/or reproducing apparatus, with a portion thereof being broken away in order to render the inside thereof visible.
Figure 89:
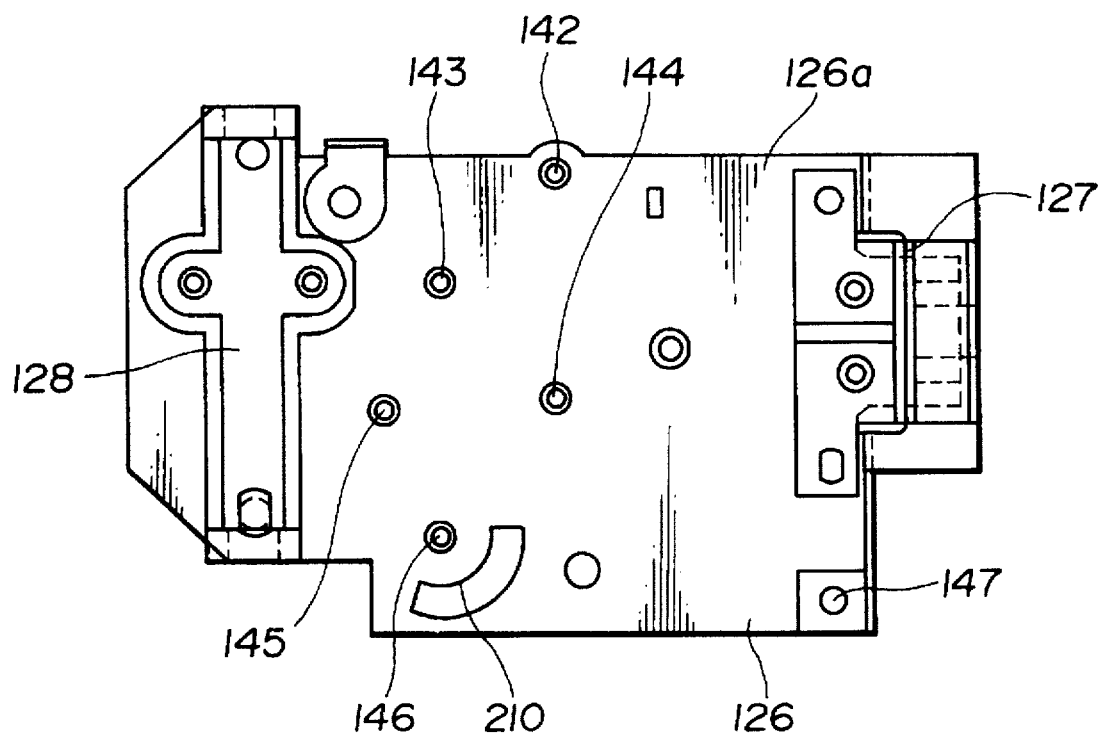
FIG. 89 is a plan view showing the contour of a base plate constituting the transporting device.

The transporting device 126 has a base portion 126a arranged on the mechanical chassis 11 for movement in the fore-and-aft direction, as shown in FIGS. 59 and 61. The base 126a is movable in the fore-and-aft direction by and along guide shafts 129, 130 arranged on the mechanical chassis 11 for extending parallel to each other in the fore-and-aft direction. As shown in FIG. 89, a thrust bearing 128 passed through by the guide shaft 130 is mounted on one lateral side of the base 126a, while a grip member 127 supported by the other guide shaft 129 is mounted on its opposite lateral side. The base 126a is supported by the guide shafts 130, 129 via the thrust bearing 128 and the grip member 127.

Figure 90:
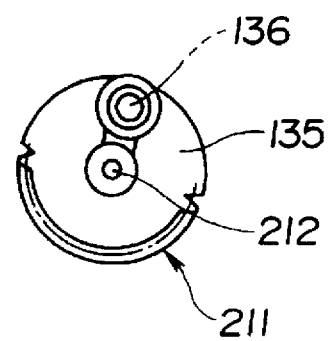
FIG. 90 is a plan view showing the contour of a cam gear constituting the transporting device.
Figure 91:
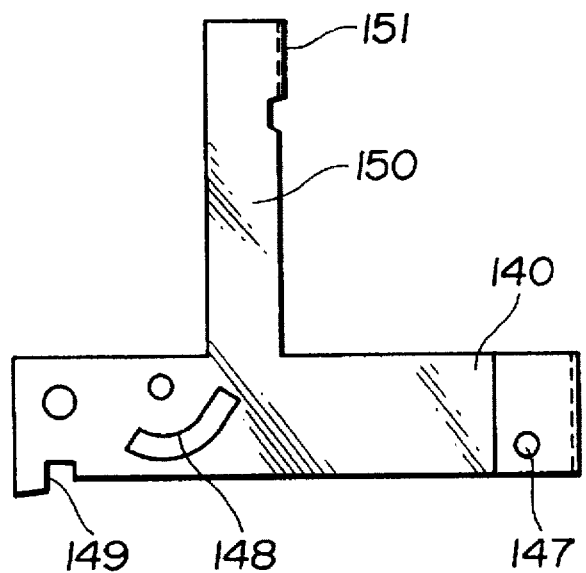
FIG. 91 is a plan view showing the contour of a switching arm constituting the transporting device.
Figure 92:
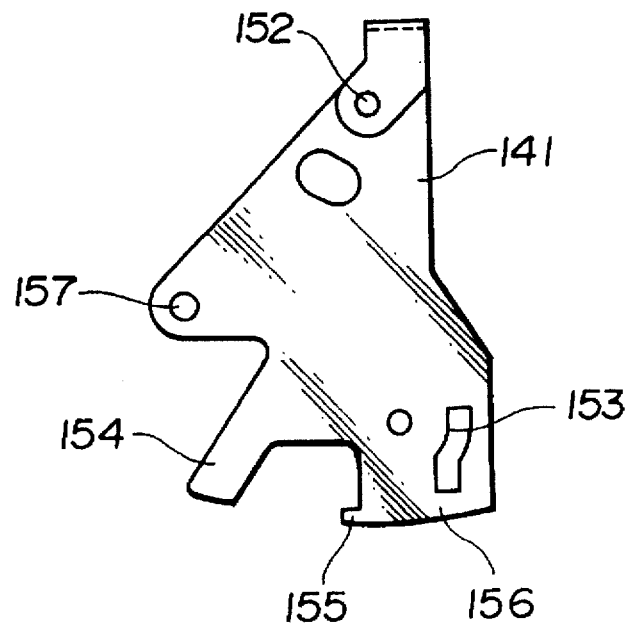
FIG. 92 is a plan view showing the contour of a holding arm constituting the transporting device.

On the base 126a are rotatably mounted forward and rear side pulleys 133, 131, first and second transmission gears 132, 134 and a pinned gear 135. These forward and rear side pulleys 133, 131, first and second transmission gears 132, 134 and a pinned gear 135 are mounted on the base 126a via rotary support shafts 144, 142, 143, 145 and 146 set upright on the base 126a. As shown in FIG. 90, an operating pin 136 is set upright on the lower surface of the pinned gear 135. The operating pin 136 is extended downwardly of the base 126a via an arcuate slit 210 formed in the base 126a.

On the mechanical chassis 11, an endless timing belt 137 is arranged for extending across the forward and rear ends of the mechanical chassis 11 by way of the base 126a. Specifically, the timing belt 137 is placed around a forward side gear 160 rotatably supported via a rotary support shaft 161 on the forward end of the mechanical chassis 11 and a rear gear 162 rotatably supported via a rotary support shaft 163 at the rear end of the mechanical chassis 11. The timing belt 137 is placed around the first transmission gear 132 via the forward side pulley 133 from the forward gear 160 so as to be returned to the rear gear 162 via the rear pulley 131.

The rear gear 162 is run in rotation by a movement motor 181 mounted on the mechanical chassis 11. That is, the driving shaft of the movement motor 181 carries a driving pulley 180. An endless driving belt 179 is placed around the driving pulley 180 and a first transmission pulley 178 rotatably mounted at back of the mechanical chassis 11. A second transmission pulley 177 is mounted as one and coaxially with the first transmission pulley 178. An endless driving belt 176 is placed around the second transmission pulley 177 and a third transmission pulley 175 mounted coaxially with the rear gear 162.

On the lower surface of the base 126a are rotatably mounted a holding arm 141 and a switching arm 140. The switching arm 140 is formed as a substantially T-shaped flat plate having an operating arm 150 protruded laterally from a strip-shaped main member. The main member has its one end rotatably supported by a support shaft 147 on the base portion 128a. The lateral side of the distal end of the operating arm 150 is bent to form an operating portion 151. The mid portion of the main member of the switching arm 140 has a cam slit 148 passed through by the operating pin 136. The opposite side of the main member of the switching arm 140 has a holding recess 149 adapted for cooperating with a holding arm 141 as later explained for holding the side plate 125.

On the lower surface of the base 126a is mounted a thrust switch 138 with its thrust lug 139 facing the operating portion 151 of the switching arm 140. The thrust switch 138 plays the role of detecting completion of forward movement of the base 126a.

The holding arm 141 is a planar sector-shaped plate having an included angle on the order of 30° and having its proximal portion corresponding to the rib of the sector (fan) rotatably mounted on the base 126a via a support shaft 152. The distal portion of the holding arm 141 has a cam slit 153 adapted to be traversed by the operating pin 136, a holding pawl 156 having a lateral hooked lug 155 engaged in the engagement opening 117 in the side plate 125, an abutment pawl 154 for outwardly displacing the strip-like portions 168 of the lock plate 72 and a profiling roll 157 arranged on the periphery of the sector (fan) shape.

Figure 79:
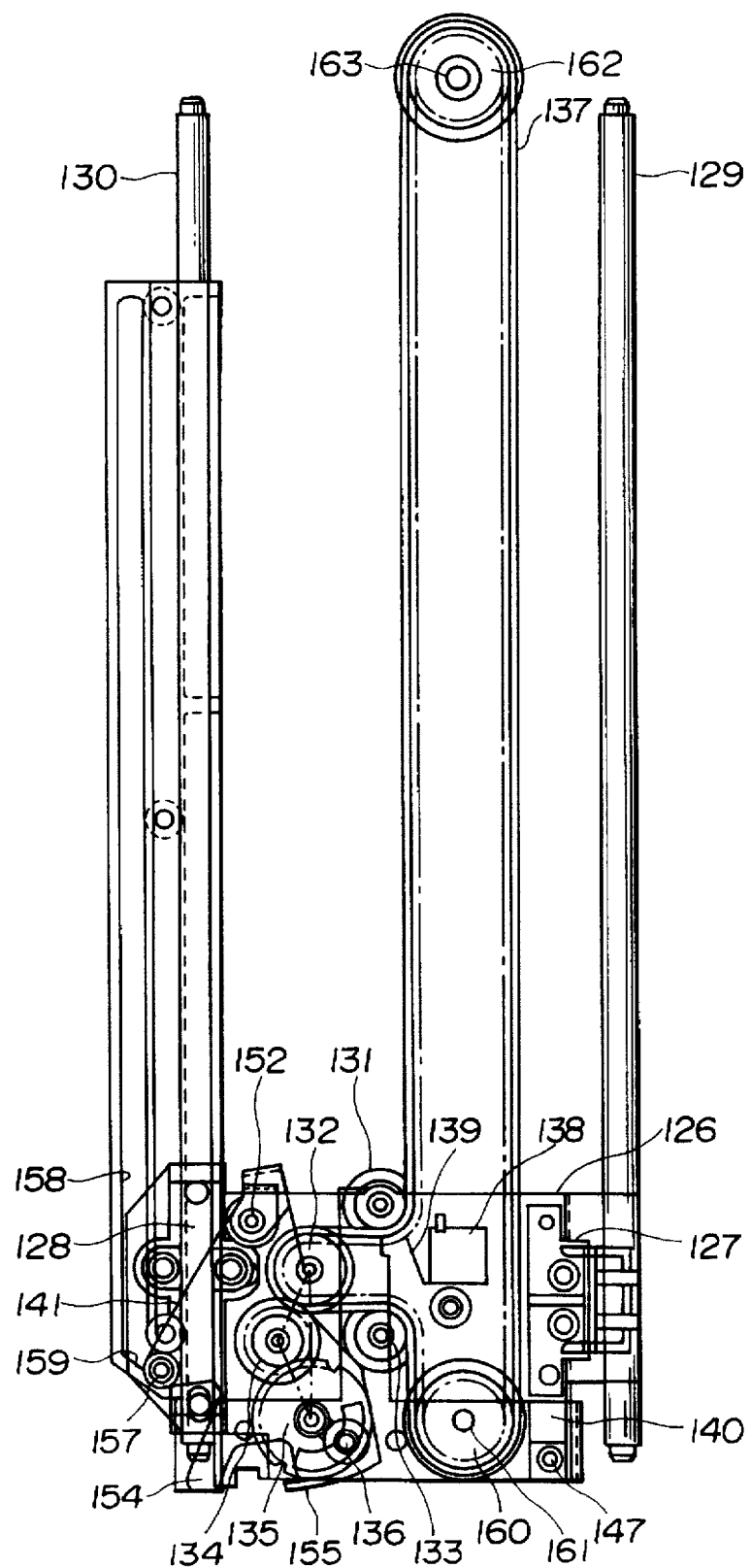
FIGS. 79 and 80 are plan views showing the transporting device showing the state of holding the side plate of the cartridge holder.
Figure 80:
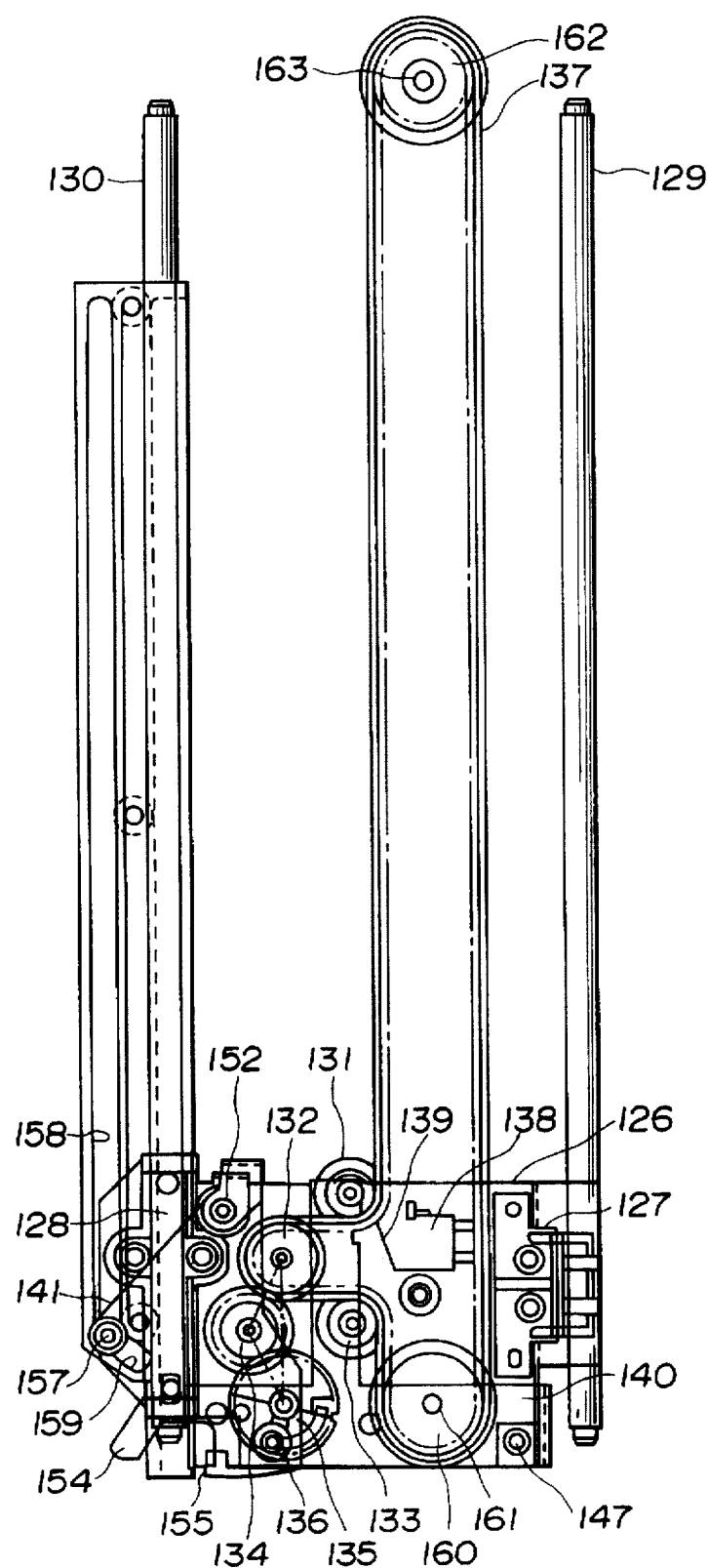
Figure 81:
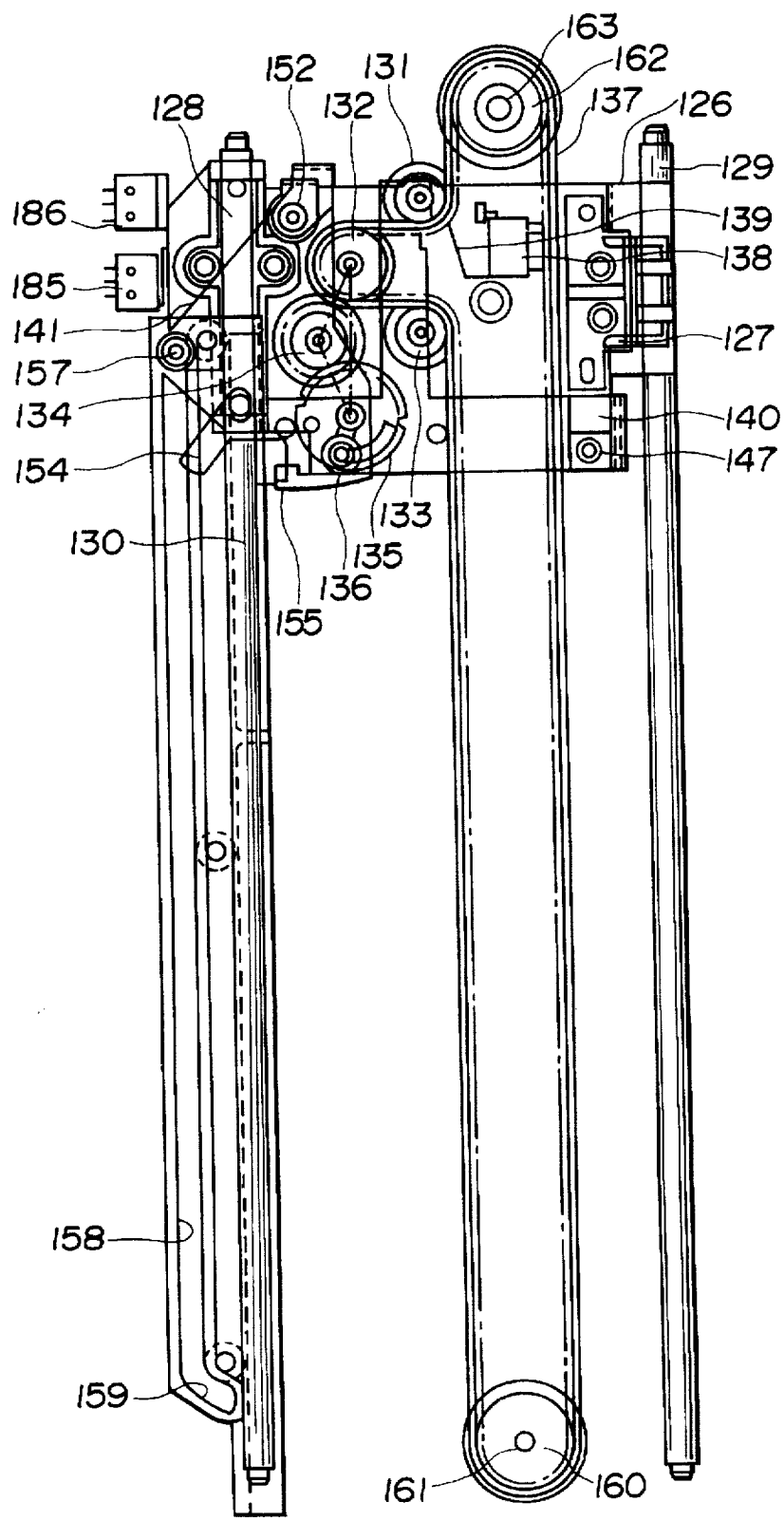
FIG. 81 is a plan view showing the transporting device when the cartridge holder has been pulled out.

The profiling roll 157 is engaged in a cam groove 158 provided in the mechanical chassis 11, as shown in FIGS. 78 to 81. The cam groove 158 is linear in contour extending parallel to the guide shafts 130, 129 and only has its foremost end arcuately bowed towards the hooked lug 155 to form a bend 159. When the base portion 126a is at the forward position, the holding arm 141 is rotatable within a rotational range of moving the profiling roll 157 within the bend 159, as shown in FIGS. 78 to 90. When the base portion 126a is moved towards rear, the holding arm 141 is held at the position of having been rotated to the side of receding the hooked lug 155, as shown in FIG. 81.

With the transporting device 126, the pinned gear 135 causes the switching arm 140 and the holding arm 141 to be rotated via the operating pin 136.

In the initial state, the base portion 126a is at the forward position, while the switching arm 140 has been rotated in a direction of thrusting the thrust switch 138 by the operating portion 151 and the holding arm 141 has been rotated in a direction of receding the hooked lug 155, as shown in FIGS. 70 to 78. In such state, the holding recess 149 of the switching arm 140 is located at back of the rear end of the side plate 125 without being contacted with the side plate 125, while the abutment pawl 154 and the hooked lug 155 are positioned on both sides of the rear end of the side plate 125 without being contacted with the side plate 125. The abutment pawl 154 is intruded into a space between the rear end of the side plate 125 and the inclined section 169 of the strip-shaped portion 168. Consequently, since the transporting device 128 is not contacted with the cartridge holder 70 nor the disc stocker 71, the lifting operation of the mechanical chassis by the lift device is not impeded. That is, the mechanical chassis 11 is uplifted or lowered by the lift device and one of the cartridge holders 70 may be selected which is positioned facing the mechanical chassis 11.

Figure 71:
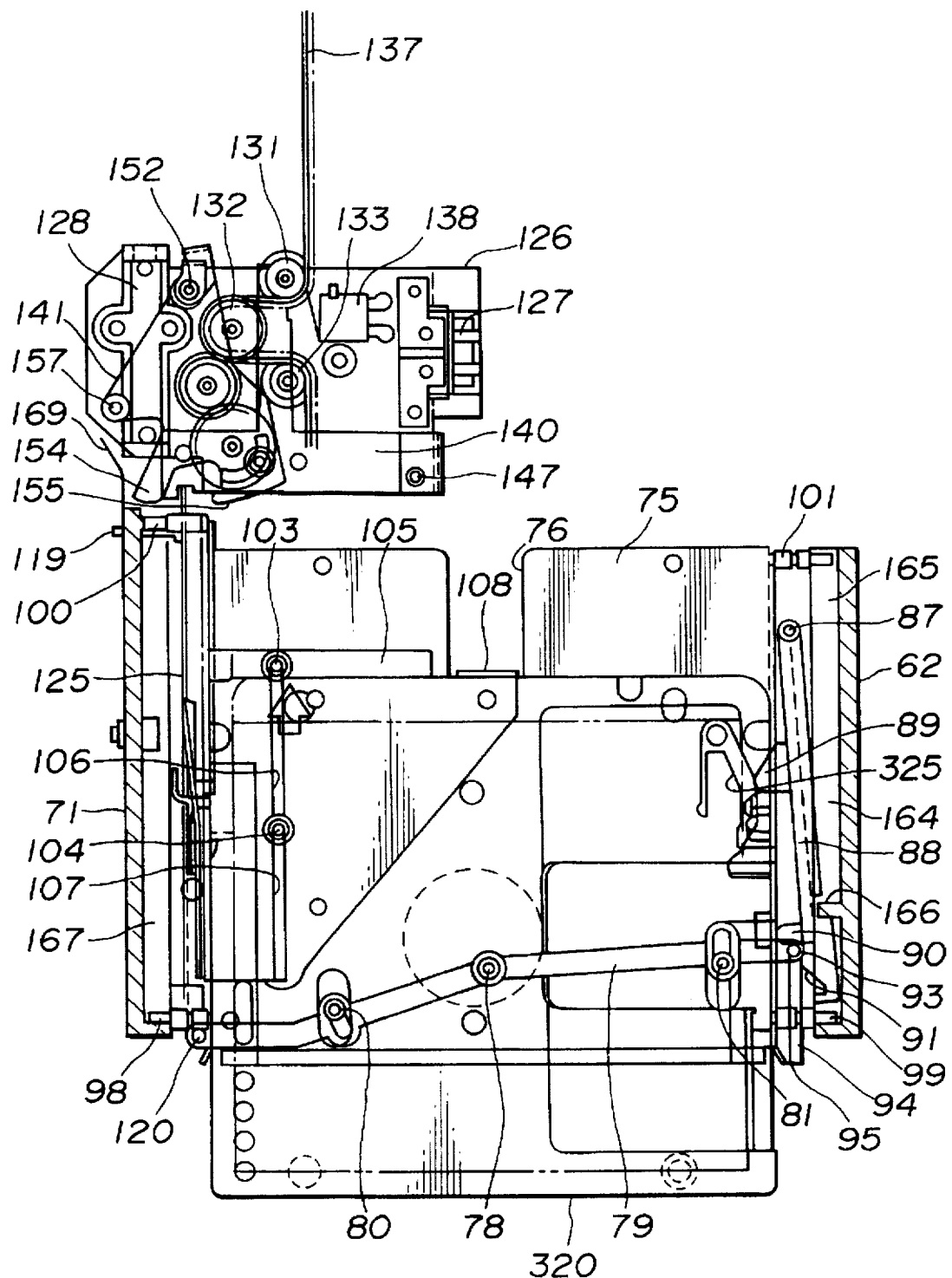
FIG. 71 is a plan view showing the state of the cartridge holder and the transporting device when the disc cartridge has been introduced into the cartridge holder housed within the disc stocker.

When the movement motor 181 at this time is run in rotation, the timing belt 137 is fed in the direction of moving the base portion 126a towards rear, that is in a direction of feeding the base portion placed around the pulleys 133, 131 towards rear. Since the profiling roll 157 at this time is engaged in the bend 159 of the cam groove 158, the base portion 126a is prohibited from being moved rearward. Consequently, the timing belt 137 causes the pinned gear 135 to be rotated via the first and second transmission gears 132, 134. By such rotation of the pinned gear 135, the switching arm 140 is first rotated to annul the thrusting of the thrust switch 138 by the thrusting portion 151, as shown in FIGS. 71 and 79. Besides, the switching arm 140 when rotated thrusts the rear end of the side plate 125 by the proximal portion of the holding recess 149. The side plate 125 is moved slightly forwards to disengage the reduced-diameter portion 119 of the mating retention pin 118 from the rear end of the lock hole 170.

Figure 72:
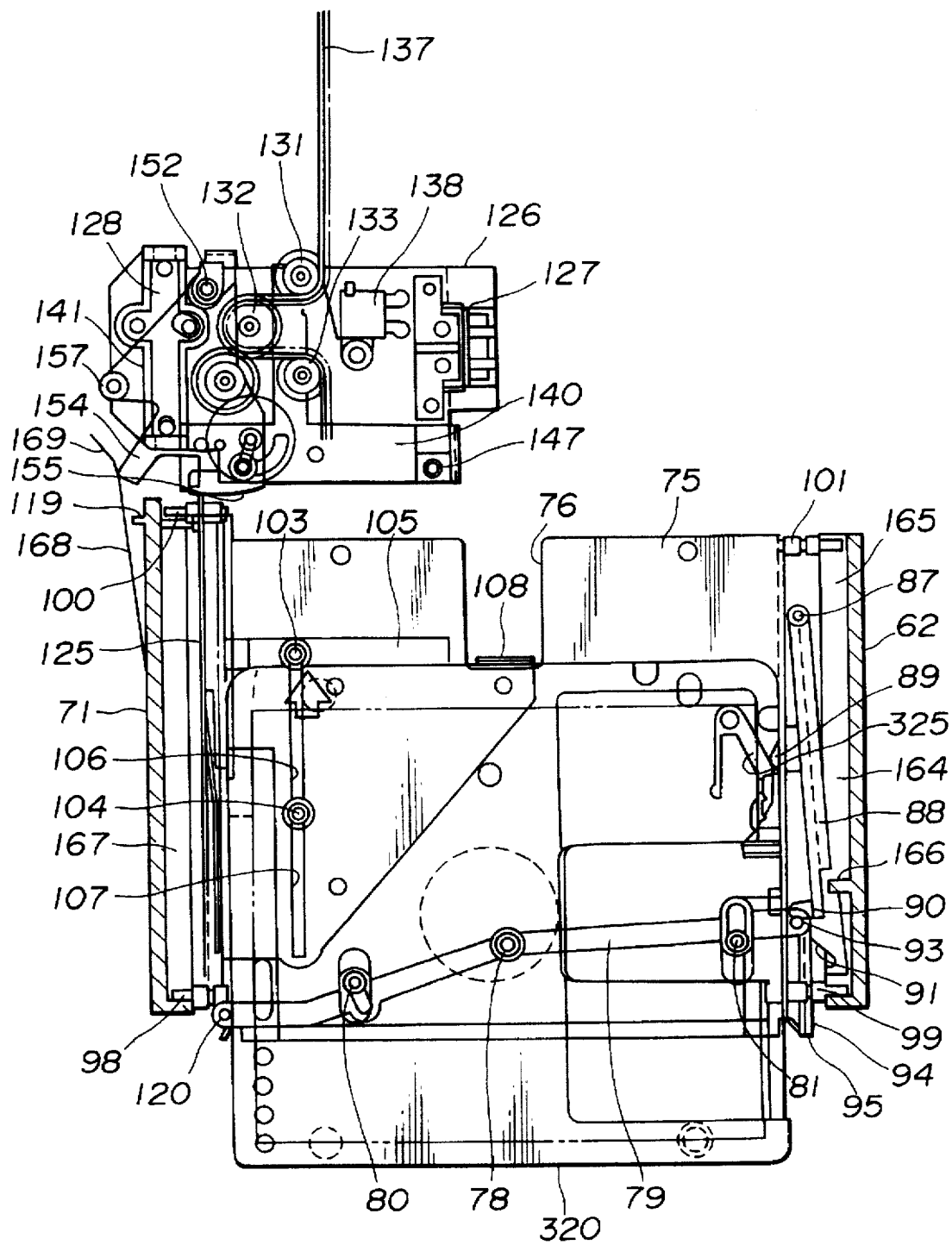
FIG. 72 is a plan view showing the state in which the transporting device has started entraining the disc cartridge into the cartridge holder.

When further the movement motor 181 is run in rotation to feed the timing belt 137, the holding arm 141 is rotated by the pinned gear 135 in a direction of causing the hooked lug 155 to be advanced towards the side plate 125, as shown in FIGS. 72 and 80. The hooked lug 155 is then intruded into the engagement opening 117 in order to hold the rear end of the side plate 125 in cooperation with the holding recess 149. The holding arm 141, thus rotated, thrusts the inner lateral surface of the strip-shaped portion 168 by the abutment pawl 154 in order to shift the strip-like portion 168 outward for extracting the mating retention pin 118 from the lock hole 170. By such rotation of the holding arm 141, the profiling roll 157 reaches the rear end of the bend 159, that is the forward end of the linear section of the cam groove 158. Thus the transporting device 126 is enabled to be moved rearward.

Figure 73:
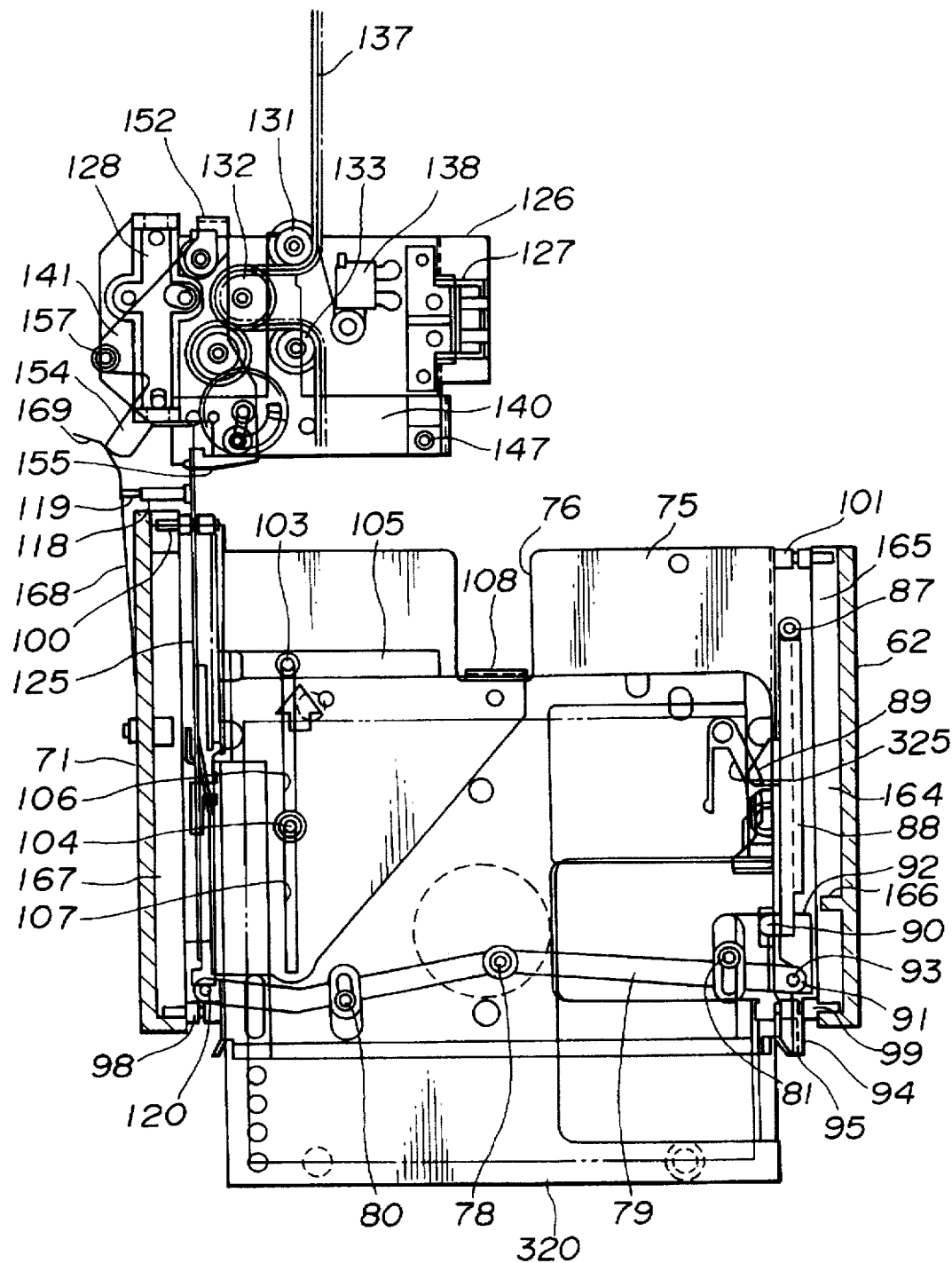
FIG. 73 is a plan view showing the state in which the transporting device is entraining the disc cartridge into the cartridge holder.

When the movement motor 181 is further run in rotation, the base portion 126a starts to be moved towards rear, as shown in FIG. 73. When the base portion 126a starts to be moved rearward in this manner, the profiling roll 157 is caused to follow the linear section of the cam groove 158 and prohibits rotation of the holding arm 141 to its initial position, that is rotation of receding the hooked lug 155. The cartridge holder 70 causes only the side plate 125 to be moved towards rear, with the holding plate 75 remaining stationary. The coupling arm ceases to be rotated by the side plate 125 and is rotated to its initial position under the bias of the tension coil spring 94. Thus the lock arm 88 is rotated to its initial position lying along the opposite lateral side of the holding plate 75, under the bias of the tension coil spring 85, so that the lock recess 92 ceases to be engaged with the retention piece 166. Thus the shutter opening protrusion 89 is intruded into the support groove 307, while the shutter closing protrusion 90 is intruded into the shutter closing aperture 308. The holding plate 75 is biased forwards under the bias of the tension coil spring 124 mounted between it and the side plate 125 and hence is kept at the forward position within the disc stockers 62, 71.

Figure 74:
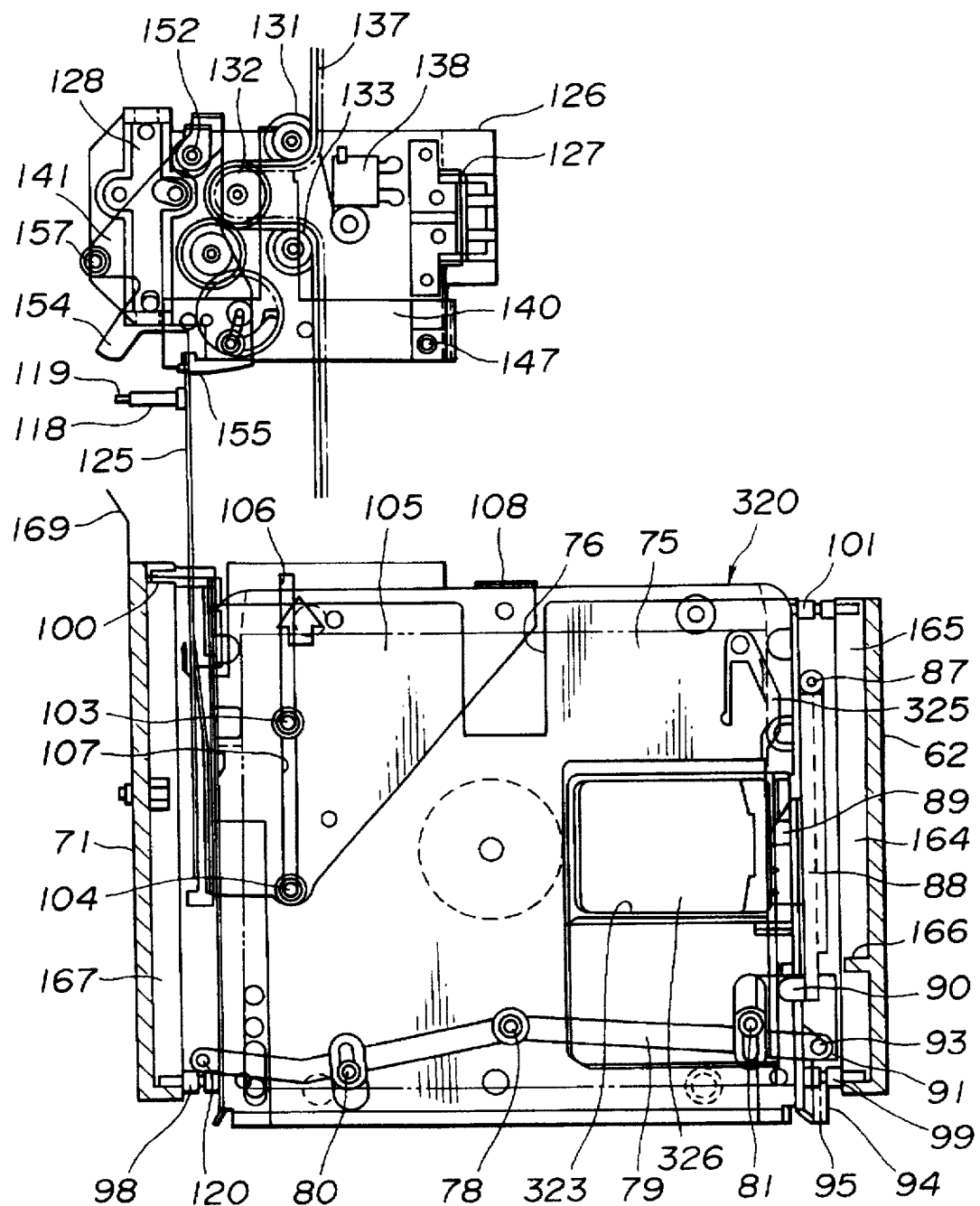
FIG. 74 is a plan view showing the state in which the transporting device has entrained the disc cartridge into the cartridge holder.

When the transporting device 126 is moved further rearward, the slider 105 is moved rearward with the rearward movement of the side plate 125, as shown in FIG. 74. With the rearward movement of the slider 105, the disc cartridge 320 or 321 is moved rearward within the holding plate 75 because the disc cartridge 320 or 321 is operatively linked to the slider 105 by the engagement member 112 being engaged with the mating retention recess 312. Consequently, the shutter member 306 or 317 is actuated for opening movement because it is kept at a position in which the opening protrusion 89 is caused to bear against its forward end.

Figure 75:
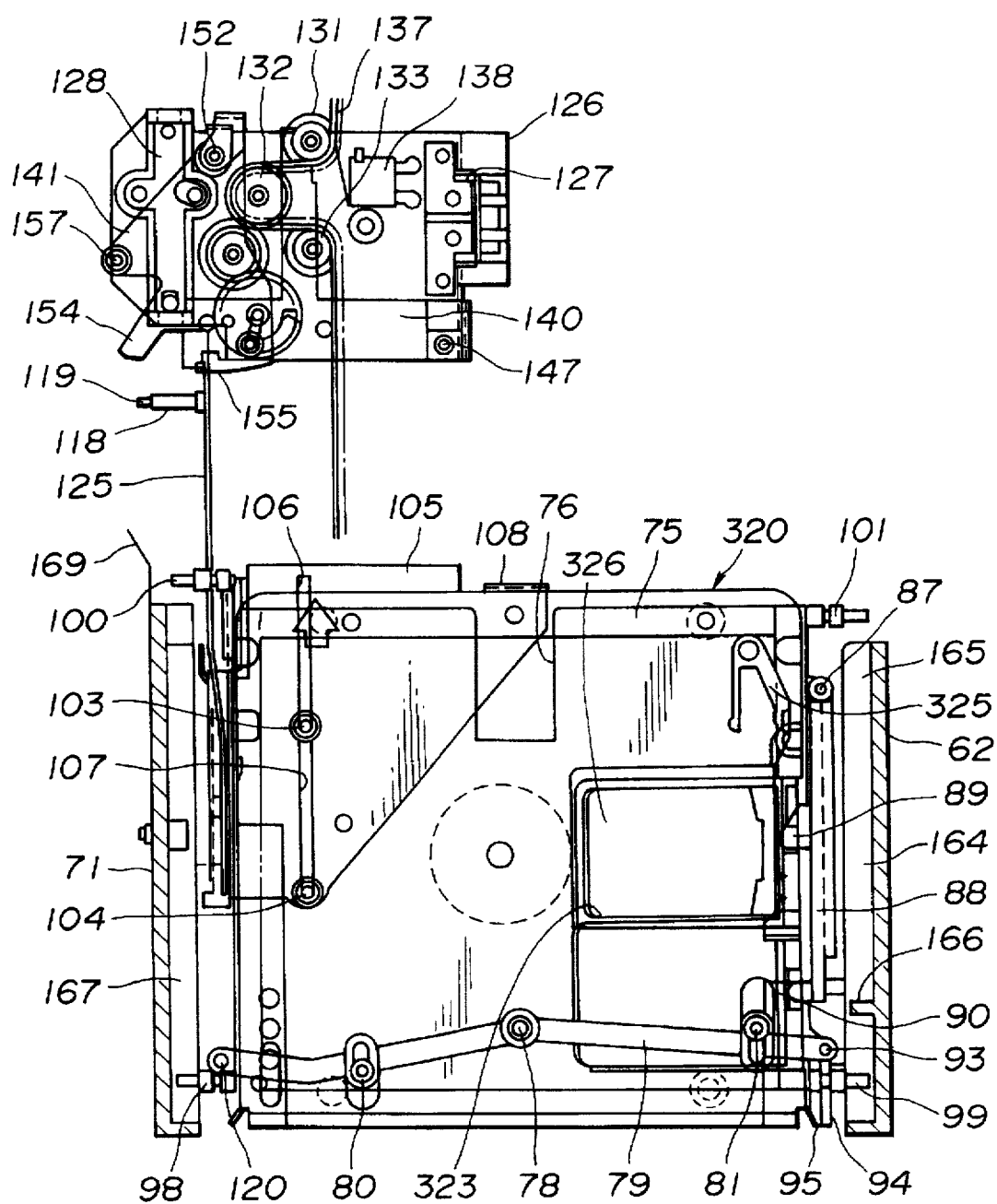
FIG. 75 is a plan view showing the state in which the transporting device has started pulling the cartridge holder out of the cartridge holder.
Figure 77:
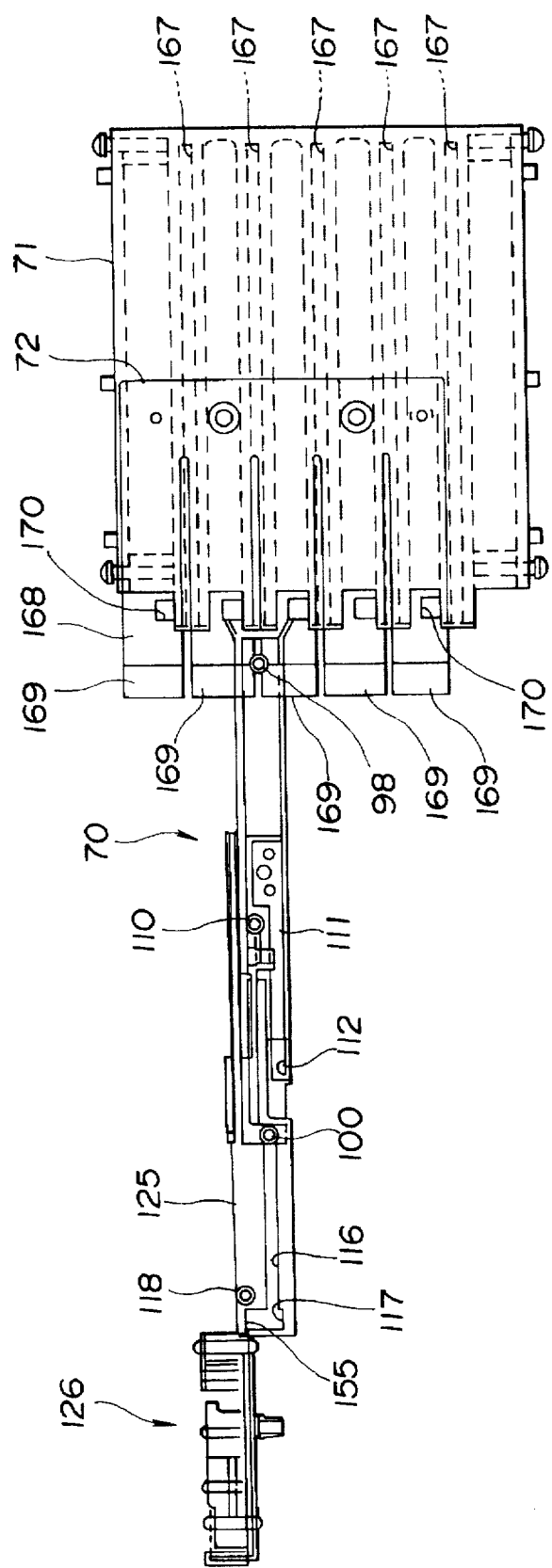
FIG. 77 is a plan view showing the state in which the transporting device is pulling the cartridge holder out of the cartridge holder.

When the side plate 125 reaches the rear position relative to the holding plate 75, and the transporting device 126 is further moved rearward, the cartridge holder 70 is extracted from the space between the disc stockers 62 and 71 and starts to be moved towards rear, as shown in FIGS. 75 and 77.

Figure 76:
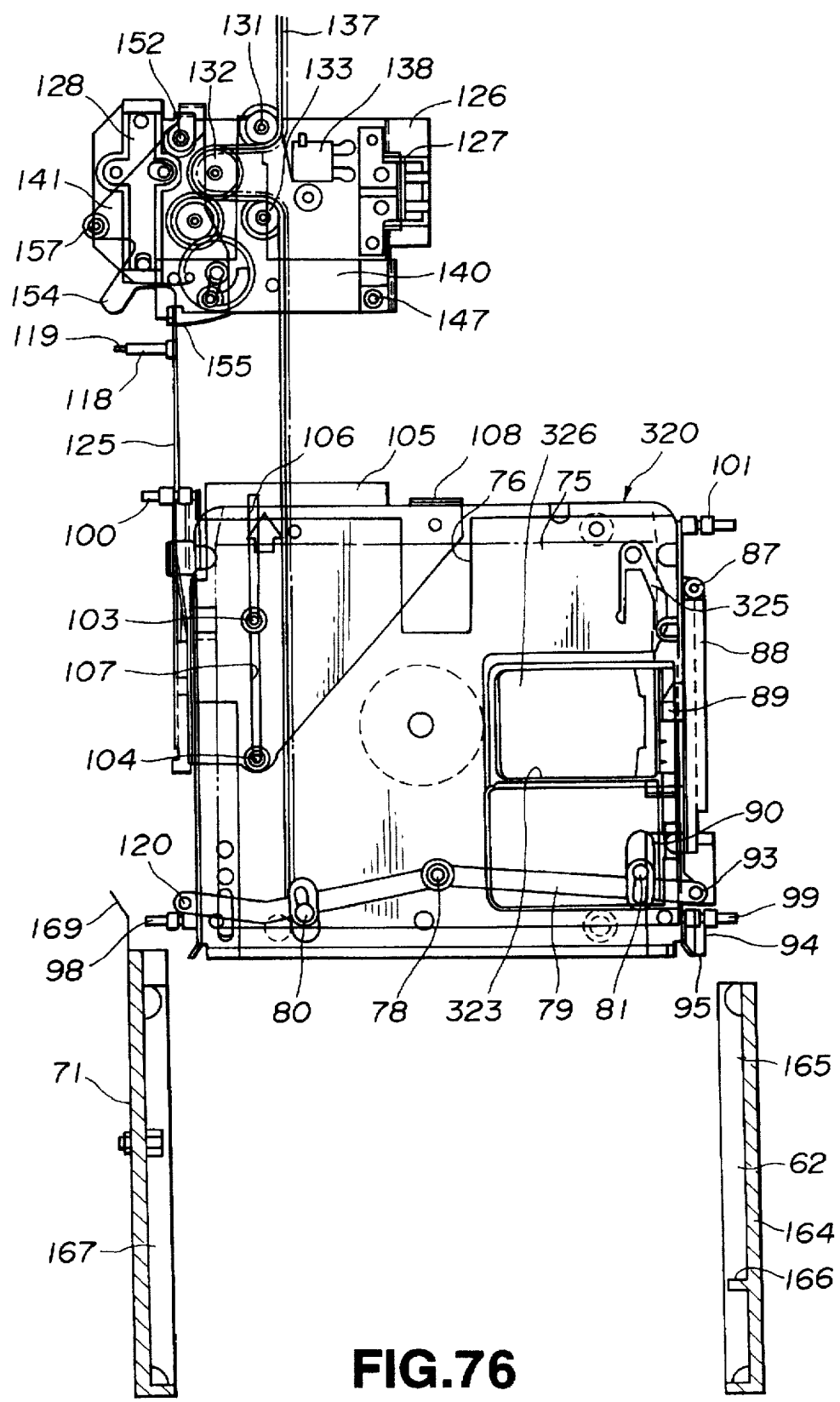
FIG. 76 is a plan view showing the state in which the transporting device has pulled the cartridge holder out of the cartridge holder.

The cartridge holder 70 is extracted from the space between the disc stockers 62 and 71 and reaches a position overlying the disc driving unit 174. Since this time, the cartridge holder 70 is caused to bear against the disc driving unit 174, and is moved towards rear along with the disc driving unit 174. When reaching the first rear position, the transporting device 126 detects, by a first detection switch 185 provided on the mechanical chassis 11, that the first rear position has been reached, as shown in FIGS. 76 and 81. The disc drive unit 174 at this time is at the above-mentioned chuck position. The cartridge holder 70 has its supporting pins 98, 100, 99, 101 supported by support members 200, 200 arranged on both sides of the mechanical chassis 11, as shown in FIG. 84. Each of the support members 200, 200 has support grooves 199, 199 similar to the support grooves 165, 167 on its opposite lateral sides. These support grooves formed in the support members 200, 200 are aligned with rear extension of the support grooves 165, 167 supporting the cartridge holder 70 selected by the lift movement for the mechanical chassis 11. That is, the support pins 98, 100, 99, 101, extracted rearward from the disc stockers 62, 71, are intruded from the forward side into the support grooves 199, 199 of the support members 200, 200.

By the disc driving unit 174 being moved to the chuck position shown in FIG. 85, the cartridge holder 70, transported along with the disc drive unit 174, has its disc cartridge 320 or 321 chucked by the disc drive unit 174.

When the cartridge holder 70 is further moved rearward, the cartridge holder 70 is moved rearward along with the disc drive unit 174. When the transporting device 126 reaches a second rear position further rearward than the first rear position, this is detected by a second detection switch 186 provided on the mechanical chassis 11. The disc drive unit 174 at this time is at the above-mentioned recording position.

By the disc driving unit 174 being moved to the above-mentioned recording position shown in FIG. 86, the cartridge holder 70, transported along with the disc driving unit 174, has its magnetic head 192 slidingly contacted with the magneto-optical disc of the recording/reproducing disc cartridge 320.

For returning the disc cartridge 320 or 321 chucked by the head drive unit 174 to the disc stockers 62, 71, the disc driving unit 174 is first returned to the release position shown in FIG. 84. The movement motor 181 is rotated in the reverse direction to the rotational direction during extraction of the cartridge holder 70 from the disc stocker 62, 71. The transporting device 126, so far at the rearmost position shown in FIG. 78, now starts to be moved forwards. The cartridge holder 70 is moved forwards along the support grooves 199, 199 of the supporting members 200, 200, and is intruded into the space between the disc stockers 62, 71, as shown in FIG. 75. When the side plate 125 is at the initial position relative to the holding plate 75, the cartridge holder 70 is housed between the disc stockers 62 and 71, as shown in FIG. 74. The holding plate 75 is halted to a position at which the forward side supporting pins 99, 98 are caused to bear against the closed foremost ends of the support grooves 165, 167.

When the transporting device 128 is moved further forwards, the side plate 125 is moved further forwards, and the slider 105 is also moved forwards in unison therewith, as shown in FIG. 73. The disc cartridge 320 or 321 is pushed forwards by the tongue 108 of the slider 105. By the disc cartridge 320 or 321 being pushed forwards, the shutter member 306 or 317 performs its closing movement, because it is halted by the engagement of the shutter closing protrusion 90 with the shutter closing aperture 308. The abutment pawl 154 is slidingly contacted with the inclined section 169 for elastically shifting the strip-shaped portion 168 outward.

When the movement motor 181 is further run in rotation, the base portion 126a reaches its foremost position, as shown in FIGS. 72 and 80. The cartridge holder 70 shifts only the side plate 125 forwards, with the holding plate 75 being at a standstill. Thus the coupling arm 79 is rotated by the side plate 125 against he bias of the tension coil spring 94. The coupling arm 79 causes the lock arm 88 to be rotated against the bias of the tension coil spring 85. The lock recess 92 is engaged by the retention piece 166. The shutter closure protrusion 89 is receded at this time from the support groove 307, while the shutter closure protrusion 90 is receded from the shutter closing aperture 308. The profiling roll 157 reaches the rear end of the bowed portion 159, that is the forward end of the linear section of the cam groove 158, as shown in FIG. 80. Thus it becomes possible for the holding arm 141 to cause the profiling roll 157 to be rotated so as to follow the contour of the bend 159.

When the movement motor 181 is further run in rotation for feeing the timing belt 137, the pinned gear 135 causes the holding arm 141 to be rotated in a direction of shifting the hooked lug 155 away from the side plate 125, as shown in FIGS. 71 and 79. The hooked lug 155 is then receded from the engagement opening 117 for releasing the holding on the rear portion of the side plate 125. The holding arm 141, thus rotated, shifts the abutment pawl 154 away from the inner lateral surface of the strip-shaped portion 168, which is then reset to its initial position. At this time, the mating retention pin 118 is intruded into the lock hole 170 of the strip-shaped portion 168.

Figure 70:
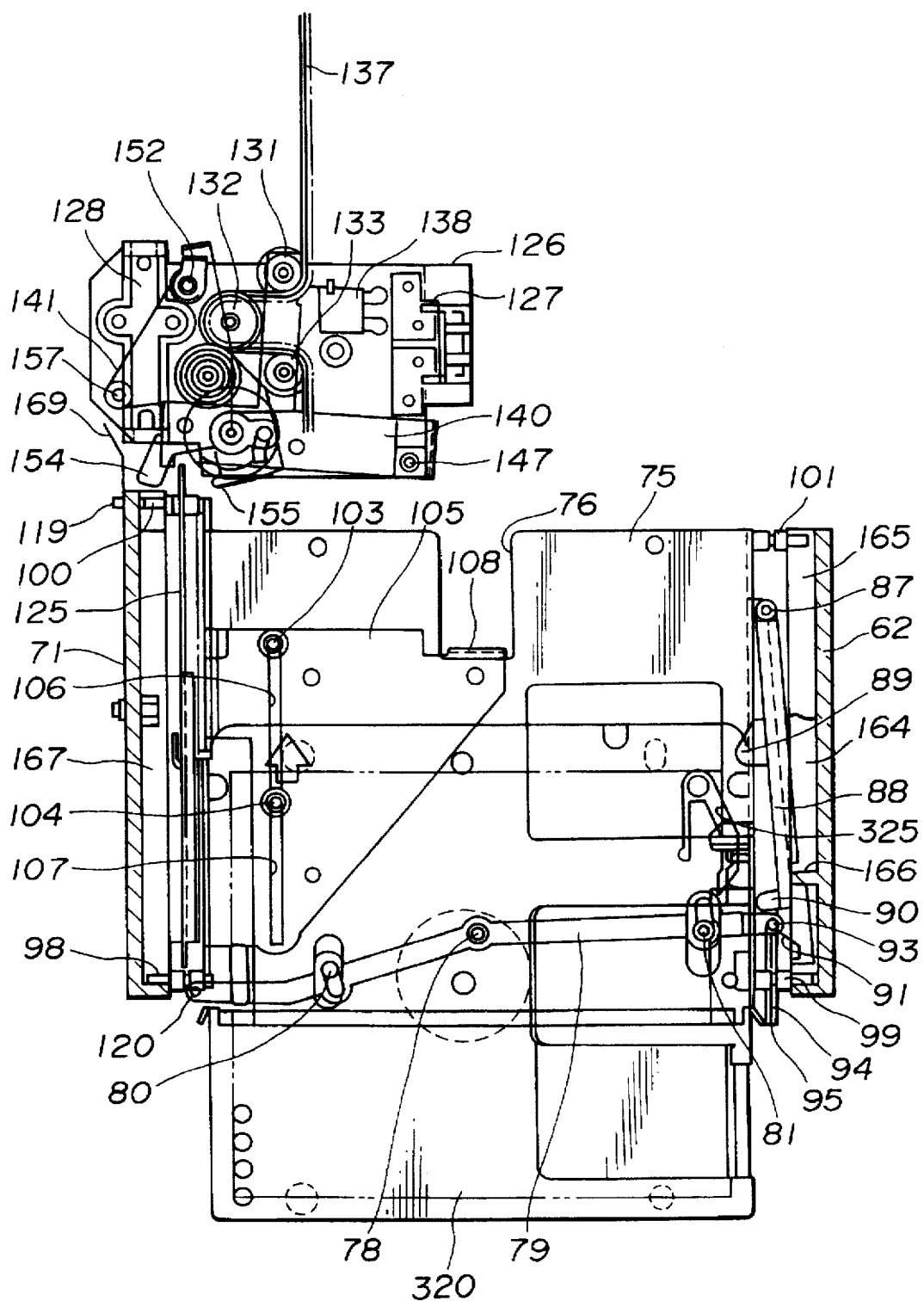
FIG. 70 is a plan view showing the state of the cartridge holder and the transporting device when the disc cartridge is introduced into the cartridge holder housed within the disc stocker.
Figure 78:
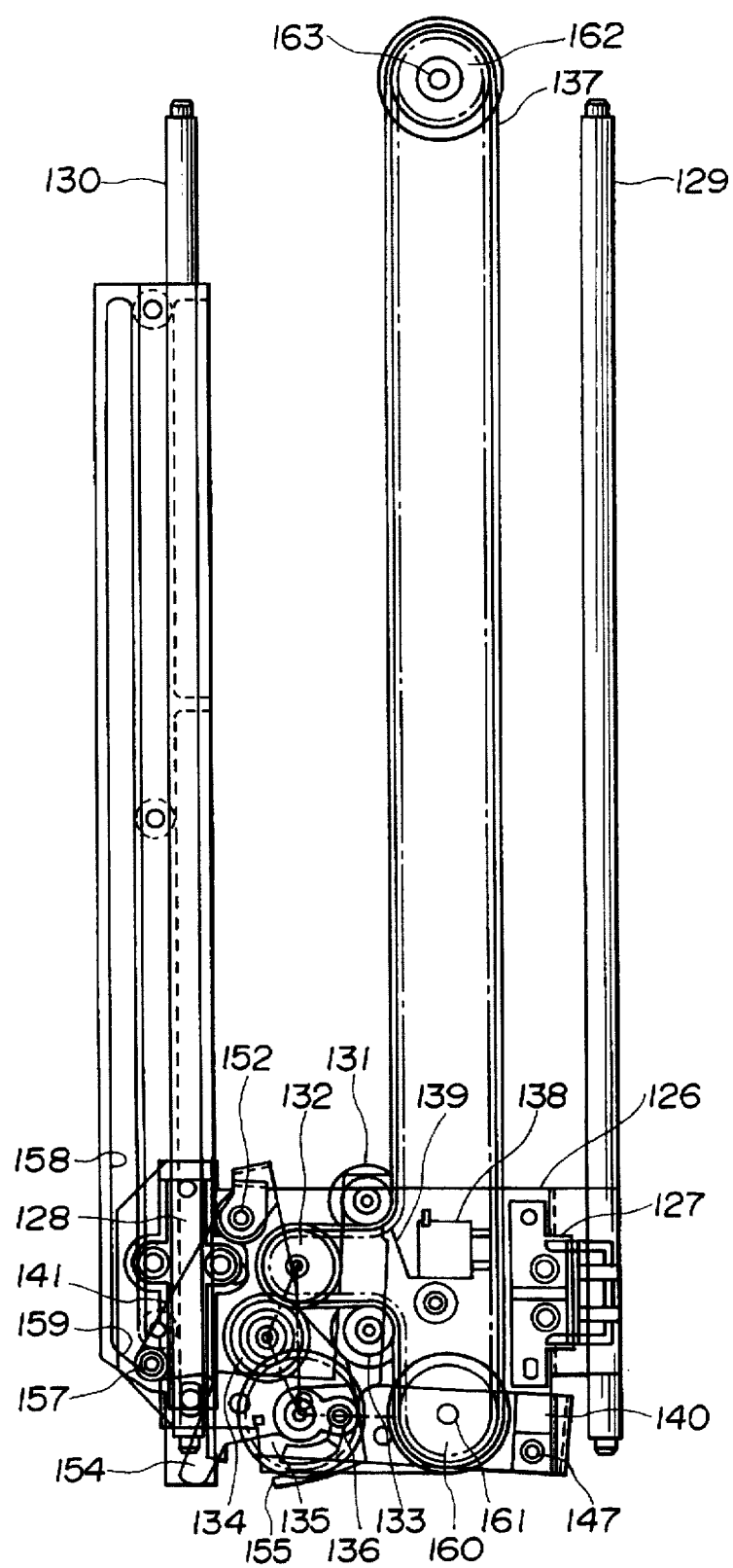
FIG. 78 is a plan view showing an arrangement of the transporting device in an initial state.

When the movement motor 181 is further run in rotation, the switching arm 140 is rotated and thrusts the thrust switch 138 by the operating portion 151, as shown in FIGS. 70 and 78. By such thrusting of the thrust switch 138, it is detected that the cartridge holder 70 has been returned to the space between the disc stockers 62 and 71. On the other hand, the switching arm 140 thus rotated releases the thrusting of the rear end of the side plate 125 by the proximal portion of the holding recess 149. The side plate 125 is moved slightly towards rear for engaging the reduced-diameter portion 119 of the mating retention pin 118 with the rear edge of the lock hole 170.

The transporting device 126, which has returned the cartridge holder 70 to the space between the disc stockers 62, 71, is now enabled to be lifted and lowered by the lift device.

(viii) Operation of a disc changer device

With the above-described disc changer device, the disc cartridge 320 or 321 may be previously introduced into each of the cartridge holders 70 supported between the disc stockers 62 and 71. At this time, the disc cartridge 320 or 321 only has its mating retention recess 312 engaged by the engagement member 112, while the shutter member 306 or 317 is not subjected to the opening movement. Thus there is no risk of dust and dirt being intruded into the space within the cartridge main member 305 or 318. On the other hand, since each disc cartridge 320 or 321 has its rear portion protruded towards the forward side of the outer casing 74, it can be visually identified which type of the disc cartridge 320 or 321 has been accommodated in the disc stockers 62, 71.

By acting on the input operating device, the mechanical chassis 11 can be uplifted or lowered by the lift device for selecting one of the disc cartridges 320 or 321 held by the cartridge holders 70. The cartridge holder 70 thus selected is transported by the transporting device 126 as far as the disc driving unit 174. Since the selected disc cartridge 320 or 321 is seen to be entrained into the outer casing 74, it can be clearly seen that the disc cartridge has now been selected.

The disc cartridge 320 or 321, held by the cartridge holder 70 transported on the disc drive unit 174, is chucked by the disc drive unit 174 which is at the chucked position. The playback mode is now ready to be executed. By the disc driving unit 174 being set to the recording mode, the magnetic head 192 is brought into sliding contact with the magnet-optical disc for executing the recording mode.

With the present disc changer device, the disc cartridges 320 or 321 other than the disc cartridge loaded on the disc driving unit 174 can be inserted into or taken out of the cartridge holders 70 by way of performing a disc cartridge exchange operation.

After the end of the recording mode or the reproducing mode, the cartridge holders 70 and the disc cartridges 320 or 321 are returned by the transporting device 126 to the space between the disc stockers 62 and 71.

(iX) Another construction of a cartridge holder (FIG. 93)

The disc changer device according to the present invention is not limited to the above-described arrangement in which the operation of selecting the cartridge holder 70 is performed by acting on the input operating device. Thus the disc changer device may also be so arranged that the disc cartridge 320 or 321 is selected by thrusting the rear end of the disc cartridge 320 or 321 inserted into the cartridge holder 70.

Specifically, a thrust detection arm 203 is mounted on each of the holder plates 75. The thrust detection arm 203 has its rear end rotatably supported via a support shaft 204 relative to the rear portion of the lateral side of the holding plate 75, and has an actuated arm 106 extended towards rear of the holding plate 75 and an actuating arm 107 protruded at the lateral side of the holding plate 75. An actuating pin 205 is provided on the slider 105 at a position at back of the actuated arm 206. The thrust detection arm 203 is rotationally biased in a direction of thrusting the actuated arm 206 against the actuating pin 205 by a tension coil spring 209 mounted between a spring retainer 208 provided at a rear portion of the holding plate 75 and a spring retention hole 210 formed in the actuated arm 206. The disc stocker 62 is provided with plural thrust detection switches 201 each having a thrust lug 202 facing the distal end of the actuating arm 207 of each thrust detection arm 203.

When the cartridge holder 70 is held between the disc stockers 62, 71, the slider 105 is positioned forwardly, while the actuating pin 205 holds the actuated arm 206 at the forward position, as shown in FIG. 93. The thrust detection arm 203 is held at a position in which the actuating arm 207 has been rotated in a direction of protruding the actuating arm 207 towards the opposite lateral side, with the actuating arm 207 thrusting the thrust detection switch 201.

When the disc cartridge 320, 321 held by the holding plate 75 by the tongue 108 abutted against its front surface thrust rearward, the slider 105 is thrust towards rear via the tongue 108 and is moved slightly towards rear, as indicated by arrow R in FIG. 93. At this time, the side plate 125 is prohibited from making a rearward movement by the strip-like portion 168, while the holding pate 75 is prohibited from being moved rearward by the retention piece 166 being engaged in the lock recess 92. Thus the slider 105 is moved towards rear under tensioning the tension coil spring 115 and under producing movement of the engagement pin 110 within the forward side slit 113. Since the actuating pin 205 is moved towards rear by the rearward movement of the slider 105, the thrust detection arm 203 is rotated, under the bias of the tension coil spring 209, in a direction of receding the actuating arm 207 towards the holding plate 75 as indicated by arrow S in FIG. 93. Such rotation of the thrust detection arm 203 releases thrusting on the thrust detection switch 201, so that it can be detected that the disc cartridge 320 or 321 has now been thrust.

The control circuit causes the mechanical chassis 11 to be uplifted or lowered to a position of the cartridge holder 70 associated with the thrust detection switch 201 released from the thrust operation in order to select the disc cartridge 320 or 321 held by the cartridge holder 70. The selected disc cartridge 320 or 321 is transported by the transporting device 126 along with the cartridge holder 70 to the disc driving unit 174 so as to be chucked by the disc drive unit 174.

What is claimed is:

1. A movement device comprising:

a sidewall section having a guide slit formed therein, a profiling pin inserted into the guide slit and formed in an object to be moved, said guide slit extends in an up-and-down direction so that the profiling pin is movable only in the up-and-down direction, a first cam plate having at least one first horizontal section, a second horizontal section contiguous to said first horizontal section via a branching point and a first inclined section, and lying above said first horizontal section and a third horizontal section contiguous to said first horizontal section via said branching point and a second inclined section and lying below said first horizontal section, said first cam plate being horizontally movable between an initial position positioning said profiling pin at said first horizontal section and an operative position positioning said profiling pin at said second horizontal section or said third horizontal section, movement means for periodically moving said first cam plate in reciprocation in a forward direction and in a reverse direction between said initial position and said operative position, and a second cam plate having at least one horizontal abutment support and being horizontally movable between a supporting position supporting said profiling pin by said abutment support and a non-supporting position receding said abutment support away from a locus of movement of said profiling pin, said second cam plate being periodically movable in a forward direction and in a reverse direction by said movement means with a pre-set phase difference relative to said first cam plate, said second cam plate, when said movement means performs a forward periodic movement and said first cam plate is horizontally moved from said initial position to said operative position, being at said supporting position during the time said profiling pin passes through said branching point, thereby guiding said profiling pin to said first inclined section leading to said second horizontal section, said second cam plate, when said movement means performs a reverse periodic movement and said first cam plate is horizontally moved from said initial position to said operative position, being at said non-supporting position during the time said profiling pin passes through said branching point, thereby guiding said profiling pin to said second inclined section leading to said third horizontal section.

2. A movement device comprising:

a sidewall section having a guide slit formed therein, a profiling pin inserted into the guide slit and formed in an object to be moved, the guide slit extends away from one side and toward an opposite side of said sidewall section, said profiling pin being movable only in a direction along said guide slit, biasing means for biasing said object towards said one side, a first cam plate having at least one first halt portion formed in a direction substantially normal to said guide slit, a second halt portion contiguous to said first halt portion via a branching point and a first inclined section inclined relative to the direction of said guide slit, said second halt portion being closer to said opposite side than said first halt portion, and a third halt portion contiguous to said first halt portion via said branching point and a second inclined section inclined relative to the direction of said guide slit, said third halt portion being closer to said one side than said first halt portion, said first cam plate moving said profiling pin in a direction substantially normal to said guide slit between an initial position abuttingly supporting said profiling pin by said first halt portion and an operative position abuttingly supporting said profiling pin by said second halt portion or by said third halt portion, movement means for periodically moving said first cam plate in reciprocation in a forward direction and in a reverse direction between said initial position and said operative position, and a second cam plate having at least one abutment support and being movable by said abutment support in a direction substantially normal to said guide slit between a supporting position abuttingly supporting said profiling pin by said abutment support and a non-supporting position receding said abutment support away from the locus of movement of said profiling pin, said second cam plate being periodically movable by said movement means in reciprocation in a forward direction and in a reverse direction with a pre-set phase difference relative to said first cam plate, said second cam plate, when said movement means performs a forward periodic movement and said first cam plate is moved from said initial position to said operative position, being at said supporting position during the time said profiling pin passes through said branching point, thereby prohibiting said profiling pin from being moved in one direction under the bias of said biasing means and guiding said profiling pin to said first inclined section leading to said second halt portion, said second cam plate, when said movement means performs a reverse periodic movement and said first cam plate is moved from said initial position to said operative position, being at said non-supporting position during the time said profiling pin passes through said branching point, thereby enabling said profiling pin to be moved in one direction under the bias of said biasing means and guiding said profiling pin to said second inclined section leading to said third halt portion.

3. The movement device as claimed in claim 1 or 2, wherein:

said movement means has a rotatable cam member and rotational driving means for selectively rotating said rotatable cam member in a forward direction or in a reverse direction, and said rotatable cam member having a first cam section for moving said first cam plate and a second cam section for moving said second cam plate.

4. The movement device as claimed in claim 3, wherein:

the abutment support of the second cam plate is a side edge portion of a lug having its one end supported by a main portion of the second cam plate and having its opposite end as a free end, and said second cam plate being moved in reciprocation with a period equal to one-half the period of the movement of said first cam plate.

5. A disc changer device, comprising:

a recording disc holding unit holding plural recording discs in tiers, transporting means for transporting one of recording discs held in said recording disc holding unit for loading on a recording and/or reproducing unit, a movement device for moving said transporting means between positions associated with the recording discs for causing the transporting means to select one of the recording discs, said transporting means being driven by a first motor and said movement device being driven by a second motor, and a sidewall section having a guide slit formed therein, said movement device having:

a profiling pin inserted into the guide slit and formed in the recording and/or reproducing unit, said guide slit extends in an up-and-down direction so that the profiling pin is movable only in the up-and-down direction, a first cam plate having at least one first horizontal section, a second horizontal section contiguous to said first horizontal section via a branching point and a first inclined section and lying above said first horizontal section and a third horizontal section contiguous to said first horizontal section via said branching point and a second inclined section and lying below said first horizontal section, said first cam plate being horizontally movable between an initial position positioning said profiling pin at said first horizontal section and an operative position positioning said profiling pin at said second horizontal section or said third horizontal section, movement means for periodically moving said first cam plate in reciprocation in a forward direction and in a reverse direction between said initial position and said operative position, and a second cam plate having at least one horizontal abutment support and being horizontally movable between a supporting position supporting said profiling pin by said abutment support and a non-supporting position receding said abutment support away from a locus of movement of said profiling pin, said second cam plate being periodically movable in reciprocation in a forward direction and in a reverse direction by said movement means with a pre-set phase difference relative to said first cam plate, said second cam plate, when said movement means performs a forward periodic movement and said first cam plate is horizontally moved from said initial position to said operative position, being at said supporting position during the time said profiling pin passes through said branching point, thereby guiding said profiling pin to said first inclined section contiguous to said second horizontal section, said second cam plate, when said movement means performs a reverse periodic movement and said first cam plate is horizontally moved from said initial position to said operative position, being at said non-supporting position during the time said profiling pin passes through said branching point, thereby guiding said profiling pin to said second inclined section contiguous to said third horizontal section.

6. A disc changer device, comprising:

a recording disc holding unit holding plural recording discs in tiers, transporting means for transporting one of recording discs held in said recording disc holding unit for loading on a recording and/or reproducing unit, a movement device for moving said transporting means between positions associated with the recording discs for causing the transporting means to select one of the recording discs, said transporting means being driven by a first motor and said movement device being driven by a second motor, and a sidewall section having a guide slit formed therein, said movement device having:

a profiling pin inserted into the guide slit and formed in the recording and/or reproducing unit, said guide slit extends away from one side and toward an opposite side of said sidewall section, said profiling pin being movable only in a direction along said guide slit, biasing means for biasing said recording and/or reproducing unit towards said one side, a first cam plate having at least one first halt portion formed in a direction substantially normal to said guide slit, a second halt portion contiguous to said first halt portion via a branching point and a first inclined section inclined relative to the direction of said guide slit, said second halt portion being closer to said opposite side than said first halt portion, and a third halt portion contiguous to said first halt portion via said branching point and a second inclined section inclined relative to the direction of said guide slit, said third halt portion being closer to said one side than said first halt portion, said first cam plate moving said profiling pin in a direction substantially normal to said guide slit between an initial position abuttingly supporting said profiling pin by said first halt portion and an operative position abuttingly supporting said profiling pin by said second halt portion or by said third halt portion, movement means for periodically moving said first cam plate in reciprocation in a forward direction and in a reverse direction between said initial position and said operative position, and a second cam plate having at least one abutment support and being movable by said abutment support in a direction substantially normal to said guide slit between a supporting position abuttingly supporting said profiling pin by said abutment support and a non-supporting position receding said abutment support away from the locus of movement of said profiling pin, said second cam plate being periodically movable by said movement means in reciprocation in a forward direction and in a reverse direction with a pre-set phase difference relative to said first cam plate, said second cam plate, when said movement means performs a forward periodic movement and said first cam plate is moved from said initial position to said operative position, being at said supporting position during the time said profiling pin passes through said branching point, thereby prohibiting said profiling pin from being moved in one direction under the bias of said biasing means and guiding said profiling pin to said first inclined section contiguous to said second halt portion, said second cam plate, when said movement means performs a reverse periodic movement and said first cam plate is moved from said initial position to said operative position, being at said non-supporting position during the time said profiling pin passes through said branching point, thereby enabling said profiling pin to be moved in one direction under the bias of said biasing means and guiding said profiling pin to said second inclined section contiguous to said third halt portion.

7. The disc changer device as claimed in claim 5 or 6, wherein:

the movement means has a rotatable cam member and rotational driving means for selectively rotating said rotatable cam member in a forward direction and in a reverse direction, said rotatable cam member having a first cam section for moving said first cam plate and a second cam section for moving said second cam plate.

8. The disc changer device as claimed in claim 5 or 6, wherein:

the abutment support of the second cam plate is a side edge of a lug having one end supported by a main member of the second cam plate and having the opposite end as a free end, said second cam plate being moved in reciprocation in a forward direction and in a reverse direction with a period equal to one-half the period of reciprocating movement of the first cam plate.

9. A movement device comprising:

a sidewall section having a guide slit formed therein, a profiling pin inserted into the guide slit and formed in an object to be moved, said guide slit extends in an up-and-down direction so that the profiling pin is movable only in the up-and-down direction, a first cam plate having at least one zigzag-shaped first cam slit formed therein with said profiling pin engaged therein, the cam slit including a second horizontal section lying above and being contiguous to a first horizontal section via a branching point and a first inclined section, and a third horizontal section lying below said first horizontal section and being contiguous to said first horizontal section via said branching point and a second inclined section, said first cam plate being horizontally movable between an initial position positioning said profiling pin at said first horizontal section and an operative position positioning said profiling pin at said second horizontal section or said third horizontal section, movement means for periodically moving said first cam plate in reciprocation in a forward direction and in a reverse direction between said initial position and said operative position, and a second cam plate having at least one second cam slit with horizontal abutment supports and being horizontally movable between a supporting position supporting said profiling pin by one of said abutment supports and a non-supporting position with said abutment supports receded away from a locus of movement of said profiling pin, said second cam plate being periodically movable in a forward direction and in a reverse direction by said movement means with a pre-set phase difference relative to said first cam plate, said second cam plate, when said movement means performs a forward periodic movement and said first cam plate is horizontally moved from said initial position to said operative position, being at said supporting position during the time said profiling pin passes through said branching point, thereby guiding said profiling pin to said first inclined section leading to said second horizontal section, said second cam plate, when said movement means performs a reverse periodic movement and said first cam plate is horizontally moved from said initial position to said operative position, being at said non-supporting position during the time said profiling pin passes through said branching point, thereby guiding said profiling pin to said second inclined section leading to said third horizontal section.

10. The movement device as claimed in claim 9, wherein:

said movement means has a rotatable cam member and rotational driving means for selectively rotating said rotatable cam member in a forward direction or in a reverse direction, and said rotatable cam member having a first cam section for moving said first cam plate and a second cam section for moving said second cam plate.

11. The movement device as claimed in claim 10, wherein:

the abutment support of the second cam plate is a side edge portion of a lug having its one end supported by a main portion of the second cam plate and having its opposite end as a free end, and said second cam plate being moved in reciprocation with a period equal to one-half the period of the movement of said first cam plate.

* * * * *